(12) United States Patent
Yoshida

(10) Patent No.: US 6,170,950 B1
(45) Date of Patent: Jan. 9, 2001

(54) APPARATUS FOR INSTALLING EYEGLASS LENS

(75) Inventor: Takehiko Yoshida, Higashiosaka (JP)

(73) Assignee: Vision Optic Co., Ltd., Osaka (JP)

( * ) Notice: Under 35 U.S.C. 154(b), the term of this patent shall be extended for 0 days.

(21) Appl. No.: 09/298,088

(22) Filed: Apr. 22, 1999

(30) Foreign Application Priority Data

Apr. 28, 1998 (JP) .................................................. 10-134601
Jul. 30, 1998 (JP) .................................................. 10-230171
Oct. 29, 1998 (JP) .................................................. 10-326061

(51) Int. Cl.$^7$ ....................................................... G02C 1/02
(52) U.S. Cl. ............................ 351/110; 351/141; 351/146
(58) Field of Search ................................. 351/110, 140, 351/141, 142, 145, 146

(56) References Cited

U.S. PATENT DOCUMENTS

| 654,870 | * | 7/1900 | Boyd ..................................... 351/146 |
| 2,171,753 | * | 9/1939 | Kirk et al. ............................ 351/110 |
| 2,362,726 | * | 11/1944 | Slotsky ................................. 351/146 |
| 2,477,125 | * | 7/1949 | Guillet ................................. 351/140 |

* cited by examiner

Primary Examiner—Huy Mai
(74) Attorney, Agent, or Firm—Keating & Bennett, LLP

(57) ABSTRACT

An eyeglasses lens-installing apparatus includes a lens. A substantially elliptical through-hole is formed in the vicinity of an edge of the lens. A substantially elliptical columnar member disposed on a lens sandwiching part of a connection member is fitted into the through-hole from one main surface side of the lens. The columnar member has a hole formed therein. A screw portion is provided on the inner peripheral surface of the hole of the columnar member. The columnar member is integral with the lens sandwiching part and the lug. A fastener is inserted into the through-hole from the other main surface side of the lens. The fastener includes a fixing part having a male screw portion disposed on the periphery thereof and a head part. The fastener is inserted into the through-hole, with a close-contact member installed on the periphery of the fixing part. At this time, the fixing part of the fastener is screwed on the screw portion of the columnar member. As a result, the fastener and the columnar member are fixed to each other.

15 Claims, 45 Drawing Sheets

FIG. 6
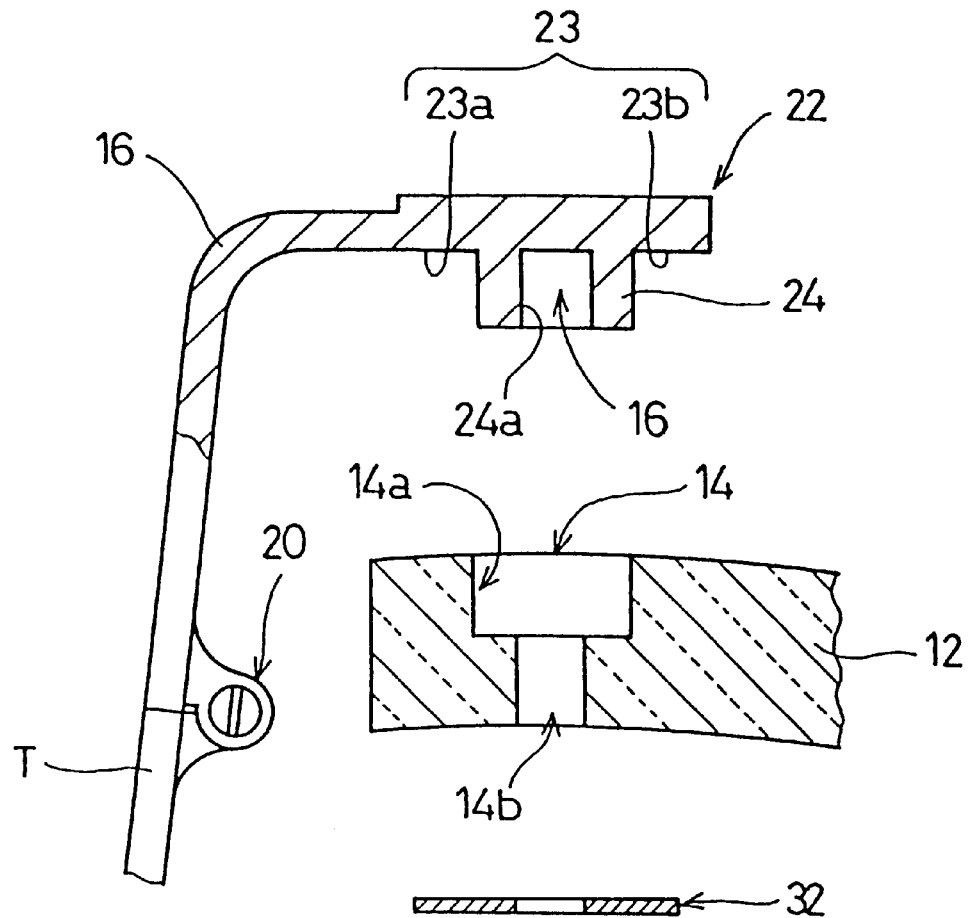
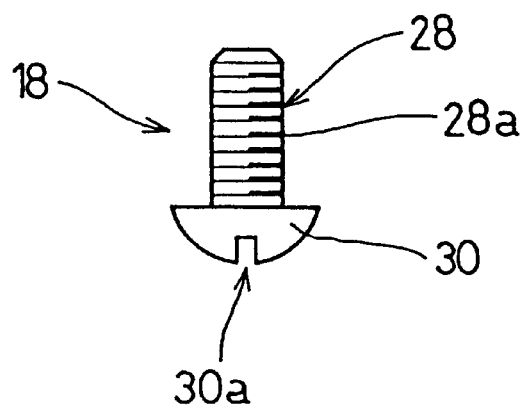

APPARATUS FOR INSTALLING EYEGLASS LENS

BACKGROUND OF THE INVENTION

1. Field of the Invention

In general, the present invention relates to an eyeglasses lens-installing apparatus. More particularly, the present invention relates to an improved eyeglasses lens-installing apparatus for installing a lens on connecting members of a temple and a bridge of eyeglasses. For example, the present invention relates to an eyeglasses lens-installing apparatus which is applied to rimless eyeglasses.

2. Description of the Prior Art

FIG. 51 is a perspective view showing an example of a conventional eyeglasses lens-installing apparatus which constitutes the background of the present invention. An eyeglasses lens-installing apparatus 1 includes a lens 2 having a circular through-hole 2a formed therein. A male screw member 4 fixed to one end of a bridge 3 is inserted in a direction toward rear through the lens 2 from the front side thereof. At the rear side of the lens 2, a male screw portion 4a of the male screw member 4, is screwed into a nut member 5. One end of a pad arm 7 supporting a pad 6 is fitted into a cut-out portion 8 formed at a portion of the peripheral surface of the lens 2 and locked thereto. Although not shown in FIG. 51, the other lens is installed at the other end of the bridge 3 by using an eyeglasses lens-installing apparatus similar to that described above. Although not shown in FIG. 51, the lens is installed on the lug (a front part of the frame connected with the temple and the lens) of the frame by an eyeglasses lens-installing apparatus similar to the above-described apparatus.

However, in the conventional eyeglasses lens-installing apparatus 1, the male screw member 4 is inserted through the lens 2 from the front side toward the rear side, and the male screw member 4 is screwed into the nut member 5 at the rear side of the lens 2. Thus, the male screw member 4 and the nut member 5 having angled portions are constructed to project from the rear surface of the lens 2. Thus, when the lens 2 is wiped with a cleaning cloth or the like, the cloth is likely to be caught by the projected parts and may be torn. That is, the projected parts inconvenience a user during polishing of the lens 2 installed on the eyeglasses lens-installing apparatus 1. Further, when the user collides with an object and a shock is applied to the eyeglasses, the wearer's face may be injured by the projected parts.

In addition, when the eyeglasses lens-installing apparatus 1 is used to install the lens 2 on the lug, the circular through-hole 2a may cause the neck portion of the male screw member 4 to rotate together with the nut member 5 in the through-hole 2a of the lens 2 relative to the surface of the lens 2. That is, the lens 2 may be loosened at the portion at which the lens 2 and the bridge 3 are connected with each other and the portion at which the lens 2 and the lug (not shown in FIG. 51) are connected with each other. Thus, the conventional eyeglasses lens-installing apparatus 1 is incapable of holding the lens 2 firmly thereon.

SUMMARY OF THE INVENTION

To overcome the problems described above, preferred embodiments of the present invention provide an eyeglasses lens-installing apparatus which is capable of holding a lens thereon without loosening the lens, allowing a user to polish the surface of the lens easily, and allowing a user to safely wear eyeglasses.

According to one preferred embodiment of the present invention, an eyeglasses lens-installing apparatus includes a connection member having a columnar member adapted to be inserted into a through-hole formed in the lens at a position in the vicinity of an edge of the lens and a fastener having a fixing part to be fixed to the columnar member. The connection member and the fastener are constructed so that when the fixing part of the fastener is fixed to the columnar member, the lens is sandwiched between a part of the connection member positioned at a lens surface side thereof and a part of the fastener positioned at a lens surface side thereof, with the connection member and the fastener being in close contact with the lens.

In another preferred embodiment, an eyeglasses lens-installing apparatus includes a connection member having a columnar member adapted to be inserted into a through-hole formed in the lens at a position in the vicinity of an edge of the lens and a fastener which has a fixing part having a convex portion or a concave portion disposed thereon and which is fitted into the columnar member. The connection member and the fastener are constructed so that when the fixing part of the fastener is fitted into the columnar member, the lens is sandwiched between a part of the connection member positioned at a lens surface side thereof and a part of the fastener positioned at a lens surface side thereof, with the connection member and the fastener being in close contact with the lens.

The columnar member of the connection member preferably has a substantially elliptical shape in cross section so that the columnar member is fitted into a substantially elliptical through-hole formed in the lens. The connection member also preferably has a lens-sandwiching part integral with the columnar member and closely contacting a part of a surface of the lens.

The fastener preferably includes a fastening portion confronting the lens-sandwiching part of the connection member so that the lens is sandwiched between the fastening portion and the connection member.

The fastener may also include a fixing member including a head part and a fixing part including a convex portion or a concave portion which is fixed to the columnar member and integral with the head part and a close-contact member interposed between the head part of the fixing member and the surface of the lens, with the close-contact member positioned on the periphery of the convex portion or the concave portion of the fixing member so as to contact the fixing member and at least one part of the lens closely with each other.

A screw portion provided on the fixing part of the fastener is preferably screwed on a screw portion located on a fixing part of the columnar member to fix the fastener to the connection member.

A male screw portion is preferably disposed on the periphery of the convex portion of the fixing part of the fastener and a female screw portion is preferably disposed on a portion of the columnar member of the connection member such that the portion is positioned in the vicinity of a front end of the columnar member to fix the fixing part of the fastener to the columnar member.

A female screw portion is preferably disposed on an inner part of the concave portion of the fixing part of the fastener and a male screw portion is preferably located on a portion of the columnar member of the connection member such that the portion is positioned in the vicinity of a front end of the columnar member to fix the fixing part of the fastener to the columnar member.

The close-contact member is preferably installed on the periphery of the fixing part of the fastener.

The close-contact member may also be installed on the periphery of the convex portion of the fixing part of the fastener.

The close-contact member is preferably made of a relatively soft material.

The columnar member of the connection member preferably has a hole to which the fixing part of the fastener is fixed.

A convex portion to be fitted into a hole and/or a stepped portion provided on the lens is preferably located on the lens sandwiching part of the connection member.

The connection member preferably has an outer shape which corresponds to the shape of the stepped portion located on the lens so that when the connection member is fixed to the lens, the stepped portion allows the connection member to be fixed to the lens closely.

A convex portion includes a pin positioned in the vicinity of the fixing part of the fastener and projecting from the lens sandwiching part of the connection member toward the lens to fix the lens to the lens sandwiching part by inserting the pin into a hole formed in the lens.

The connection member preferably includes a supporting piece supporting a part of a peripheral surface of the lens and the supporting piece preferably includes a convex strip having a surface with a shape that corresponds to the shape of a part of the peripheral surface of the lens so that when the connection member is fixed to the lens, the supporting piece contacts a part of the peripheral surface of the lens closely.

The columnar member is preferably integral with the connection member.

The columnar member preferably includes a member which is separate from the connection member. The connection member includes a through-hole communicating with the through-hole of the lens and the columnar member is inserted or fitted into the through-hole of the lens through the through-hole of the connection member.

The columnar member which includes a member that is separate from the connection member has a head part and a fixing part having a convex portion or a concave portion and the connection member preferably includes a stepped portion into which the head part of the columnar member is fitted.

The head part of the columnar member which is separate from the connection member preferably has a flange portion which is locked to a peripheral portion of a through-hole of the connection member when the columnar member is inserted or fitted into the through-hole of the connection member and the head part and the flange portion are preferably formed integrally.

In another preferred embodiment, a method of forming a substantially elliptical through-hole on a lens to be applied to an eyeglasses lens-installing apparatus includes the steps of placing the lens at a predetermined position to place a hole-forming portion of the lens at a predetermined position, cutting the hole-forming portion of the lens by a cutting member located at a predetermined position to initially form a substantially elliptical through-hole on the lens, and guiding the lens placed at the predetermined position by a predetermined distance in the direction of a major axis of the substantially elliptical through-hole without changing the position of the cutting member after the cutting member forms the through-hole initially.

In another preferred embodiment of the present invention, there is provided a hole-forming apparatus for forming an substantially elliptical through-hole on a lens to be applied to an eyeglasses lens-installing apparatus including a bed, a cutting member positioned above the bed and forming a substantially elliptical through-hole in the lens, a table positioned between the bed and the cutting member and movable reciprocatingly along an upper surface of the bed and a jig for placing the lens at a predetermined position over the table. The table guides the jig in the direction of a major axis of the substantially elliptical through-hole to form the substantially elliptical through-hole at a predetermined position of the lens.

The table preferably includes a positioning member including a plurality of convex portions and/or concave portions located at a predetermined position. The jig has a positioning member including a plurality of convex portions and/or concave portions which are fitted into the positioning member of the table and has a mold into which the lens is fitted according to a shape of the lens and size thereof.

A columnar member of a connection member inserted into a through-hole of a lens is preferably fixed to a fixing part of a fastener. At this time, a part of the surface of the lens is sandwiched between a part of the connection member positioned at the lens surface side thereof and a part of the fastener positioned at the lens surface side thereof, with a part of the surface of the lens in close contact with the connection member and the fastener.

The columnar member of the connection member fitted into the through-hole of the lens may also be fixed to the fixing part of the fastener. At this time, a part of the surface of the lens is sandwiched between a part of the connection member positioned at the lens surface side thereof and a part of the fastener positioned at the lens surface side thereof, with a part of the surface of the lens in close contact with the connection member and the fastener.

When the columnar member having the substantially elliptical cross section is fitted into the substantially elliptical through-hole formed in the lens, a lens-sandwiching part integral with the columnar member contacts a part of the surface of the lens closely. Thus, a part of the surface of the lens is sandwiched between a part of the connection member positioned at the lens surface side thereof and a part of the fastener positioned at the lens surface side thereof, with a part of the surface of the lens in close contact with the connection member and the fastener. In this case, because the columnar member having a substantially elliptical cross section is fitted into the substantially elliptical through-hole of the lens, it is possible to prevent the connection member and the fastener from being rotated.

The lens is preferably sandwiched between the lens-sandwiching part of the connection member and a fastening portion of the fastener confronting the lens-sandwiching part owing to the cooperation of the lens-sandwiching part and the fastening portion.

A fixing member of the connection member includes a head part and a fixing part which is integral with the head part and includes a convex portion or a concave portion which is fixed to the columnar member. Further, the space between the head part of the fixing member and the surface of the lens is sealed with a close-contact member positioned on the periphery of the convex portion or the concave portion of the fixing member. In this case, the close-contact member is constructed and positioned such that the area of the friction surface of the close-contact member and that of the lens are relatively large. Thus, the close-contact member has a function of preventing the fixing member from being loosened.

A screw portion is provided on the fixing part of the fastener and on the fixing part of the columnar member. Thus, the connection member and the fastener can be firmly fixed to each other by screwing both screw portions on each other.

A male screw portion disposed on the convex portion of the fixing part of the fastener is screwed on a female threaded portion defined on the columnar member of the connection member.

A male screw portion disposed on the columnar member of the connection member is screwed on a female screw portion disposed on an inner part of the concave portion of the fixing part of the fastener.

The close-contact member is preferably installed on the periphery of the fixing part of the fastener.

The close-contact member is installed on the periphery of the convex portion of the fixing part of the fastener.

The close-contact member is preferably made of relatively soft material. Thus, the close-contact member contacts the surface of the lens in correspondence to the shape of the surface thereof.

The fixing part of the fastener is preferably fixed to a hole formed in the columnar member of the connection member.

A convex portion disposed on the lens sandwiching part of the connection member is fitted into a hole and/or a stepped portion located on the lens. In this case, the convex portion holds the lens firmly in cooperation with the connection member and the fastener.

The connection member is constructed such that it has an outer shape corresponding to the shape of the stepped portion provided on the lens. Thus, when the connection member is fixed to the lens, the connection member is fixed to the lens closely, with the connection member being in close contact with the stepped portion.

A convex portion including a pin is disposed on the lens sandwiching part of the connection member toward the lens. The convex portion is inserted into the hole disposed on the lens to fix the lens to the lens sandwiching part. The convex portion including the pin holds the lens in cooperation with the connection member and the fastener.

The connection member is provided with a supporting piece including a convex strip having a surface whose shape corresponds to the shape of a part of the peripheral surface of the lens. Thus, when the connection member is fixed to the lens, the supporting piece contacts a part of the peripheral surface of the lens closely.

The columnar member is preferably integral with the connection member.

The columnar member is preferably separate from the connection member. In this case, a through-hole communicating with the through-hole of the lens is provided on the connection member. The columnar member is inserted or fitted into the through-hole of the lens.

When the connection member is fixed to the lens, the head part of the columnar member which is separate from the connection member is fitted into the stepped portion of the connection member. Thus, the connection member and the lens have a great friction surface, respectively.

A flange portion is provided on the head part of the columnar member which is separate from the connection member. Thus, when the columnar member is inserted or fitted into the through-hole of the connection member, the flange portion is locked to the peripheral portion of the through-hole of the connection member.

A lens is placed at a predetermined position. At this time, a hole-forming portion of the lens is placed at a predetermined position. Then, a cutting member located at a predetermined position cuts the hole-forming portion of the lens to initially form a substantially elliptical through-hole on the lens. Then, the lens placed at the predetermined position is guided by a predetermined distance in the direction of the major axis of the substantially elliptical through-hole without changing the position of the cutting member after it forms the through-hole initially. At this time, the substantially elliptical through-hole is formed in the lens by the cutting member.

A cutting member forms a substantially elliptical through-hole on a lens. A jig is set on a table so as to be movable reciprocatingly along an upper surface of a bed. The jig places the lens at a predetermined position. The table guides the jig in the direction of the major axis of the substantially elliptical through-hole.

A positioning member including a plurality of convex portions and/or concave portions disposed on the table and another positioning member including a plurality of convex portions and/or concave portions provided on the jig are fitted into each other and placed in position. By fitting the lens into a mold, the lens is placed at a predetermined position and a substantially elliptical through-hole to be formed in the lens is placed in position.

The above and further objects, features, aspects, and advantages of the present invention will be more fully apparent from the following detailed description of preferred embodiments thereof with the accompanying drawings.

BRIEF DESCRIPTION OF THE DRAWINGS

FIG. 6 is an exploded enlarged sectional view showing the eyeglasses lens-installing apparatus shown in FIG. 5.

DETAILED DESCRIPTION OF PREFERRED EMBODIMENTS

Figure 1:
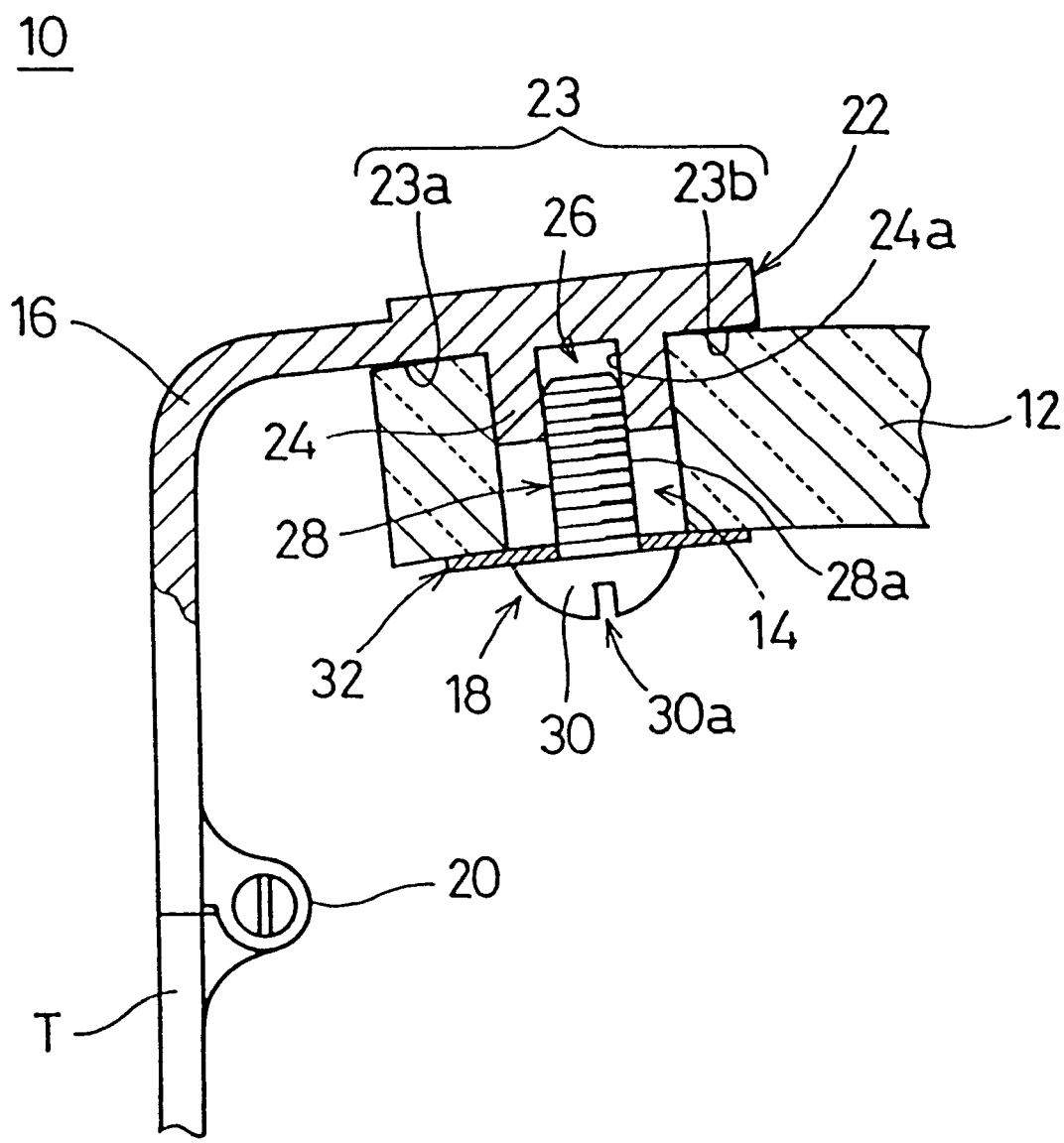
FIG. 1 is an enlarged plan view partly in section showing an example of the eyeglasses lens-installing apparatus according to a preferred embodiment of the present invention.
Figure 2:
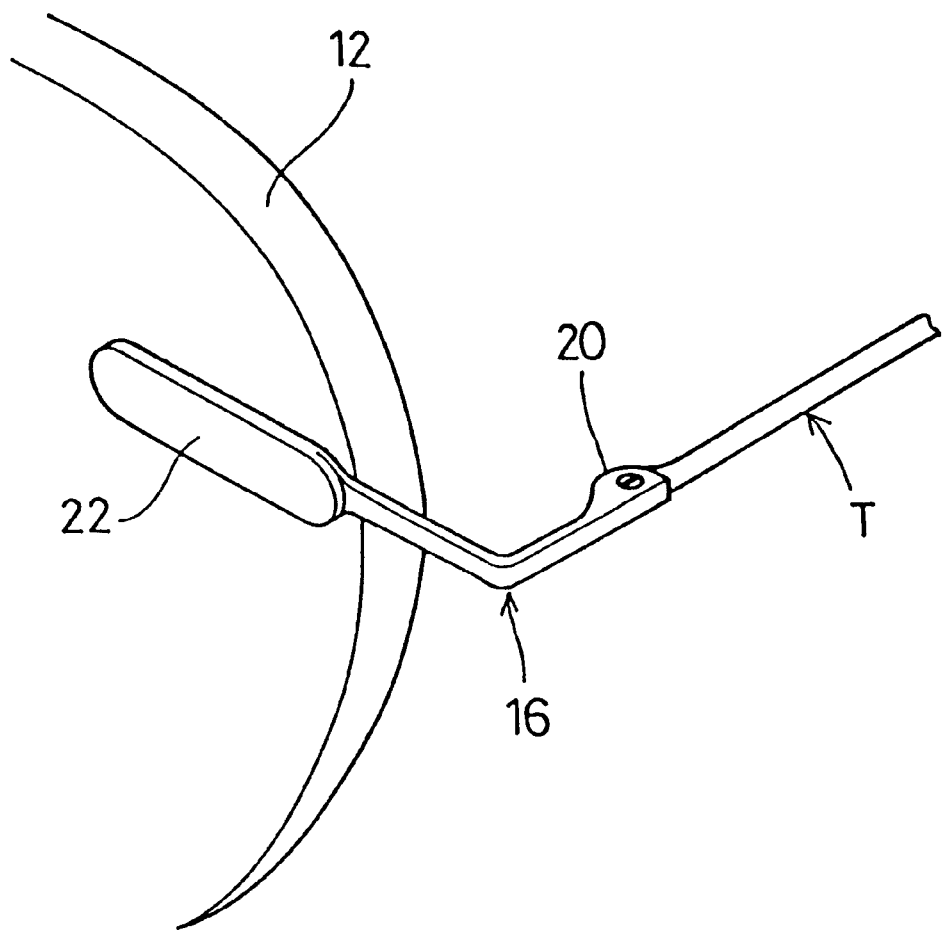
FIG. 2 is a perspective view showing enlarged main parts of the eyeglasses lens-installing apparatus shown in FIG. 1.

FIG. 1 is an enlarged plan view partly in section showing an example of the eyeglasses lens-installing apparatus according to a preferred embodiment of the present invention. FIG. 2 is a perspective view showing enlarged main parts of the eyeglasses lens-installing apparatus shown in FIG. 1. In the preferred embodiment shown in FIGS. 1 and 2, the eyeglasses lens-installing apparatus of the present invention is used to install a lens of rimless eyeglasses on a connection portion of a temple of the rimless eyeglasses.

An eyeglasses lens-installing apparatus 10 of the present preferred embodiment includes a lens 12. The lens 12 has a through-hole 14 positioned near one side edge and penetrating from one main surface of the lens 12 to its other main surface. In this preferred embodiment, the through-hole 14 preferably has a substantially elliptical shape or has a substantially ellipse-like configuration when the lens 12 is viewed from the front side thereof. The substantially elliptical through-hole 14 is formed in the lens 12 such that its major axis is approximately parallel with the lengthwise direction of the lens 12.

The lens 12 is held by a lug 16 and a fastener 18, with the lens 12 sandwiched therebetween. The lug 16 is positioned at one main surface side of the lens 12 and serves as a connection member connected with the temple T and with the lens 12. The fastener 18 is positioned at the other main surface side of the lens 12 and is inserted into the through-hole 14 of the lens 12.

The lug 16 preferably has an approximately L-shape configuration in a plan view. One end of the lug 16 is pivotally connected to an end of the temple T via a hinge 20 or the like. The lug 16 includes a lens-sandwiching part 22 including a substantially elliptical plate and connected to the other end of the lug 16. A columnar member 24 is formed approximately at the center of one main surface (inner surface) of the lens-sandwiching part 22. The columnar member 24 projects from the one main surface (inner surface) of the lens-sandwiching part 22 into the through-hole 14 such that the columnar member 24 is spaced by a predetermined distance with respect to one end and the other end of the lug 16. The columnar member 24 preferably has a substantially elliptical shape in cross section. The surface of the columnar member 24 also preferably has a substantially elliptical shape. The columnar member 24 defines a right angle with the one main surface (inner surface) of the lens-sandwiching part 22 confronting the lens 12 and with the surface of the lens 12. The columnar member 24 has a hole 26 which has a substantially circular cross section and extends axially. A screw portion 24a including a female threaded portion which functions as the fixing part thereof is provided on the inner peripheral surface of the hole 26 of the columnar member 24. A screw portion 28a defining the fixing part 28 of a fastener 18 which will be described later is screwed on the screw portion 24a to connect the fastener 18 and the columnar member 24 with each other.

A lens-sandwiching surface 23 sandwiching the lens 12 between it and the fastener 18 is provided on the periphery of the columnar member 24 such that the lens-sandwiching surface 23 closely contacts the one main surface of the lens 12. The lens-sandwiching surface 23 has lens close-contact surfaces 23a and 23b at one and the other sides of the columnar member 24 in the direction of the major axis of the substantially elliptical lens-sandwiching part 22.

In this preferred embodiment, the center of the through-hole 14 of the lens 12 is positioned at a certain distance, for example, about 3.0 mm from one end of the lens 12 along the lengthwise direction thereof. The length of the major axis of the substantially elliptical lens-sandwiching part 22 is preferably equal to about 5.0 mm. The length of each of the lens close-contact surfaces 23a and 23b in the longitudinal direction thereof is preferably equal to about 1.0 mm. The length of the major axis of the columnar member 24, the length of the minor axis thereof, and the axial length thereof are preferably equal to about 3.0 mm to 3.5 mm, about 1.8 mm to 2.3 mm, and about 1.5 mm, respectively. The diameter of the through-hole 14 of the lens 12, namely, the length of the major axis and the minor axis of the through-hole 14 are preferably slightly larger than the major axis and the minor axis of the columnar member 24, respectively. Thus, when the columnar member 24 is inserted into the through-hole 14 from the one main surface of the lens 12, the columnar member 24 is fitted tightly in the through-hole 14. The fastener 18 is inserted into the through-hole 14 from the other main surface side of the lens 12 to fixedly connect the fastener 18 with the columnar member 24 through the screw portion 28a of the fastener 18 and the screw portion 24a of the columnar member 24.

The fastener 18 includes the substantially cylindrical fixing part 28. The fixing part 28 includes the screw portion 28a having a male screw on the peripheral surface thereof. A hemispheric head portion 30 defining the fastening portion is integral with the fixing part 28 at its one end in its axial direction. The head portion 30 has a groove portion 30a which has straight line or cross-shaped configuration on its surface. In this preferred embodiment, the outer diameter of the fixing part 28 of the fastener 18 is preferably equal to about 1.2 mm to about 1.4 mm.

In this preferred embodiment, a round machine screw having a cross-shaped, recessed head is preferably used as the fastener 18. In addition, it is possible to use machine screws such as a fillister head screw, a flat fillister head screw, a pan head screw, an oval countersunk head screw, and a countersunk head screw, if desired.

The fixing part 28 of the fastener 18 is inserted into the hole 26 of the columnar member 24 through the through-hole 14 of the lens 12 from the other main surface side of the lens 12. In this preferred embodiment, the fixing part 28 is inserted into the columnar member 24, with a close-contact member 32 including a circular washer or a substantially elliptical washer placed on the periphery of the fixing part 28 of the fastener 18. In this state, the screw portion 28a of the fixing part 28 of the fastener 18 is screwed on the screw portion 24a of the columnar member 24. Thus, the columnar member 24 and the fastener 18 can be securely and reliably fixedly connected with each other.

When the circular washer is used as the close-contact member 32, the diameter thereof should be longer than the major axis or the minor axis of the through-hole 14 of the lens 12. That is, the close-contact member 32 is constructed such that at least one part thereof closely contacts a part of the lens 12 positioned on the periphery of the through-hole 14 and is locked thereto. Thus, the close-contact member 32 defines the fastening part of the fastener 18.

Figure 51:
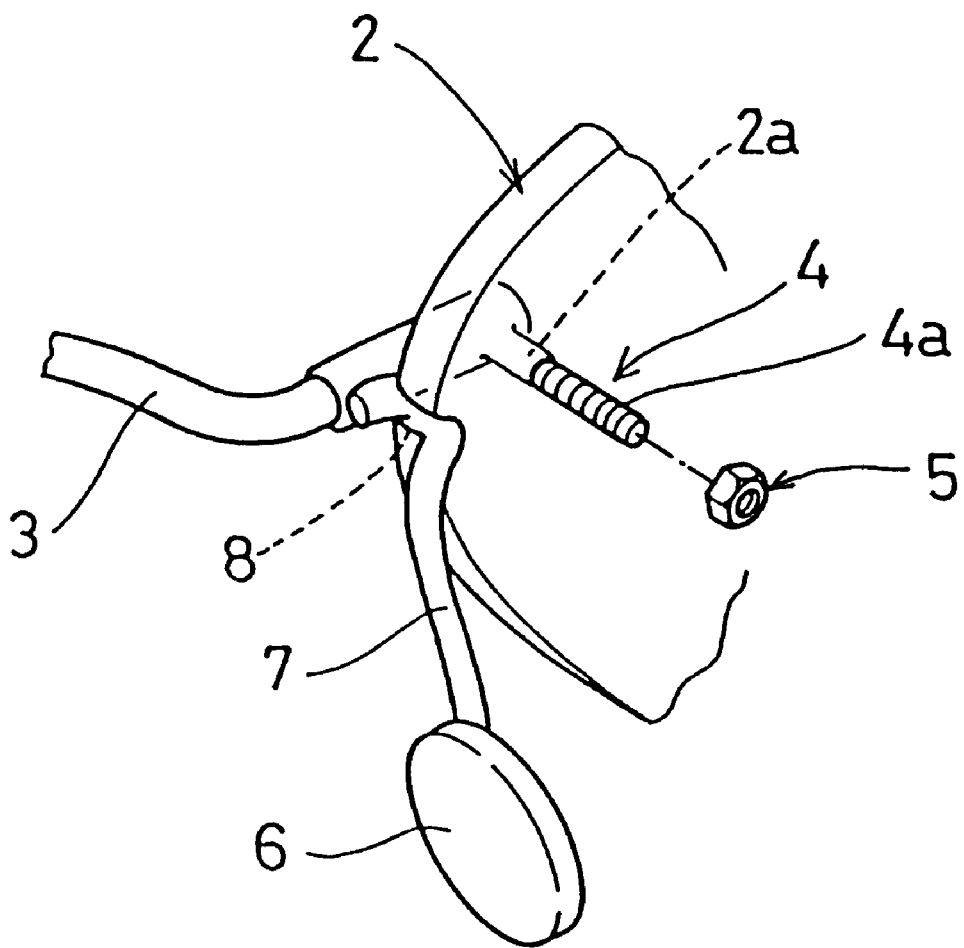
FIG. 51 is a main parts-depicted perspective view showing an example of a conventional eyeglasses lens-installing apparatus which is the background of the present invention.

Because the through-hole 14 of the lens 12 and the columnar member 24 which is fitted therein are substantially elliptical, it is possible to prevent the lens-sandwiching part 22 from being rotated and prevent the fastener 18 from being rotated together with the lens-sandwiching part 22. Further, because the close-contact member 32 is interposed between the head portion 30 of the fastener 18 and the surface of the lens 12, it is possible to contact the head portion 30 of the fastener 18 with the surface of the lens 12 closely. Further, because the area of the friction surface of the close-contact member 32 and that of the lens 12 are large, it is possible to prevent the fixing part 28 of the fastener 18 from being loosened. Therefore, the lens 12 can be held firmly by the lens-sandwiching part 22 of the lug 16 and the close-contact member 32, with the lens 12 sandwiched therebetween. At this time, the lens close-contact surfaces 23a and 23b of the lens-sandwiching part 22 and the surface of the close-contact member 32 contact the one main surface and the other main surface of the lens 12 closely, respectively. Thus, the lens 12 can be held firmly by the lens-sandwiching part 22 and the close-contact member 32, with the lens 12 sandwiched therebetween Accordingly, in the preferred embodiment shown in FIGS. 1 and 2, unlike the conventional eyeglasses lens-installing apparatus shown in FIG. 51, it is possible to hold the lens 12 reliably without allowing the lens 12 to become loosened. Further, the columnar member 24 is accommodated inside the through-hole 14. As a result, the eyeglasses lens-installing apparatus does not have members projecting from the lens 12. More specifically, the male screw member does not project from the lens 12, unlike the conventional eyeglasses lens-installing apparatus shown in FIG. 51. Thus, the lens 12 can be cleaned easily and is safe against a shock which may be applied to the eyeglasses.

In the present preferred embodiment, it is possible to hold the lens 12 by the cooperation of the lens close-contact surface 23a at one side of the lens sandwiching part 22, the fastener 18, and the close-contact member 32, even though the lens close-contact surface 23b at the other side of the lens sandwiching part 22 is not formed. But it is preferable to provide the lens sandwiching part 22 with the two lens close-contact surfaces 23a and 23b.

Although not shown in FIGS. 1 and 2, the other lens (not shown) is installed on the other lug (not shown) via the eyeglasses lens-installing apparatus 10.

Figure 3:
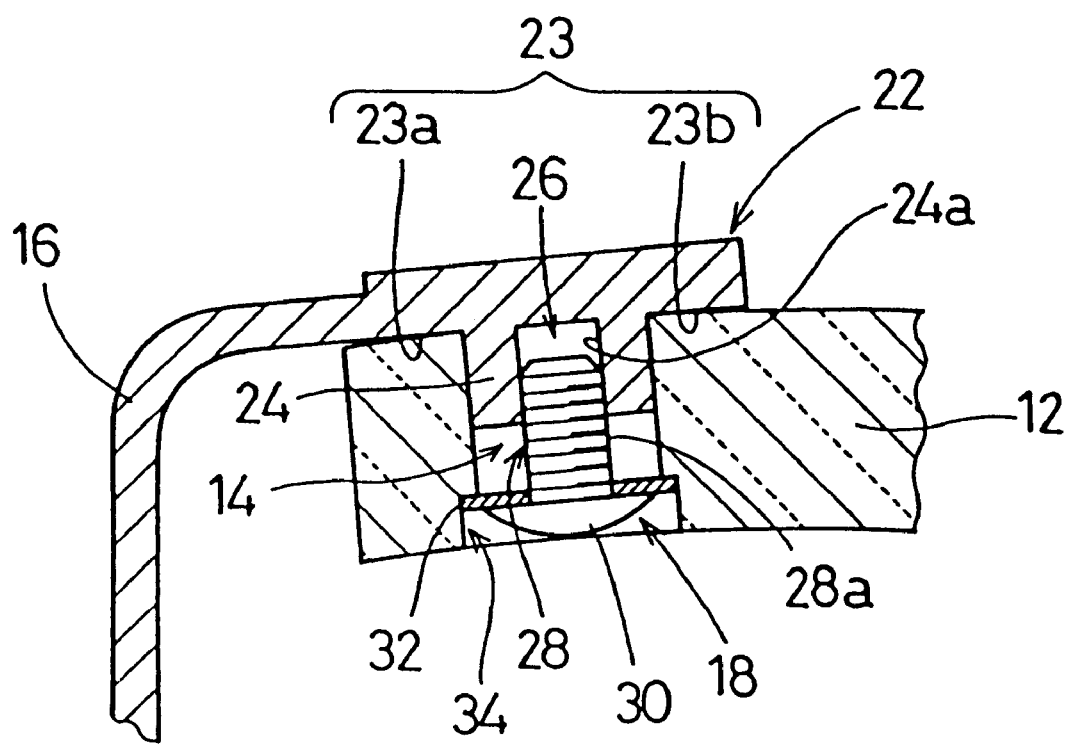
FIG. 3 is an enlarged plan view partly in section showing main parts of a modification of the eyeglasses lens-installing apparatus shown in FIGS. 1 and 2.

FIG. 3 is an enlarged plan view partly in section showing main parts of a modification of the eyeglasses lens-installing apparatus shown in FIGS. 1 and 2.

The eyeglasses lens-installing apparatus of the preferred embodiment shown in FIG. 3 is different from that of the preferred embodiment shown in FIGS. 1 and 2 in the arrangement of the through-hole 14 of the lens 12. That is, in the preferred embodiment shown in FIG. 3, a substantially elliptical stepped portion 34 is provided at one side (other main surface side of lens 12) in the axial direction of the through-hole 14 of the lens 12. When the stepped portion 34 is viewed from the other main surface side of the lens 12, the substantially elliptical stepped portion 34 is substantially coaxial with the substantially elliptical through-hole 14 of the lens 12. The major and minor axes of the stepped portion 34 are preferably longer than the major and minor axes of the through-hole 14 of the lens 12, respectively. The depth of the stepped portion 34 is preferably almost equal to the height or the axial length of the head portion 30 of the fastener 18. The fastener 18 is screwed onto the hole 26 of the columnar member 24 through the stepped portion 34 and the through-hole 14.

In the eyeglasses lens-installing apparatus of the preferred embodiment shown in FIG. 3, when the fastener 18 and the columnar member 24 are fixedly connected with each other, the close-contact member 32 is locked to the stepped portion 34. Further, the head portion 30 of the fastener 18 does not project from the surface of the lens 12 and instead is accommodated in the stepped portion 34. Because the preferred embodiment shown in FIG. 3 does not have members projecting from the surface of the lens 12, the surface of the lens 12 can be cleaned more easily than the preferred embodiment shown in FIGS. 1 and 2 and is safe against a shock which may be applied to the eyeglasses.

Figure 4:
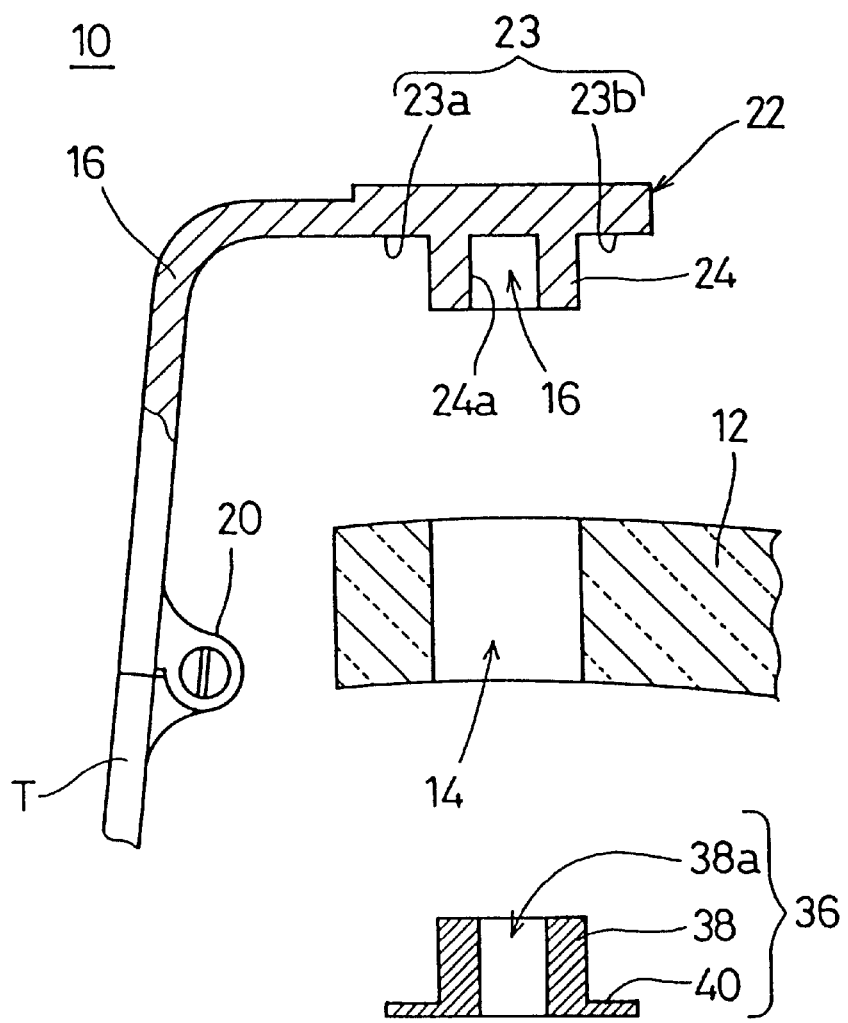
FIG. 4 is an exploded enlarged sectional view showing another modification of the eyeglasses lens-installing apparatus shown in FIGS. 1 and 2.

FIG. 4 is an exploded enlarged sectional view showing another modification of the eyeglasses lens-installing apparatus shown in FIGS. 1 and 2.

The eyeglasses lens-installing apparatus of the preferred embodiment shown in FIG. 4 is different from that of the preferred embodiment shown in FIGS. 1 and 2 in the arrangement of a close-contact member. That is, in the preferred embodiment shown in FIG. 4, a close-contact member 36 includes a substantially elliptical cylindrical bush portion 38. A substantially annular elliptical flange portion 40 projects from one end of the periphery of the bush portion 38 in the axial direction thereof. The bush portion 38 and the flange portion 40 are preferably made of a comparatively soft material and are integral with each other. The outer diameter of the bush portion 38 is preferably almost equal to or a little smaller than the diameter of the through-hole 14. The inner diameter of the bush portion 38 is preferably almost equal to the diameter of the hole 26 of the columnar member 24. When the columnar member 24 is fitted into the through-hole 14 of the lens 12 from the one main surface side thereof, the bush portion 38 is fitted into the through-hole 14 of the lens 12 from the other main surface side thereof. In this case, a hole 38a of the bush portion 38 and the hole 26 of the columnar member 24 communicate with each other. At this time, the fastener 18 is screwed onto the hole 26 of the columnar member 24 through the hole 38a of the bush portion 38.

In the eyeglasses lens-installing apparatus of the embodiment shown in FIG. 4, when the fastener 18 and the columnar member 24 are fixedly connected with each other, the bush portion 38 of the close-contact member 36 and the flange portion 40 thereof closely contact the inner peripheral surface of the through-hole 14 of the lens 12 and a part of the lens 12 positioned on the periphery of the through-hole 14, respectively. Thus, the fastener 18 and the columnar member 24 can be fixedly connected with each other more tightly in the preferred embodiment shown in FIG. 4 than in the preferred embodiments shown in FIGS. 1, 2, and 3.

Figure 5:
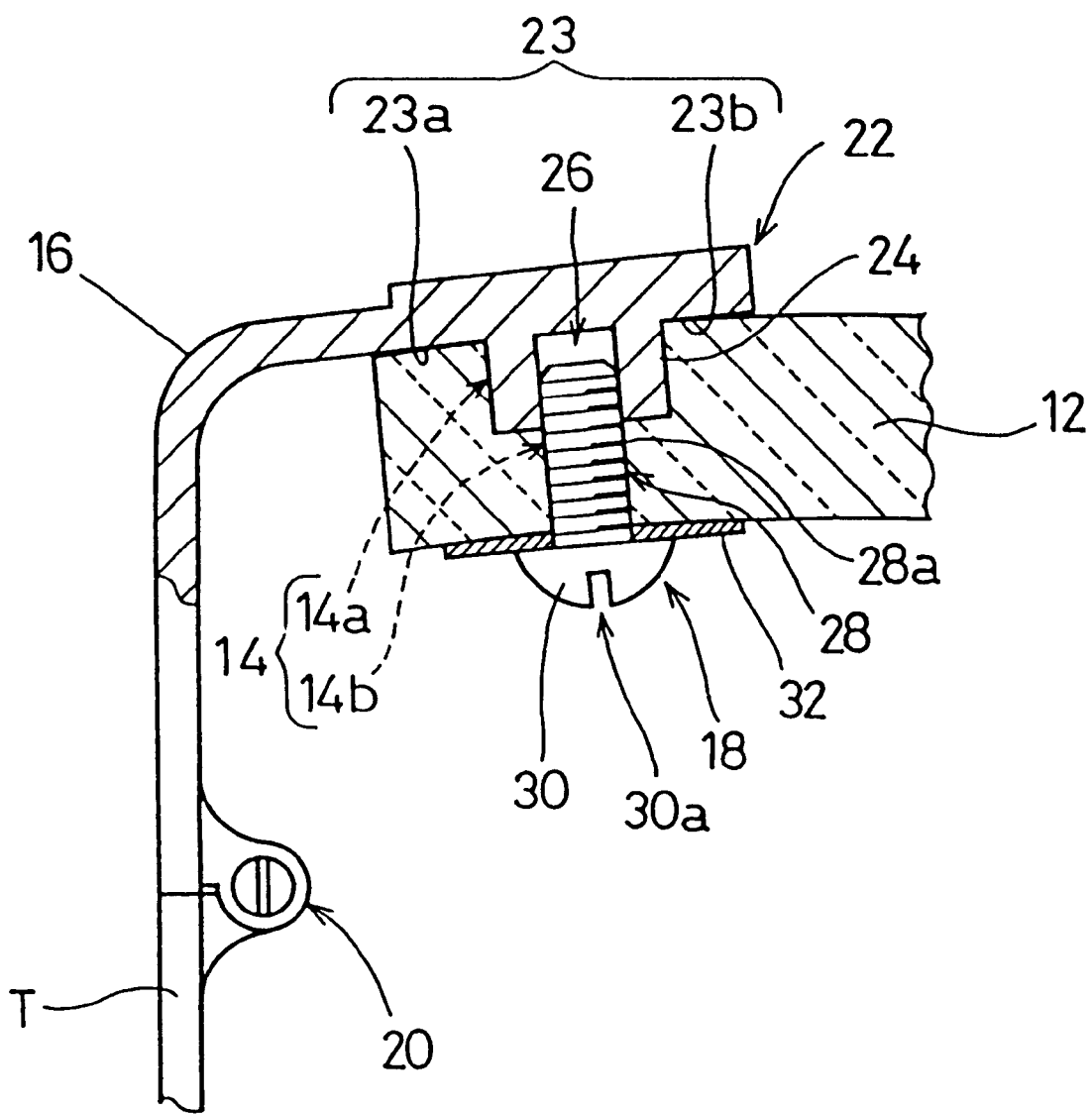
FIG. 5 is an enlarged plan view partly in section showing another example of the eyeglasses lens-installing apparatus of a preferred embodiment of the present invention.

FIG. 5 is an enlarged plan view partly in section showing another example of the eyeglasses lens-installing apparatus of the present invention. FIG. 6 is an exploded enlarged sectional view showing the eyeglasses lens-installing apparatus shown in FIG. 5.

The eyeglasses lens-installing apparatus of the preferred embodiment shown in FIG. 5 is different from that of the preferred embodiment shown in FIGS. 1 and 2 in the arrangement of the through-hole 14 of the lens 12. That is, in the preferred embodiment shown in FIGS. 5 and 6, a first hole 14a, which is substantially elliptical in plan view is formed at one end of the through-hole 14 in its axial direction. Further, a second hole 14b which is substantially circular in plan view and communicates with the first hole 14a is formed at the other end of the through-hole 14 in its axial direction. The first hole 14a preferably has a depth of about 1.5 mm in the region from one main surface side of the lens 12 to approximately the center thereof in its thickness direction. The second hole 14b is formed in the region from the center of the lens 12 in its thickness direction to its other main surface side and preferably has a diameter of about 1.4 mm.

The columnar member 24 is fitted into the first hole 14a of the through-hole 14 from the one main surface side of the lens 12. The fastener 18 is inserted into the second hole 14b from the other main surface side of the lens 12 through the close-contact member 32 formed of a washer made of a synthetic resinous material such as nylon to screw the fixing part 28 of the fastener 18 on the screw portion 24a of the columnar member 24. The outer diameter of the fixing part 28 of the fastener 18 is preferably approximately equal to or slightly smaller than the diameter of the second hole 14b. Unlike the preferred embodiments shown in FIGS. 1, 2, 3, and 4, in the eyeglasses lens-installing apparatus of the preferred embodiment shown in FIGS. 5 and 6, the columnar member 24 of the lug 16, the fixing part 28 of the fastener 18, and the lens 12 contact each other very closely. Thus, these members can not be loosened. That is, the eyeglasses lens-installing apparatus holds the lens 12 firmly and is durable.

Figure 7:
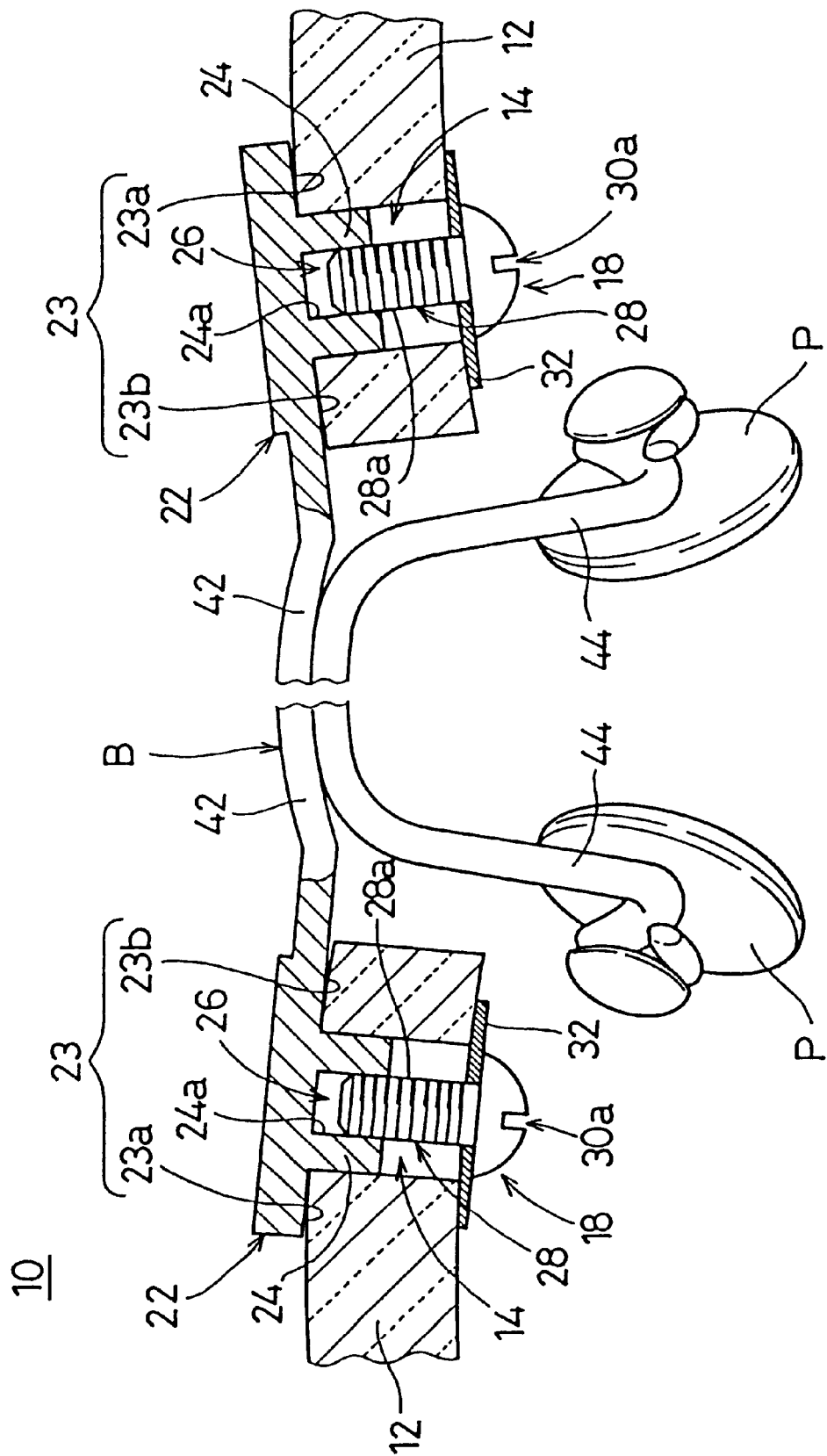
FIG. 7 is a plan view partly in section showing another example of the eyeglasses lens-installing apparatus of a preferred embodiment of the present invention.

FIG. 7 is a plan view partly in section showing another example of the eyeglasses lens-installing apparatus of the present invention. In each of the preferred embodiments described above, the eyeglasses lens-installing apparatus of the present invention is applied to the connection portion of the temple. But as shown in FIG. 7, the eyeglasses lens-installing apparatus may be applied to install the lens 12 on the bridge of the eyeglasses. That is, the eyeglasses lens-installing apparatus shown in FIG. 7 includes connection portions 42 and 42 positioned at either side of a bridge B. Pad legs 44 and 44 each having a pad P at its front end are connected with the connection portions 42 and 42, respectively. The lens-sandwiching portion 22 is disposed at the end of each of the connection portions 42. The installing apparatus for installing the lens 12 on the lens-sandwiching portion 22 is similar to that of each of the above-described preferred embodiments. The operation and effect of the installing apparatus of the preferred embodiment shown in FIG. 7 are also similar to those of each of the above-described preferred embodiments.

Figure 8:
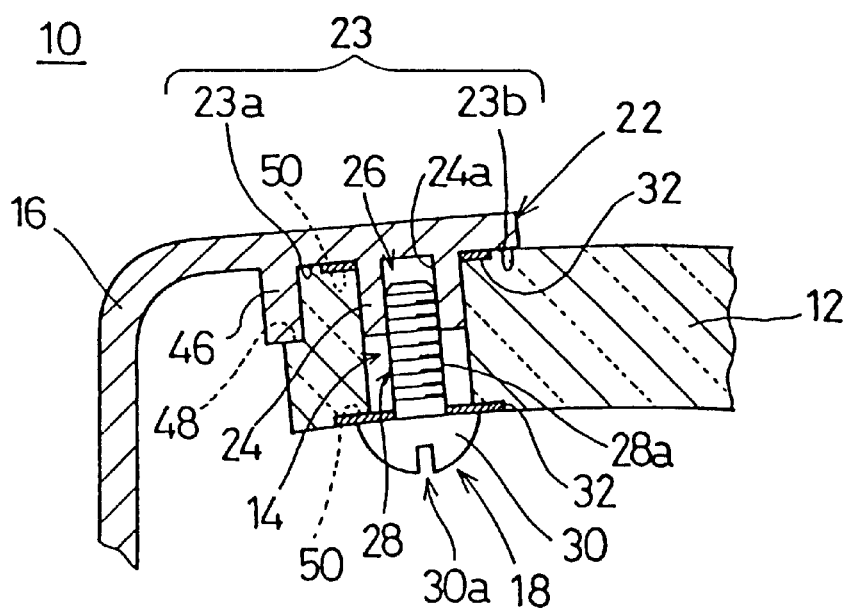
FIG. 8 is an enlarged plan view partly in section showing another example of the eyeglasses lens-installing apparatus of a preferred embodiment of the present invention.
Figure 9:
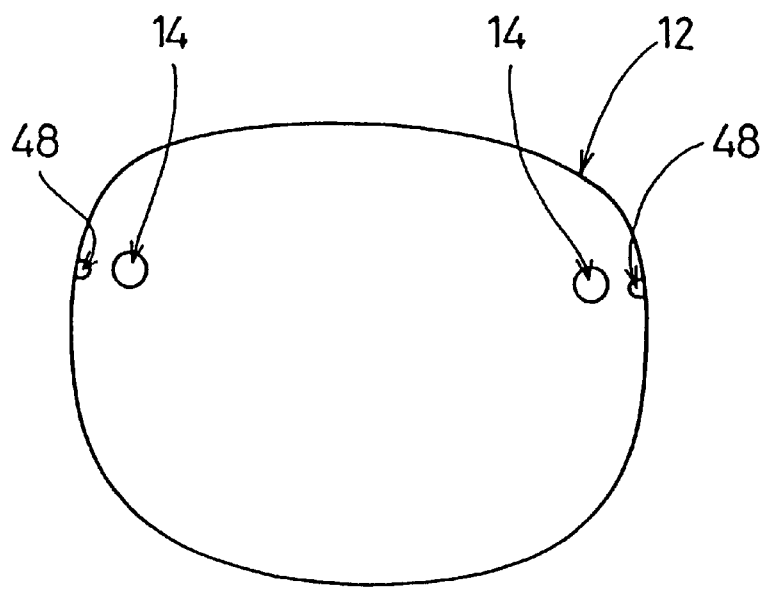
FIG. 9 is a front view showing a lens to be applied to the eyeglasses lens-installing apparatus shown in FIG. 8.

FIG. 8 is an enlarged plan view partly in section showing another example of the eyeglasses lens-installing apparatus of the present invention. FIG. 9 is a front view showing a lens to be applied to the eyeglasses lens-installing apparatus shown in FIG. 8.

Unlike each of the above-described preferred embodiments, in the preferred embodiment shown in FIGS. 8 and 9, a projection 46 including a columnar pin is disposed on one of the lens close-contact surfaces 23a of the lens sandwiching part 22. The projection 46 is positioned in the vicinity of the fixing part 28 of the fastener 18 and the columnar member 24 of the lug 16. The projection 46 extends from the lens close-contact surface 23a at a right angle with the surface of the lens 12. The projection 46 is locked to a cut-out portion 48 located at a portion of the side surface of the lens 12. The cut-out portion 48 is preferably formed by cutting off each side edge of the lens 12 so as to have a substantially U-shaped configuration, as shown in FIG. 9.

In this preferred embodiment shown in FIG. 8, a stepped portion 50 coaxial with the circular through-hole 14 of the lens 12 is provided at both ends of the through-hole 14 in its axial direction. The stepped portion 50 is disposed on the two main surfaces of the lens 12. One of the close-contact members 32 is locked to one of the stepped portions 50, with one of the close-contact members 32 installed on the periphery of the fixing part 28 of the fastener 18. The other close-contact member 32 is locked to the other stepped portion 50, with the other close-contact member 32 installed on the periphery of the columnar member 24 of the lug 16.

In the preferred embodiment shown in FIGS. 8 and 9, the lens 12 is held by the cooperation of the columnar member 24 and the fastener 18. Further, one side of the lens 12 is held by the projection 46. Thus, the lug 16 and the lens 12 contact each other in a large area, thus fixedly holding the lens 12 very securely. Further, the projection 46 is fitted in and locked to the approximately U-shaped cut-out portion 48 of the lens 12, and the close-contact member 32 is installed on the columnar member 24. Thus, the fastener 18 and the columnar member 24 can be prevented from being rotated.

Figure 10:
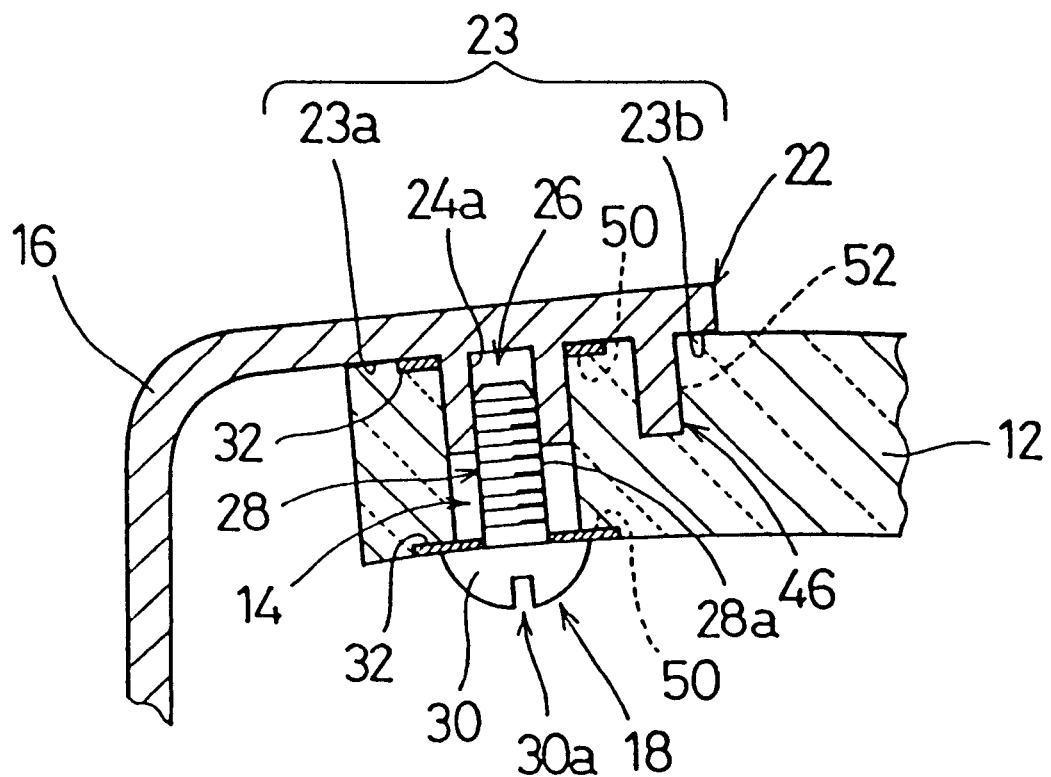
FIG. 10 is an enlarged plan view partly in section showing another example of the eyeglasses lens-installing apparatus of a preferred embodiment of the present invention.

In the preferred embodiment shown in FIGS. 8 and 9, the projection 46 is positioned at one side edge of the lens 12. But the projection 46 may be positioned on the other lens close-contact surface 23b of the lens sandwiching part 22. In this case, as shown in FIG. 10, a substantially cylindrical hole 52 which is substantially U-shaped in plan view of the lens 12 is formed in the neighborhood of the through-hole 14 of the lens 12. The projection 46 has almost the same shape as that of the hole 52 and is preferably equal to or larger than the hole 52. The projection 46 is fitted into the hole 52 and locked thereto.

Figure 11:
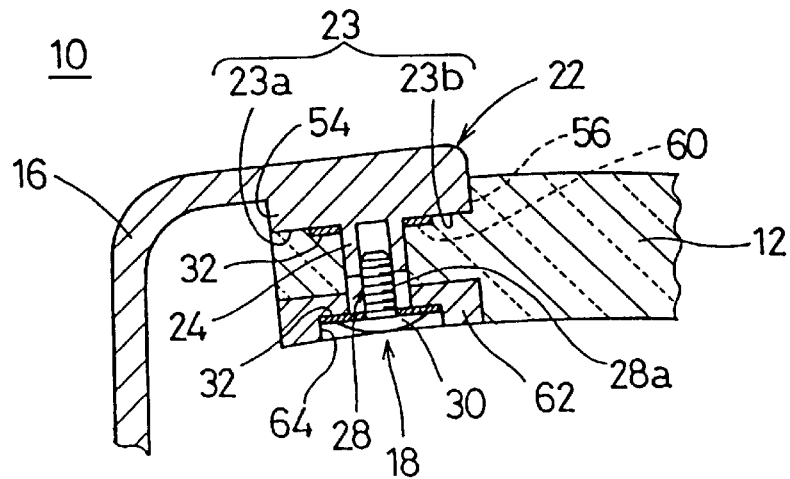
FIG. 11 is an enlarged plan view partly in section showing another example of the eyeglasses lens-installing apparatus of a preferred embodiment of the present invention.
Figure 12:
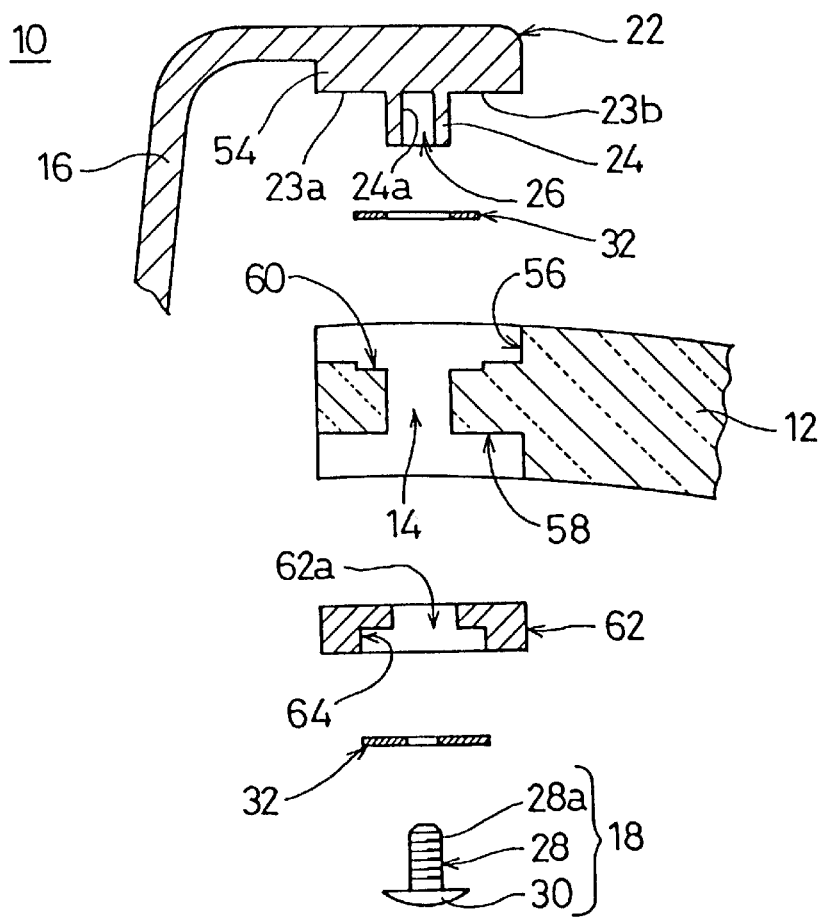
FIG. 12 is an exploded enlarged sectional view showing the eyeglasses lens-installing apparatus shown in FIG. 11.
Figure 13:
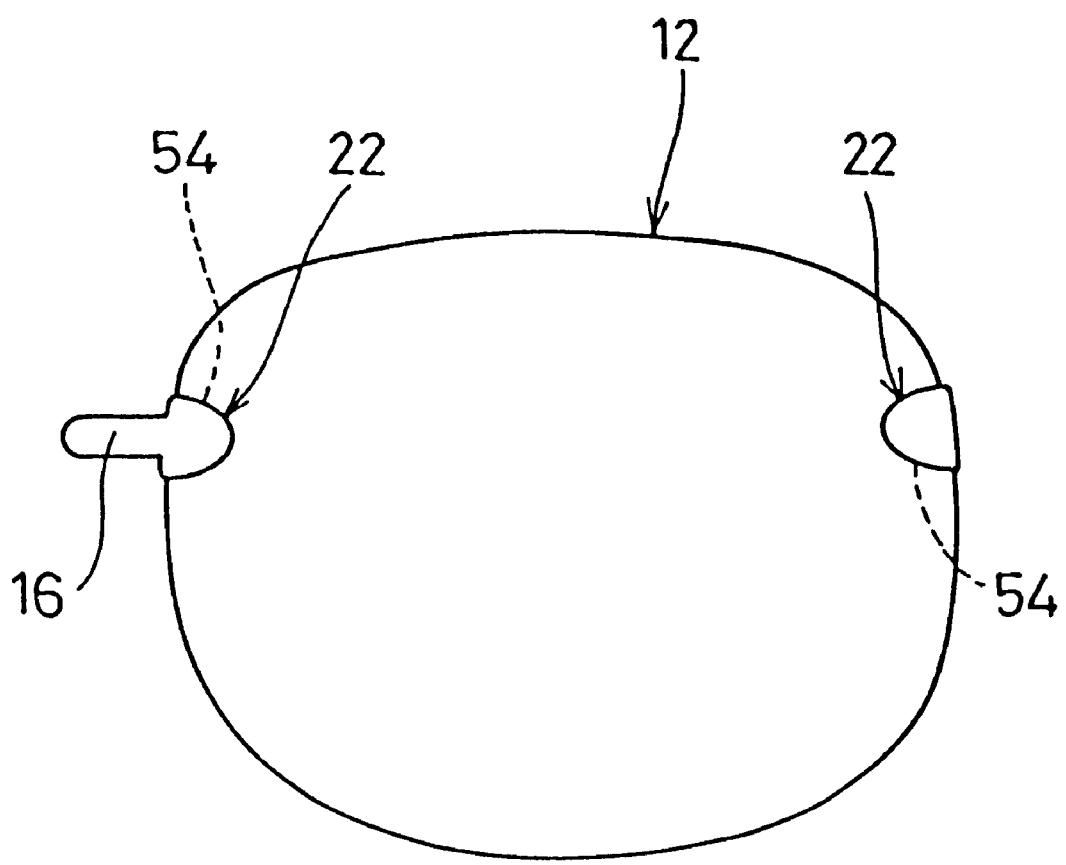
FIG. 13 is a front view showing the eyeglasses lens-installing apparatus shown in FIGS. 11 and 12.

FIG. 11 is an enlarged plan view partly in section showing another example of the eyeglasses lens-installing apparatus of the present invention. FIG. 12 is an exploded enlarged sectional view showing the eyeglasses lens-installing apparatus shown in FIG. 11. FIG. 13 is a front view showing the eyeglasses lens-installing apparatus shown in FIGS. 11 and 12.

In the preferred embodiment shown in FIGS. 11 and 12, the lens sandwiching part 22 is preferably substantially horseshoe-shaped and fitted into and locked to a stepped portion formed in the lens 12. That is, in the eyeglasses lens-installing apparatus 10 shown in FIGS. 11 and 12, the lens sandwiching part 22 of the lug 16 has a projection 54 projecting at a right angle therewith from the lens-sandwiching surface 23 toward one main surface side of the lens 12. The projection 54 is preferably substantially horseshoe-shaped and integral with the lens sandwiching part 22. The lens 12 has horseshoe-shaped stepped portions 56 and 58 coaxial with the through-hole 14 and disposed at one side of the through-hole 14 in its axial direction. A stepped portion 60 constructed to lock one of the close-contact members 32 thereto is disposed on the stepped portion 56. The columnar member 24 is inserted into the through-hole 14 of the lens 12 through the stepped portion 56, with one of the close-contact members 32 installed on the periphery of the columnar member 24. At this time, the projection 54 is fitted in the stepped portion 56, and one of the close-contact members 32 is locked to the stepped portion 60.

An annular horseshoe-shaped cover member 62 made of a synthetic resinous material is fitted into the stepped portion 58 of the lens 12. The cover member 62 preferably has a substantially circular through-hole 62a at its center. The cover member 62 preferably also has a substantially circular stepped portion 64 which is coaxial with the through-hole 62a and positioned on one main surface side thereof, namely, at the side thereof opposite to the surface thereof which confronts the other main surface of the lens 12. When the cover member 62 is fitted into the stepped portion 58 of the lens 12, the fastener 18 such as a flat fillister head screw is screwed on the screw provided on the columnar member 24. At this time, the other close-contact member 32 is installed on the periphery of the fixing part 28 of the fastener 18 and locked to the stepped portion 64.

Figure 14:
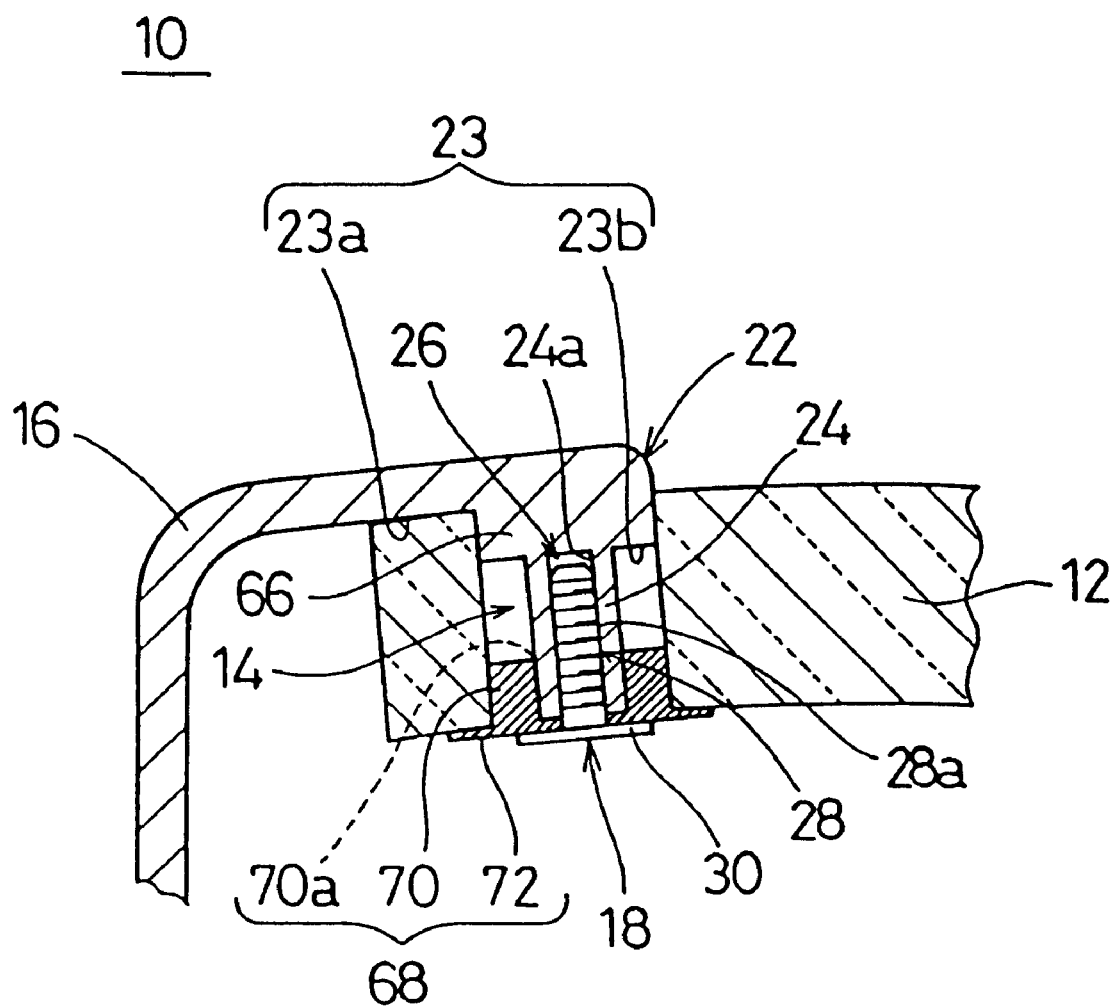
FIG. 14 is an enlarged plan view partly in section showing another example of the eyeglasses lens-installing apparatus of a preferred embodiment of the present invention.

FIG. 14 is an enlarged plan view partly in section showing another example of the eyeglasses lens-installing apparatus of the present invention.

Unlike the preferred embodiment shown in FIGS. 11, 12, and 13, the eyeglasses lens-installing apparatus of the preferred embodiment shown in FIG. 14 does not have the stepped portions 56, 58, and 60 disposed on the lens 12 and has only the through-hole 14. A substantially elliptical columnar projection 66 is preferably integral with the lens sandwiching part 22 of the lug 16. The projection 66 is fitted into the through-hole 14 of the lens 12 from one main surface side thereof. A close-contact member 68 similar to the close-contact member 36 shown in FIG. 4 is fitted into the through-hole 14 of the lens 12 from the other main surface side thereof. The close-contact member 68 includes a substantially cylindrical bush portion 70. A flange portion 72 projects outward from the periphery of one end of the bush portion 70 in its axial direction. The fixing part 28 of the fastener 18 is inserted into the hole 26 of the columnar member 24 through a hole 70a of the bush portion 70 and screwed on the screw defined on the columnar member 24.

Figure 15:
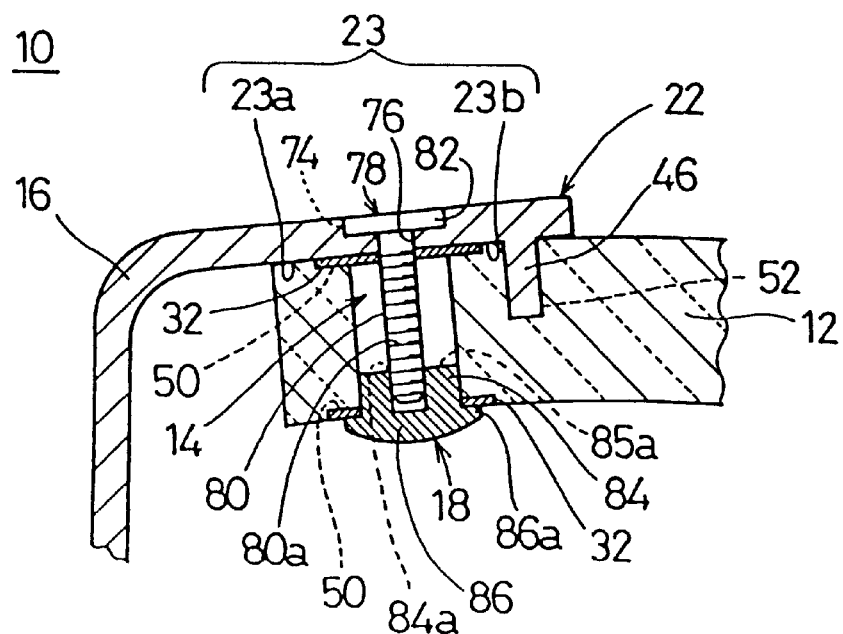
FIG. 15 is an enlarged plan view partly in section showing another example of the eyeglasses lens-installing apparatus of preferred embodiments of the present invention.

FIG. 15 is an enlarged plan view partly in section showing another example of the eyeglasses lens-installing apparatus of the present invention.

Unlike any of the above-described preferred embodiments, in the preferred embodiment shown in FIG. 15, the lug and the columnar member are separate from each other. Further, the fastener is different from those of the above-described preferred embodiments and has a function of a cover member. The preferred embodiment is described below in comparison with the preferred embodiment shown in FIG. 10. Unlike the preferred embodiment shown in FIG. 10, in the preferred embodiment shown in FIG. 15, a substantially elliptical or polygonal stepped portion 74 is provided at approximately the center of the surface (outer surface), of the lens sandwiching part 22 of the lug 16, opposite to the lens-sandwiching surface (inner surface) thereof. A substantially circular through-hole 76 communicating with the through-hole 14 of the lens 12 is provided at the center of the stepped portion 74. A columnar member 78 separate from the lug 16 is inserted into the through-hole 14 of the lens 12 through a through-hole 76 from one main surface side of the lens 12. The columnar member 78 includes a columnar fixing part 80. The fixing part 80 has a male screw portion 80a provided on the peripheral surface thereof. A head portion 82 having a shape corresponding to the shape of the stepped portion 74 is provided at one end of the fixing part 80 in its axial direction such that the head portion 82 is integral with the fixing part 80. The fixing part 80 of the columnar member 78 is inserted into the through-hole 76 of the lens sandwiching part 22, with the close-contact member 32 installed on the periphery thereof. At this time, one of the close-contact members 32 is locked to the stepped portion 50 positioned at one end of the through-hole 14 of the lens 12 in its axial direction, similarly to the preferred embodiment shown in FIGS. 8 and 10.

The fastener 18 is inserted into the through-hole 14 of the lens 12 from the other main surface side of the through-hole 14. The fastener 18 includes a columnar bush portion 84. The bush portion 84 has a substantially concave portion 84a which functions as the fixing part. A substantially arch-shaped head portion 86 having a flange portion 86a located in the periphery thereof is formed integrally with one end of the bush portion 84 in its axial direction. A screw portion 85a including a female threaded portion to be screwed on the screw portion 80a of the fixing part of the columnar member 78 is defined on the inner peripheral surface of the concave portion 84a of the bush portion 84. Thus, when the fastener 18 is fitted into the through-hole 14 of the lens 12, the other close-contact member 32 is locked to the stepped portion 50 positioned at the other end of the through-hole 14 of the lens 12 in its axial direction. At this time, the screw portion 85a of the bush portion 84 and the screw portion 80a of the columnar member 78 are screwed onto each other. Consequently, the columnar member 78 and the fastener 18 are fixedly connected with each other.

In the preferred embodiment shown in FIG. 15, the bush portion 84 of the fastener 18 also functions as a cover member closing the space between the fixing part 80 of the columnar member 78 and the inner peripheral surface of the through-hole 14 of the lens 12. Because the head portion 82 of the columnar member 78 is substantially elliptical or polygonal, the columnar member 78 can be prevented from being rotated together with the fastener 18.

Figure 16:
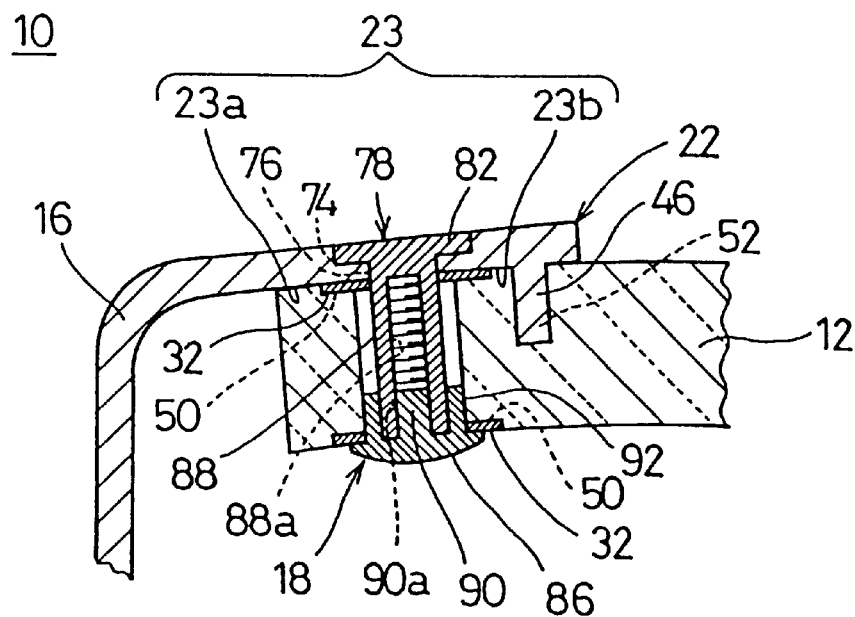
FIG. 16 is an enlarged plan view partly in section showing another example of the eyeglasses lens-installing apparatus of preferred embodiments of the present invention.

FIG. 16 is an enlarged plan view partly in section showing another example of the eyeglasses lens-installing apparatus of the present invention.

The preferred embodiment shown in FIG. 16 is different from the preferred embodiment shown in FIG. 15 in that the columnar member is substantially cylindrical and in that the fixing part of the fastener is convex. That is, in the preferred embodiment shown in FIG. 16, the columnar member 78 includes a fixing part 88, and a screw portion 88a including a female threaded portion is provided on the inner peripheral surface of the fixing part 88.

The fastener 18 includes a columnar projection 90. The projection 90 has on its peripheral surface a screw portion 90a including a male screw which is screwed on the female threaded portion 88a. Similarly to the preferred embodiment shown in FIG. 15, the projection 90 is integral with the head portion 86 having the flange portion 86a disposed on the periphery thereof. An annular bush portion 92 is projectingly arranged on the periphery of the projection 90 such that the bush portion 92 is substantially perpendicular to the upper surface of the head portion 86. The head portion 86, the projection 90, and the bush portion 92 are integral with one another and are preferably made of a comparatively soft material such as a synthetic resinous material, rubber or the like.

In the preferred embodiment shown in FIG. 16, when the columnar member 78 and the fastener 18 are fixedly connected with each other, the bush portion 92 of the fastener 18 closes the space between the through-hole 14 of the lens 12 and the fixing part 88 of the columnar member 78. Thus, the fastener 18 is allowed to contact the surface of the lens 12 very closely.

Figure 17:
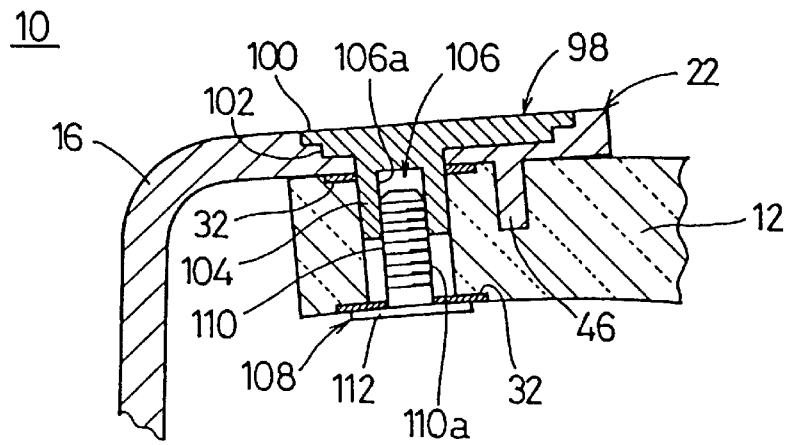
FIG. 17 is an enlarged plan view partly in section showing another example of the eyeglasses lens-installing apparatus of preferred embodiments of the present invention.
Figure 18:
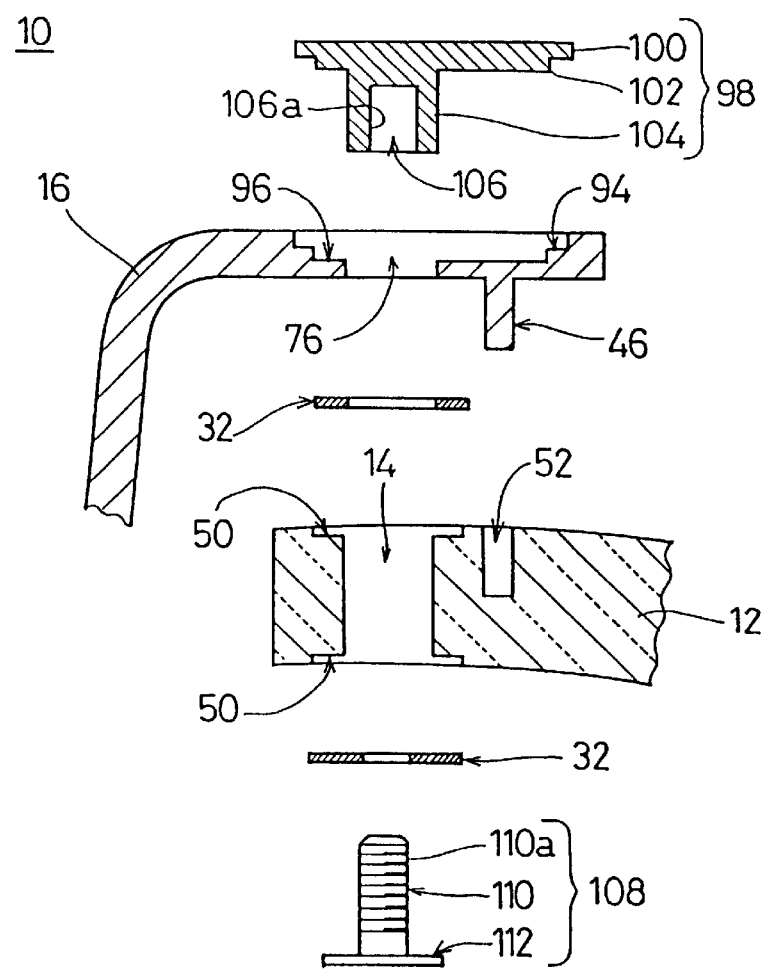
FIG. 18 is an exploded enlarged sectional view showing the eyeglasses lens-installing apparatus shown in FIG. 17.

FIG. 17 is an enlarged plan view partly in section showing another example of the eyeglasses lens-installing apparatus of the present invention. FIG. 18 is an exploded enlarged sectional view showing the eyeglasses lens-installing apparatus shown in FIG. 17.

The preferred embodiment shown in FIG. 17 is different from the preferred embodiment shown in FIG. 16 in that a stepped portion 94 having a polygonal shape, for example, a square, is provided along approximately the entire surface (outer surface), of the lens sandwiching part 22 of the lug 16, opposite to the lens-sandwiching surface (inner surface) 23. A stepped portion 96 which preferably has a smaller size than the stepped portion 94 is disposed on the stepped portion 94. The stepped portions 94 and 96 communicate with the through-hole 14 of the lens 12. An insertion tool 98 is inserted into the stepped portions 94 and 96 and the through-hole 14 and fitted therein.

The insertion tool 98 has a head portion 100. The head portion 100 includes a flange portion 102 whose outer shape corresponds to that of the stepped portions 94 and 96. A columnar member 104 to be inserted into the through-hole 14 of the lens 12 is provided on the flange portion 102. The columnar member 104 has a hole 106 at its center and is formed integrally with the flange portion 102. A screw portion 106a including a threaded portion is provided on the inner peripheral surface of the hole 106.

When the head portion 100 of the insertion tool 98 and the columnar member 104 are inserted and fitted into the stepped portions 94 and 96 and the through-hole 14, respectively, from one main surface side of the lens 12, the flange portion 102 of the head portion 100 is tightly fitted in and locked to the stepped portions 94 and 96 of the lens sandwiching part 22 of the lug 16. The columnar member 104 is locked to one of the stepped portions 50 positioned at one end of the through-hole 14 of the lens 12 in its axial direction, with one of the close-contact members 32 installed on the periphery of the columnar member 104.

A fastener 108 is inserted into the through-hole 14 from the other main surface side of the lens 12. The fastener 108 preferably includes a columnar fixing part 110. The fixing part 110 has a screw portion 110a including a male screw on the peripheral surface thereof and is integral with the head portion 112. The fastener 108 is inserted into the through-hole 14 of the lens 12, with the close-contact member 32 installed on the periphery of the fixing part 110. At this time, the screw portion 110a of the fixing part 110 is screwed on the screw portion 106a of the columnar member 104. As a result, the insertion tool 98 and the fastener 108 are fixedly connected to each other.

In the preferred embodiment shown in FIGS. 17 and 18, the entire head portion 100 of the insertion tool 98 is polygonal, for example, square, and locked to the stepped portions 94 and 96, of the lug 16, having shapes which correspond to the shape of the head portion 100. Therefore, the insertion tool 98 can be prevented from being rotated together with the fastener 18.

Figure 19:
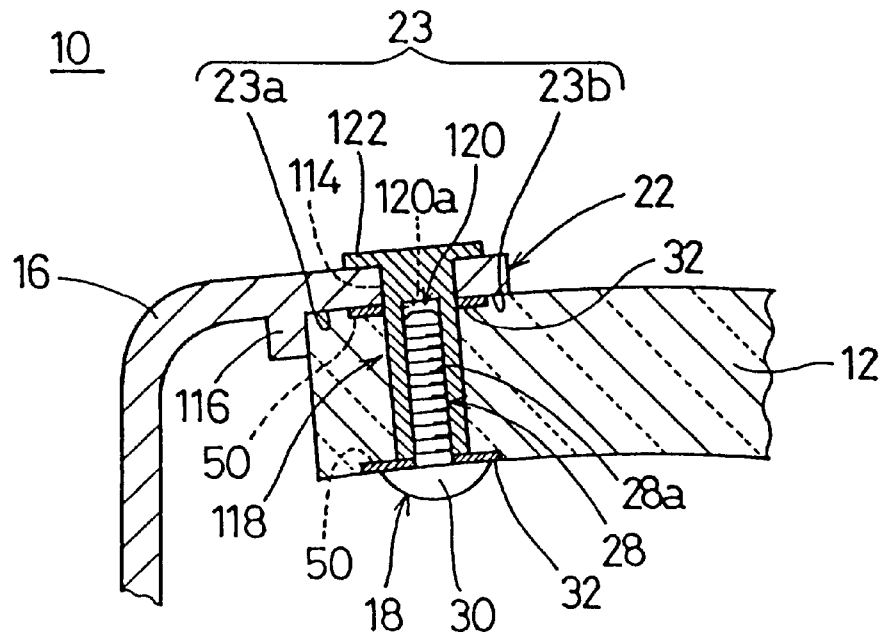
FIG. 19 is an enlarged plan view partly in section showing another example of the eyeglasses lens-installing apparatus of preferred embodiments of the present invention.
Figure 20:
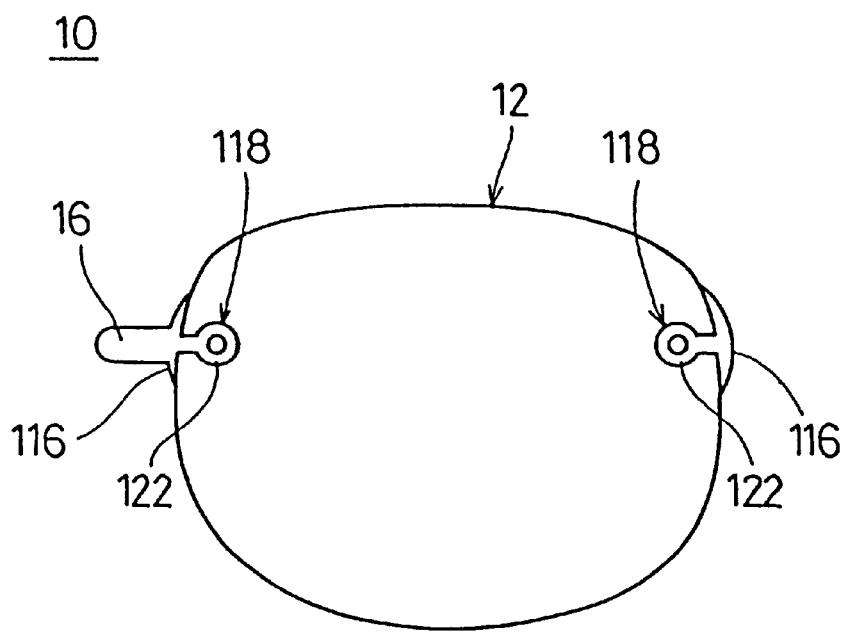
FIG. 20 is a main parts-depicted front view showing the eyeglasses lens-installing apparatus shown in FIG. 19.

FIG. 19 is an enlarged plan view partly in section showing another example of the eyeglasses lens-installing apparatus of the present invention. FIG. 20 is a main parts-depicted front view showing the eyeglasses lens-installing apparatus shown in FIG. 19.

Unlike the preferred embodiments shown in FIGS. 8 and 9, the eyeglasses lens-installing apparatus of the preferred embodiment shown in FIGS. 19 and 20 has the columnar member which is separate from the lug and a supporting piece supporting a part of the peripheral surface of the lens 12. That is, in the preferred embodiment shown in FIGS. 19 and 20, the lug 16 has a substantially elliptical through-hole 114 in the vicinity of the front end of the lens sandwiching part 22. The through-hole 114 of the lug 16 is preferably substantially elliptical and its size is almost equal to that of the through-hole 14 so that the through-hole 114 communicates with the through-hole 14 of the lens 12. A supporting piece 116 supporting a part of the peripheral surface of the lens 12 is provided on the lug 16 such that the supporting piece 116 is positioned near the through-hole 114. The supporting piece 116 is gradually curved, namely, bow-shaped along the peripheral surface of the lens 12. An insertion tool 118 separate from the lug 16 is inserted into the through-hole 14 of the lens 12 from one main surface side thereof through the through-hole 114 of the lug 16.

The insertion tool 118 preferably includes a columnar member 118. The columnar member 118 has a hole 120 formed approximately at its center. A screw portion 120a including a female threaded portion is defined on the inner peripheral surface of the hole 120. A substantially circular flange portion 122 is provided at one end of the columnar member 118 in the axial direction thereof such that the flange portion 122 projects outward from the periphery of the columnar member 118. The columnar member 118 is integral with the flange portion 122. The length of the columnar member 118 in its axial direction is preferably slightly less than the sum of the depth of the through-hole 114 of the lug 16 and that of the of through-hole 14 of the lens 12.

The fastener 18 is inserted into the hole 12 of the columnar member 118 from the other main surface side of the lens 12. At this time, the screw portion 28a of the fixing part 28 of the fastener 18 is screwed on the screw portion 118a of the columnar member 118. As a result, the insertion tool 118 and the fastener 18 are connected to each other. When the insertion tool 118 is inserted into the through-hole 114 of the lug 16, the supporting piece 116 of the lug 16 presses and supports a part of the peripheral surface of the lens 12. Thus, the lens 12 can be firmly held on the eyeglasses lens-installing apparatus by the cooperation of the insertion tool 118, the fastener 18, and the supporting piece 116.

Figure 21:
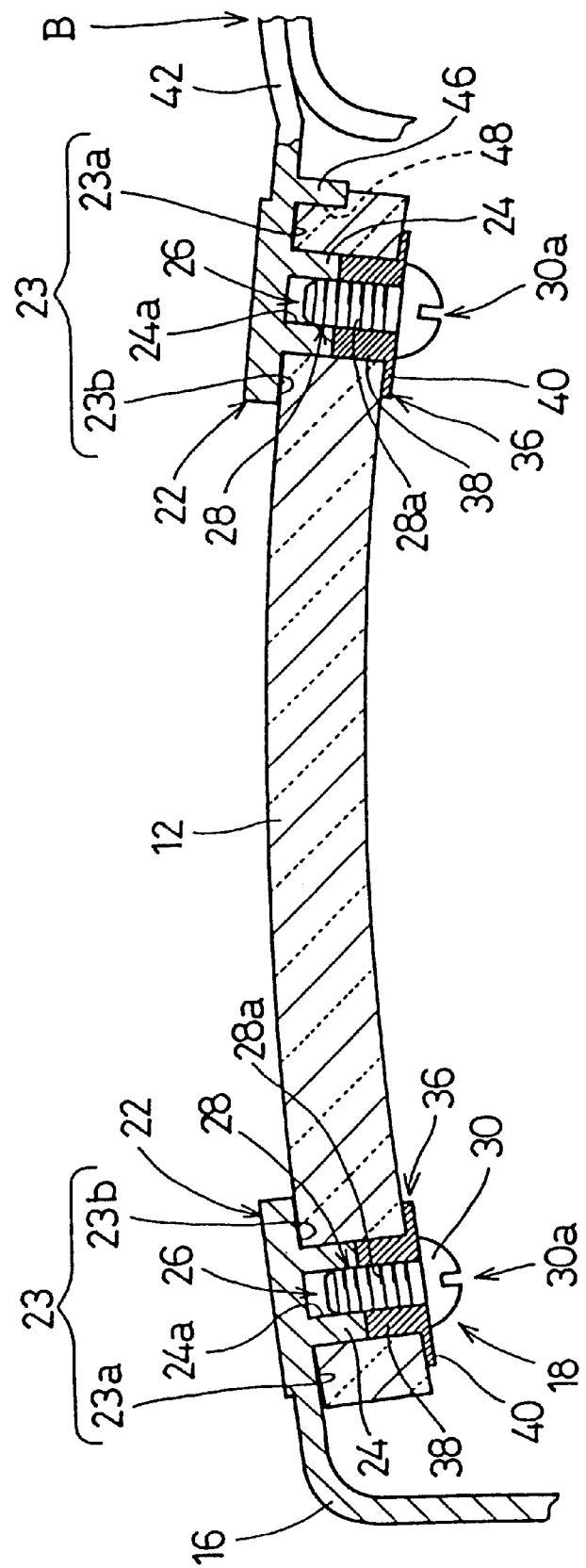
FIG. 21 is an enlarged plan view partly in section showing another example of the eyeglasses lens-installing apparatus of the present invention.
Figure 22:
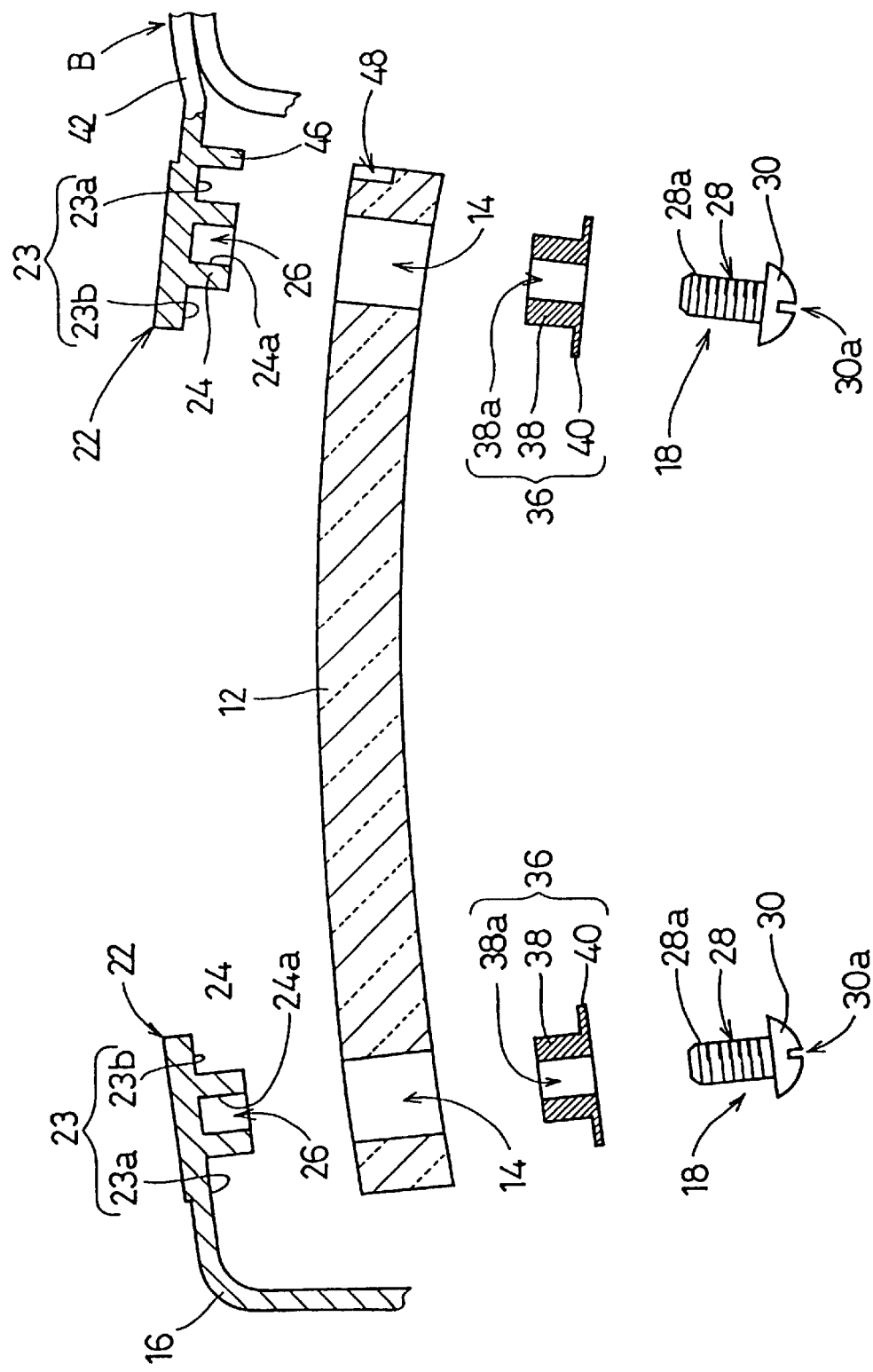
FIG. 22 is an exploded enlarged sectional view showing the eyeglasses lens-installing apparatus shown in FIG. 21.
Figure 23:
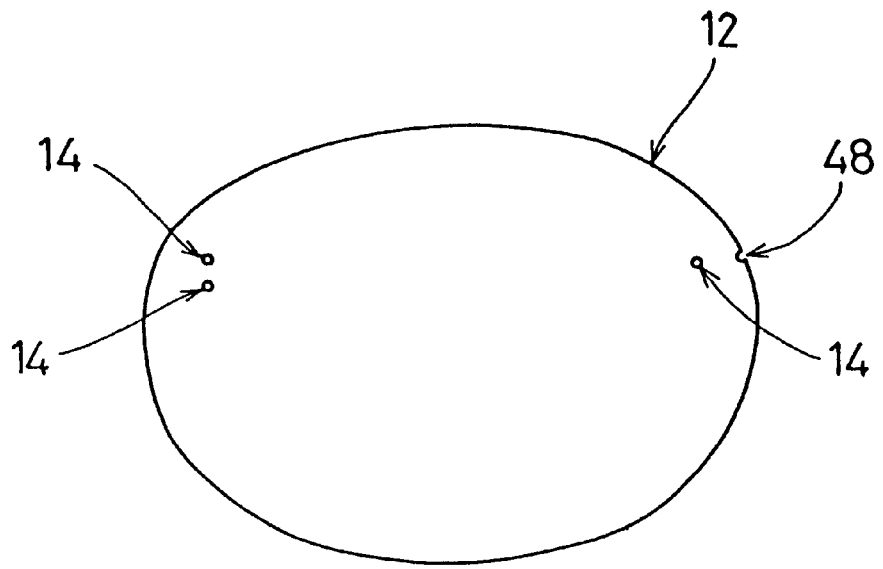
FIG. 23 is a front view showing a lens to be applied to the eyeglasses lens-installing apparatus shown in FIGS. 21 and 22.
Figure 24:
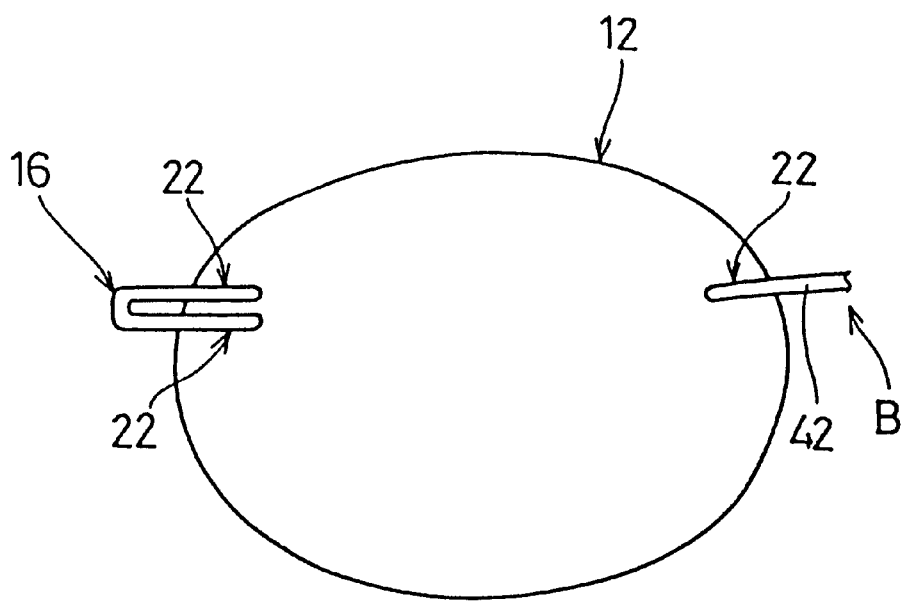
FIG. 24 is a front view showing the eyeglasses lens-installing apparatus shown in FIGS. 21 and 22.

FIG. 21 is an enlarged plan view partly in section showing another example of the eyeglasses lens-installing apparatus of the present invention. FIG. 22 is an exploded enlarged sectional view showing the eyeglasses lens-installing apparatus shown in FIG. 21. FIG. 23 is a front view showing a lens to be applied to the eyeglasses lens-installing apparatus shown in FIGS. 21 and 22. FIG. 24 is a front view showing the eyeglasses lens-installing apparatus shown in FIGS. 21 and 22.

Unlike any of the above-described preferred embodiments, in the preferred embodiment shown in FIGS. 21 through 24, the lug 16 has two lens sandwiching parts 22, and a lens-connecting portion of the frame at its bridge side has one lens sandwiching part 22 having the projection 46 similar to the preferred embodiment shown in FIGS. 8 and 9. That is, in the eyeglasses lens-installing apparatus shown in FIGS. 21 through 24, one lens sandwiching part 22 is integral with the lug 16 such that the two lens sandwiching parts 22 are positioned forward from the front end of the lug 16 and spaced by a predetermined distance. Each of the lens sandwiching parts 22 preferably has one columnar member 24. A substantially circular or elliptical through-hole 14 is provided on a portion of the lens 12 opposed to the columnar member 24. The two through-holes 14 are spaced by a predetermined distance in the widthwise direction (vertical direction) of the lens 12. A cut-out portion 48 which is preferably substantially rectangular in section is located on a portion of the peripheral surface of the bridge-positioned side of the lens 12. A substantially circular or elliptical through-hole 14 is formed in the lens 12 such that the through-hole 14 is positioned in the vicinity of the cut-out portion 48.

The two columnar members 24 of the lug 16 (temple side) and one bridge-side columnar member 24 of the lens-connecting portion of the frame at the bridge side are fitted into the two through-holes 14 at the lug side and one through-hole 14 at the bridge side, respectively from one main surface side of the lens 12. At this time, the projection 46 of the lens sandwiching part 22 at the bridge side is locked to the cut-out portion 48 disposed on the lens 12 at its bridge side. Similarly to the preferred embodiment shown in FIG. 4, from the other main surface side of the lens 12, the fastener 18 is inserted into the hole 26 of each columnar member 24 through the close-contact member 36 including the bush portion 38 and the flange portion 40. As a result, the screw portion 28a of each fastener 18 is screwed on the screw portion 24a of each columnar member 24. Thus, the temple side of the lens 12 is held by the two columnar members 24 of the lug 16 and the two fasteners 18, while the bridge side of the lens 12 is held by one columnar member 24, one fastener 18, and one projection 46.

As described above, the eyeglasses lens-installing apparatus of the preferred embodiment shown in FIGS. 21 through 24 is capable of holding the lens-connecting portion of the frame at its lug side and the lens-connecting portion of the frame at its bridge side to a greater extent than the eyeglasses lens-installing apparatus of the preferred embodiments shown in FIGS. 4, 7, 8, and 9. Thus, the eyeglasses lens-installing apparatus of the preferred embodiment shown in FIGS. 21 through 24 is more capable of preventing the lens 12 from becoming loose.

In each of the above-described preferred embodiments, the through-holes 14 of the lens 12 are preferably substantially circular, elliptical, and horseshoe-shaped when they are viewed from the front side of the lens. However, the through-holes may be polygonal, for example, substantially square, substantially rectangular, substantially rhombic or the like. Further, the shape of the columnar member which is inserted into the through-hole of the lens or fitted therein may be polygonal, for example, substantially square, substantially rectangular, substantially rhombic or the like. Furthermore, the length of the columnar member in its axial direction, its thickness, diameter, the length of its major axis, the length of its minor axis may be appropriately altered according to the kind, size, shape, and material of lens; and according to the kind, size, shape, material, position of the lug and the bridge, and other conditions. In each of the above-described preferred embodiments, the major axis of each substantially elliptical through-hole 14 of the lens 12 is preferably substantially parallel to the lengthwise direction of the lens 12. That is, the substantially elliptical through-hole 14 of the lens 12 is substantially horizontal when the lens 12 is viewed from the front side. But the substantially elliptical through-hole 14 of the lens 12 may be substantially vertical when the lens 12 is viewed from the front side.

Figure 25:
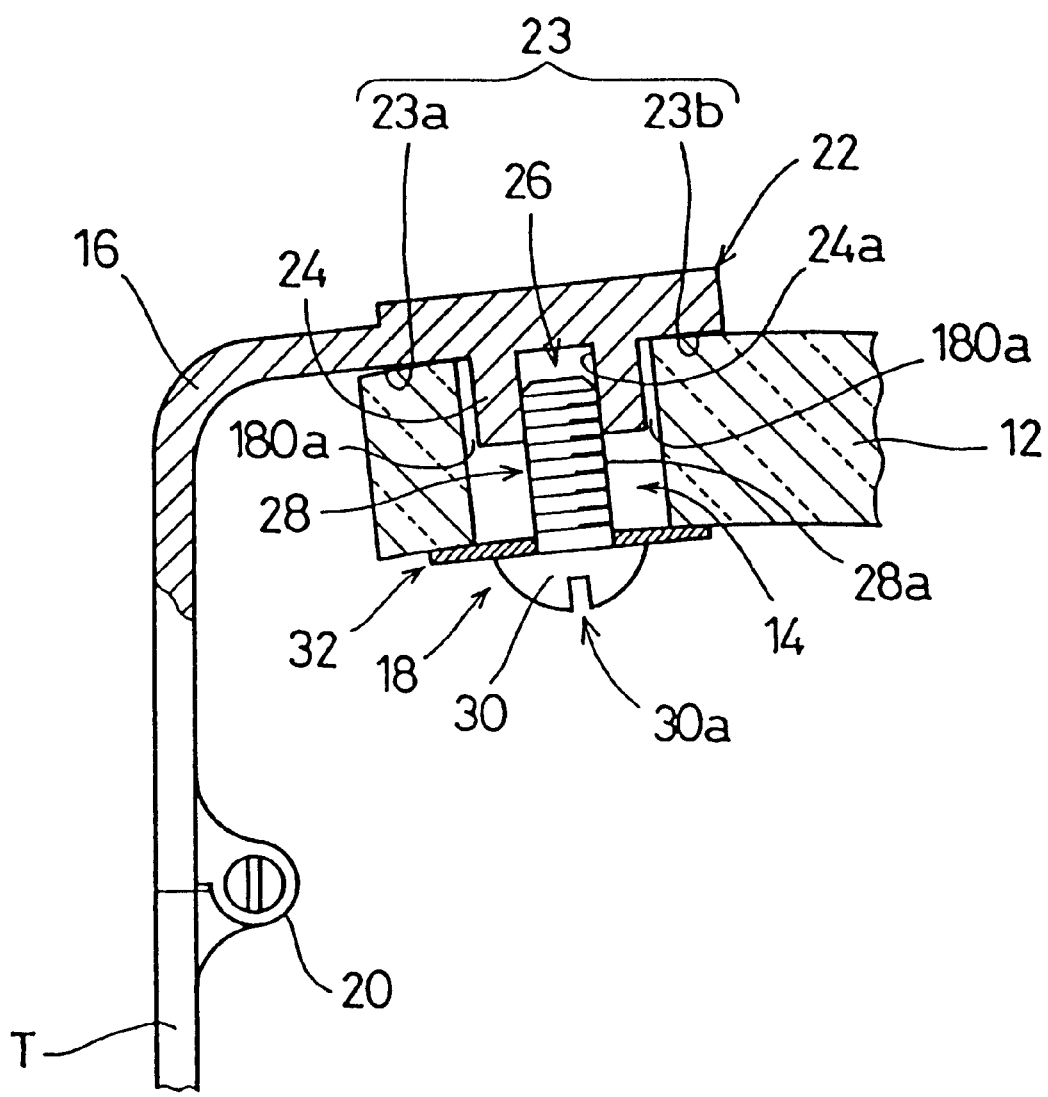
FIG. 25 is an enlarged plan view partly in section showing another example of the eyeglasses lens-installing apparatus of a preferred embodiment of the present invention.
Figure 26:
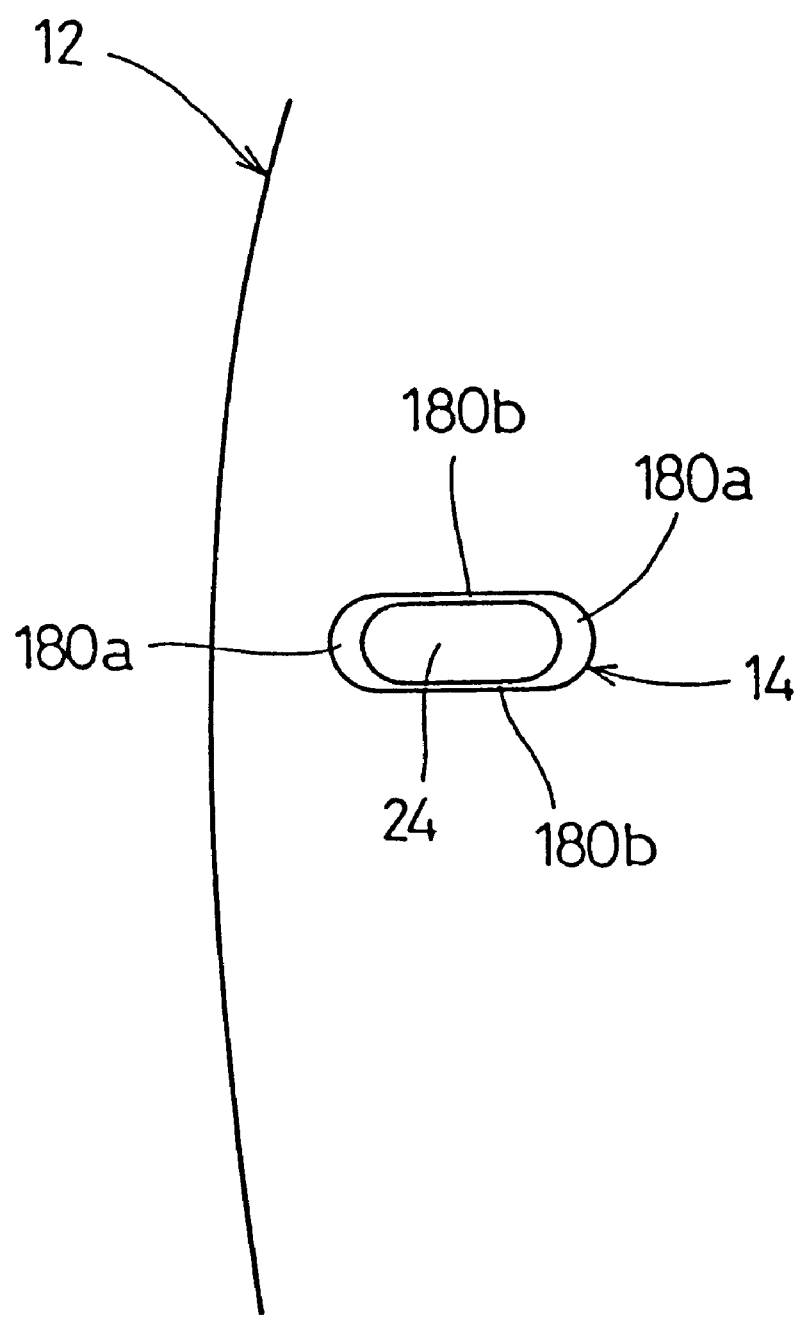
FIG. 26 is a front view showing main parts of the eyeglasses lens-installing apparatus shown in FIG. 25.

FIG. 25 is an enlarged plan view partly in section showing another example of the eyeglasses lens-installing apparatus of the present invention. FIG. 26 is a front view showing main parts of the eyeglasses lens-installing apparatus shown in FIG. 25.

In an eyeglasses lens-installing apparatus 10 shown in FIGS. 25 and 26, a tolerance region including gaps 180a and 180b is defined between the substantially elliptical columnar member 24 and the substantially elliptical through-hole 14 into which the columnar member 24 is inserted. The gap 180a is defined at the end of the major axis side of the columnar member 24, whereas the gap 180b is defined at the end of the minor axis side of the columnar member 24. The length of the substantially elliptical through-hole 14 in its major axis direction is preferably greater than that of the columnar member 24 in its major axis direction. The length of the substantially elliptical through-hole 14 in its minor axis direction is preferably greater than that of the columnar member 24 in its minor axis direction. The gap 180a having a predetermined length is arranged such that the columnar member 24 is movable in the major axis direction of the through-hole 14.

In the eyeglasses lens-installing apparatus 10 of the above-described preferred embodiments, the through-hole 14 formed in the lens 12 is substantially equal to or slightly larger than the columnar member 24. Thus, the columnar member 24 is tightly fitted in the through-hole 14 of the lens 12. When pivotal motions of the right and left temples T and that of the lug 16 of the eyeglasses are repeated, the columnar member 24 applies a pressure to the lens 12 at the through-hole 14. Consequently, the lens 12 may be damaged.

Unlike the eyeglasses lens-installing apparatus 10 of the above-described preferred embodiments, in the eyeglasses lens-installing apparatus 10 of the preferred embodiment shown in FIGS. 25 and 26, the tolerance region is defined between the substantially elliptical columnar member 24 and the through-hole 14 of the lens 12, as described above. Thus, when the pivotal motions of the right and left temples T of the glasses and that of the lug 16 are repeated, the columnar member 24 is movable in the tolerance portion. That is, the lens 12 is not pressed. Accordingly, the lens 12 can be prevented from being damaged.

Figure 27:
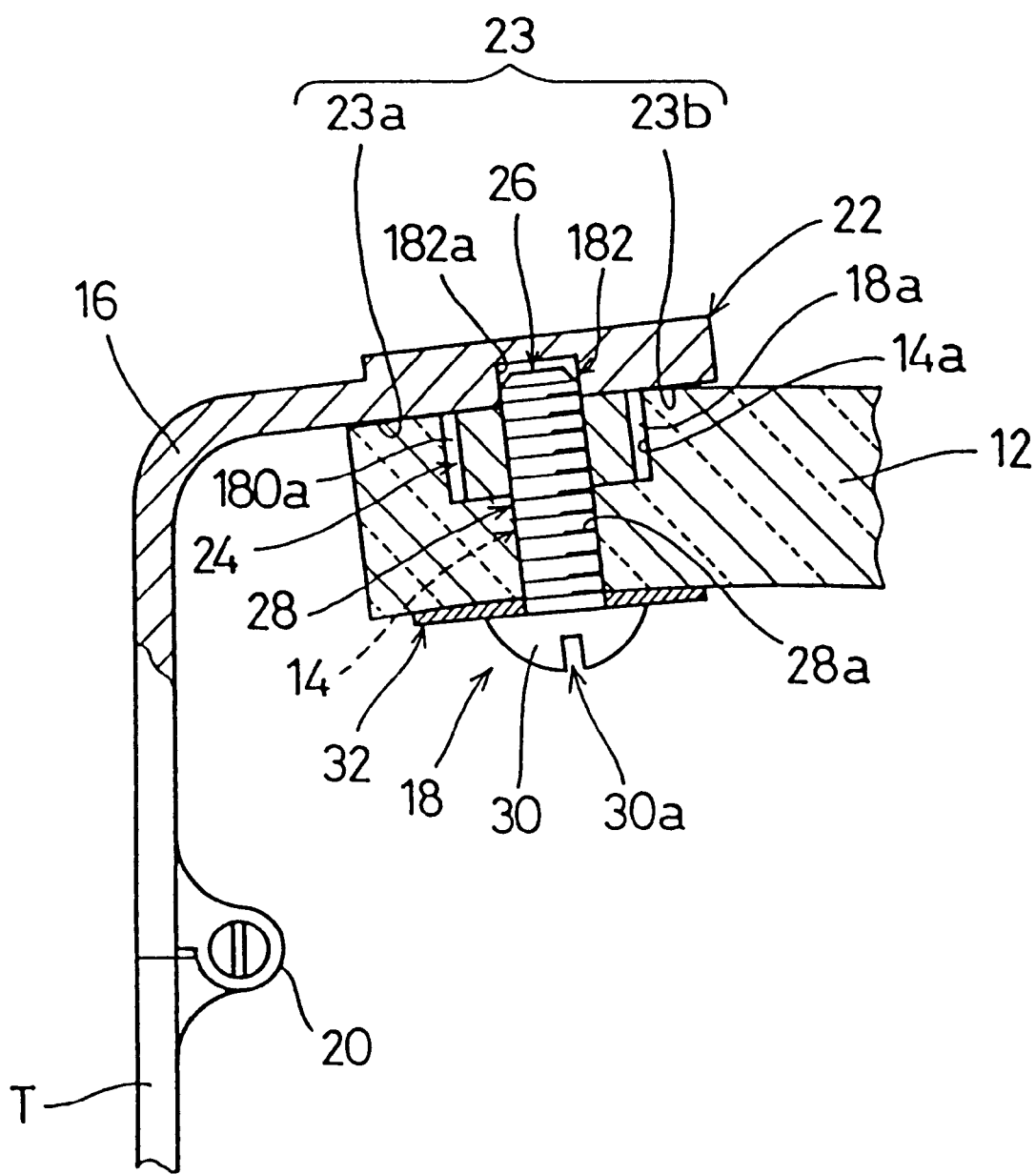
FIG. 27 is an enlarged plan view partly in section showing another example of the eyeglasses lens-installing apparatus of preferred embodiments of the present invention.

FIG. 27 is an enlarged plan view partly in section showing another example of the eyeglasses lens-installing apparatus of the present invention. FIG. 28 is a flow chart showing the method of connecting a lens sandwiching part and a columnar member of the eyeglasses lens-installing apparatus shown in FIG. 27 with each other by enlarging main parts thereof.

In the eyeglasses lens-installing apparatus 10 shown in FIG. 27, the length of the screw portion 28a of the fixing part 28 of the fastener 18 is preferably longer than that of the screw portions 28a of the above-described preferred embodiments. That is, in the preferred embodiment shown in FIGS. 27 and 28, a fixing part 182 is provided on the lens sandwiching part 22 of the lug 16. The front end of the fixing part 28 of the fastener 18 is inserted into the fixing part 182 and fixed thereto. The fixing part 182 has a screw portion 182a which is continuous with the screw portion 24a of the columnar member 24 and screwed on the screw portion 28a of the fixing part 28 of the fastener 18.

With reference to FIGS. 28(A) through 28(E), description is made below based on an example of the method of connecting the lens sandwiching part 22 of the lug 16 and the columnar member 24 of the eyeglasses lens-installing apparatus shown in FIG. 27.

Figure 28A:
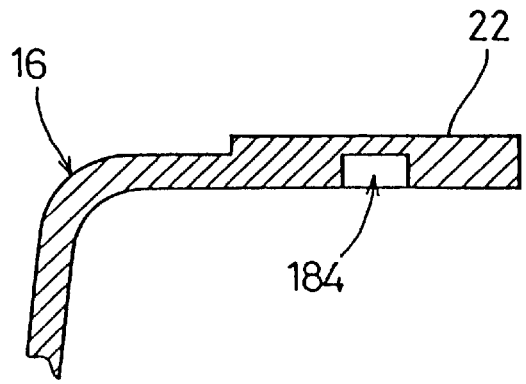
FIGS. 28(A–E) are a flow chart showing the method of connecting a lens sandwiching part and a columnar member of the eyeglasses lens-installing apparatus shown in FIG. 27 with each other by enlarging main parts thereof.
Figure 28B:
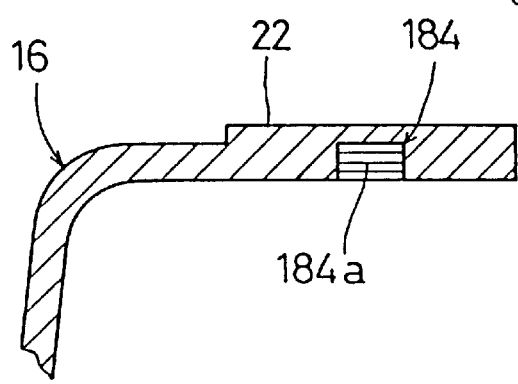
Figure 28C:
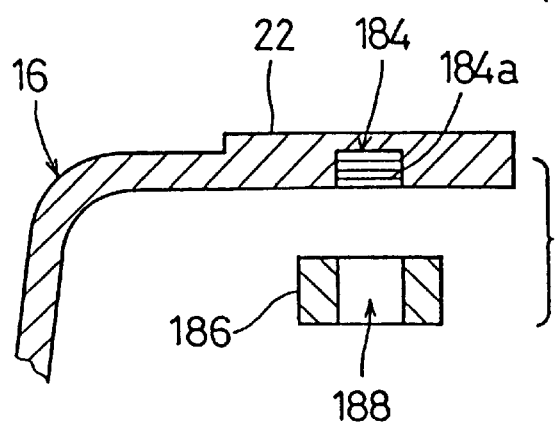

First, as shown in FIG. 28(A), a columnar hole 184 which is coaxial with the columnar member 24 is provided on the lens sandwiching part 22 of the lug 16. The front side of the fixing part 28 of the fastener 18 is inserted into the columnar hole 184. As shown in FIG. 28(B), a screw portion 184a is disposed on the inner peripheral surface of the hole 184. The screw portion 184a is continuous with the screw portion 24a of the columnar member 24 and screwed on the screw portion 28a of the fixing part 28.

Figure 28D:
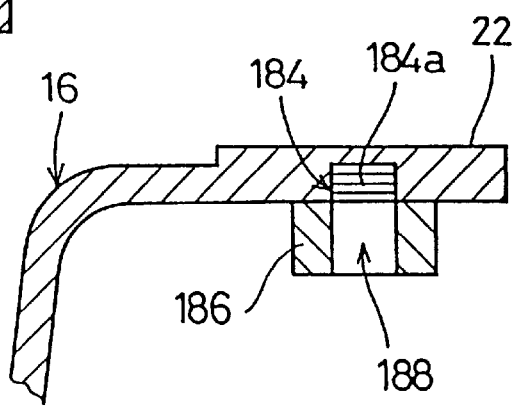
Figure 28E:
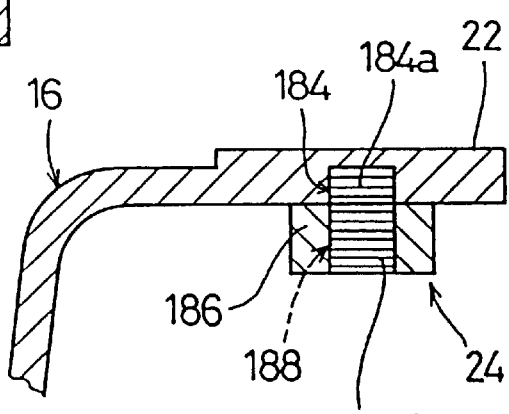

A columnar member 186 which defines the columnar member 24 is prepared. The columnar member 186 has approximately at its center an insertion hole 188 into which the fixing part 28 is inserted. As shown in FIG. 28(D), using a fixing element such as solder, the columnar member 186 is fixed to the periphery of the hole 184 defined on the lens sandwiching part 22. Then, as shown in FIG. 28(E), a screw portion 188a which is continuous with the screw portion 184a of the hole 184 of the lens sandwiching part 22 is disposed on the inner peripheral surface of the insertion hole 188 of the columnar member 186.

In the eyeglasses lens-installing apparatus 10 of the preferred embodiment shown in FIG. 27, the length of the fixing part 28 of the fastener 18 is preferably greater than the length of the fixing part 28 of the fastener 18 of the eyeglasses lens-installing apparatus of the preferred embodiment shown in FIGS. 1 and 2 by the length of the screw portion 184a of the hole 184 of the lens sandwiching part 22. In this case, the screwing length of the fixing part 28 is large because the screw portion 28a of the fixing part 28 is screwed on the screw portion 24a of the columnar member 24 and the screw portion 184a of the hole 184 of the lens sandwiching part 22. Thus, the fastener 18 can be fixed to the columnar member 24 to a very high degree of stability and reliability. That is, the lens 12 can be firmly held by the lens sandwiching part 22 of the lug 16 and the fixing part 28 of the fastener 18, with the lens 12 sandwiched therebetween. Thus, the lug 16 and the fastener 18 are not removed easily from the lens 12.

Figure 29:
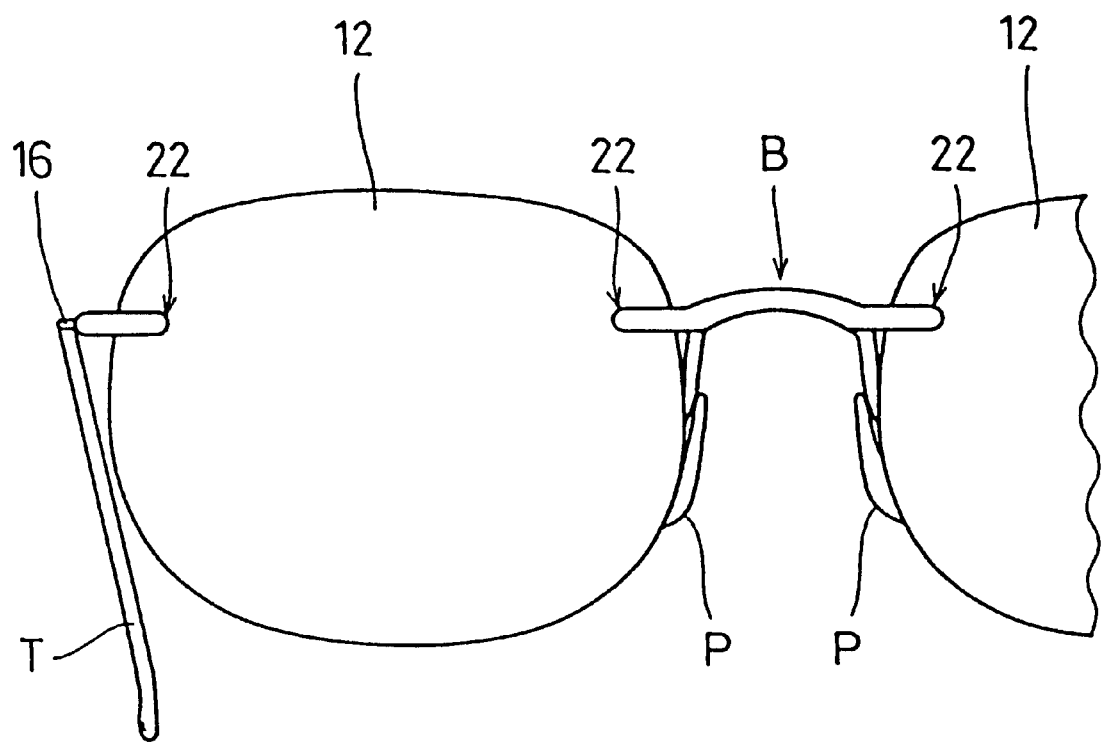
FIG. 29 is a front view showing main parts of still another example of the eyeglasses lens-installing apparatus of the present invention.
Figure 30:
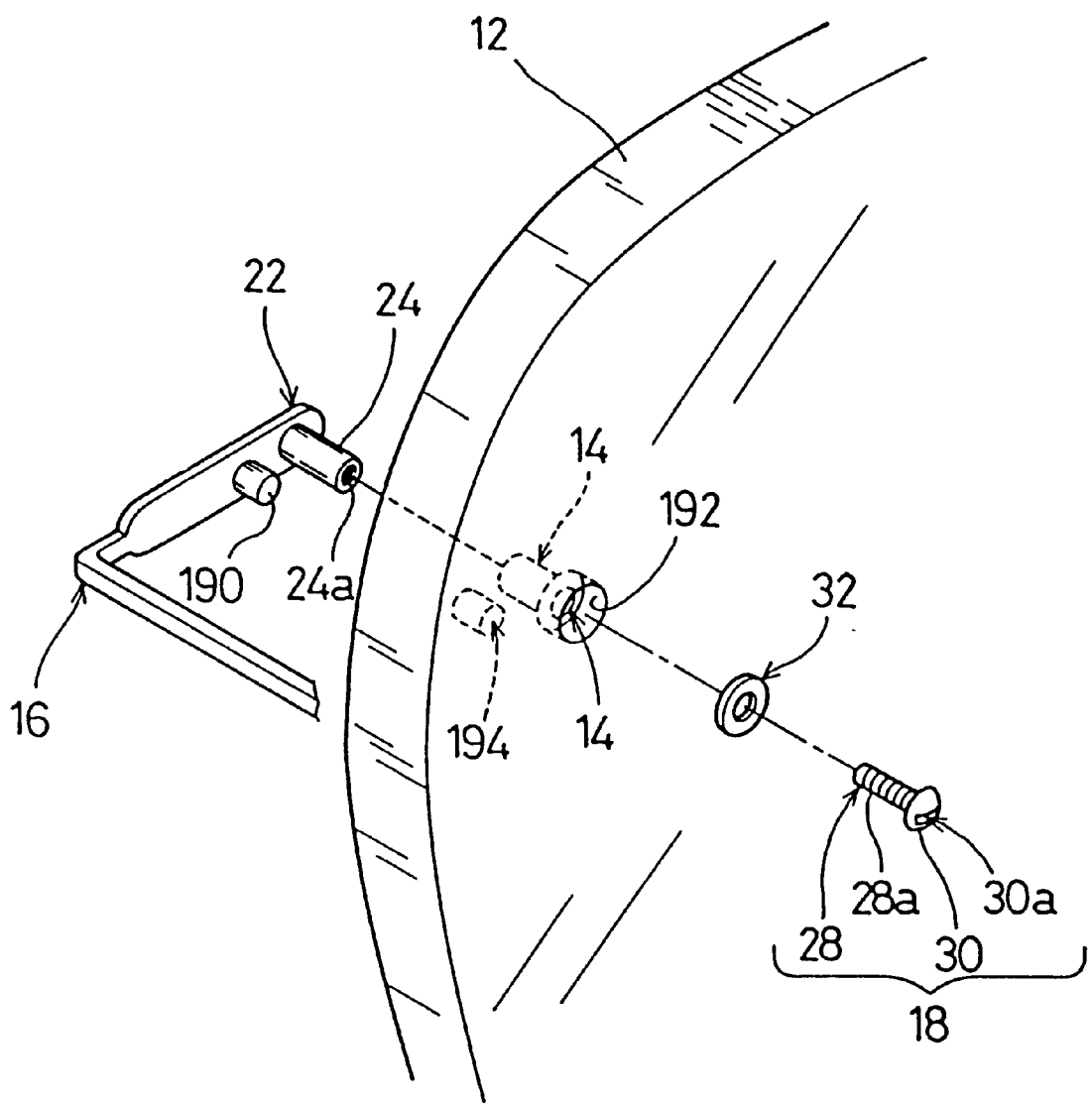
FIG. 30 is a exploded perspective view showing the eyeglasses lens-installing apparatus shown in FIG. 29.
Figure 31:
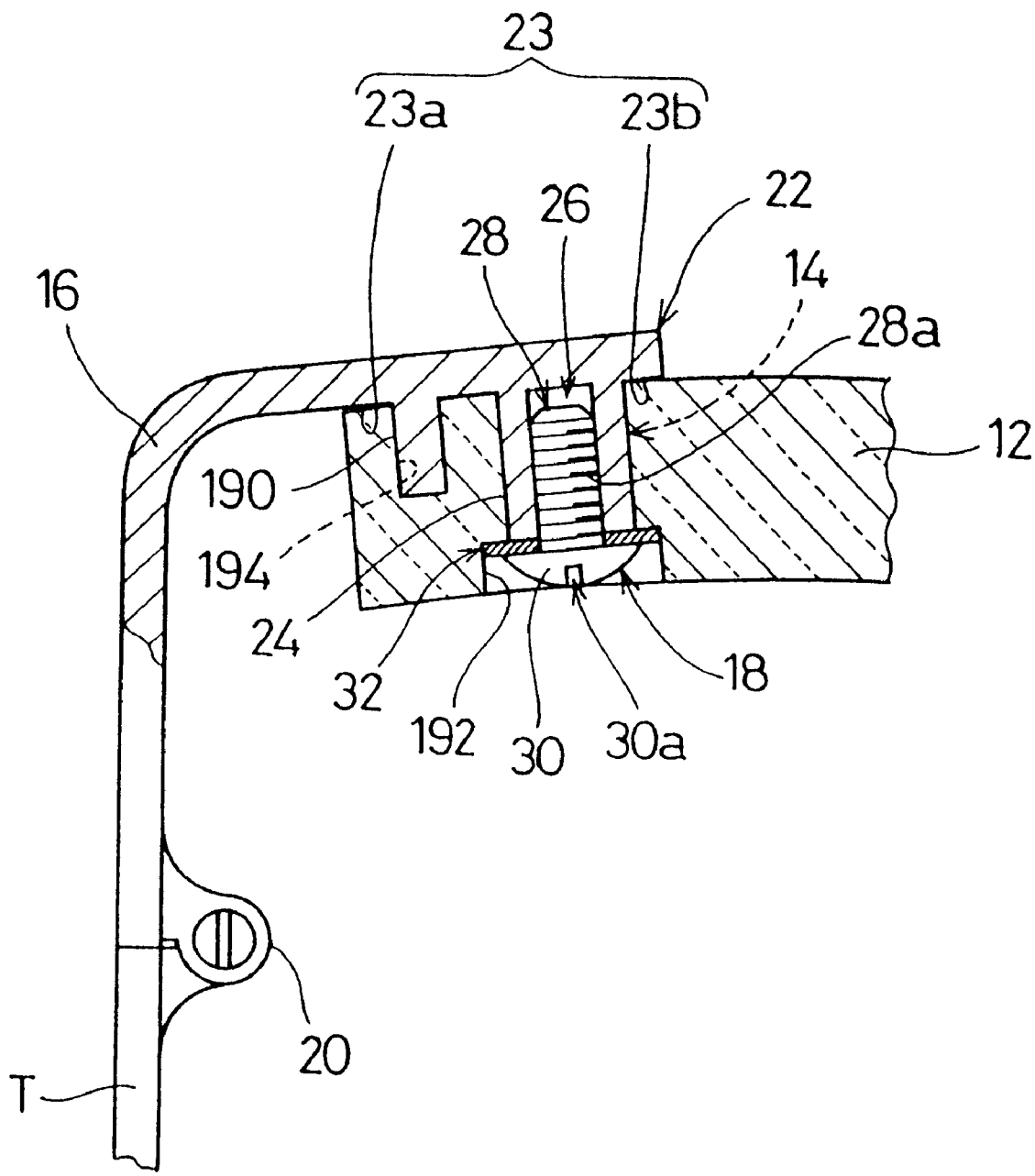
FIG. 31 is an enlarged plan view partly in section showing another example of the eyeglasses lens-installing apparatus of a preferred embodiment of the present invention.

FIG. 29 is a front view showing main parts of still another example of the eyeglasses lens-installing apparatus of the present invention. FIG. 30 is an exploded perspective view showing the eyeglasses lens-installing apparatus shown in FIG. 29. FIG. 31 is an enlarged plan view partly in section showing the eyeglasses lens-installing apparatus shown in FIG. 29.

The eyeglasses lens-installing apparatus 10 shown in FIGS. 29 through 31 is different from the above-described preferred embodiments in that a columnar member 190 is provided on the lens sandwiching part 22, with the columnar member 190 spaced by a predetermined distance from the columnar member 24. In this case, the columnar member 24 is preferably substantially cylindrical. A screw portion 24*a* is provided on the inner peripheral surface of the columnar member 24. The columnar member 190 is preferably substantially cylindrical and does not have a screw portion. The columnar member 24 and the columnar member 190 are spaced by the predetermined distance in the widthwise direction of the lens sandwiching part 22 (major axis direction).

The substantially circular through-hole 14 is formed in the lens 12 at a predetermined position thereof into which the columnar member 24 is inserted. The through-hole 14 has a substantially circular stepped portion 192 positioned at the rear side of the lens 12, which has the function and effect similar to those of the stepped portion 34 of the preferred embodiment shown in FIG. 3. Accordingly, when the columnar member 24 and the fastener 18 are fixedly connected with each other, the head portion 30 of the fastener 18 is accommodated in the stepped portion 192 without the head portion 30 projecting from the lens 12.

A substantially circular locking hole 194 is disposed on the lens 12 at a position into which the columnar member 190 is inserted. The locking hole 194 does not penetrate through the lens 12 but ends at a predetermined depth rearward from the front side of the lens 12.

In the eyeglasses lens-installing apparatus 10 shown in FIGS. 29 through 31, because the through-hole 14 of the lens 12 is substantially circular, it is easy to form the through-hole 14. The lens 12 can be held firmly by the fastener 18, the columnar member 24 of the lens sandwiching part 22, and the columnar member 190 in cooperation with one another. The eyeglasses lens-installing apparatus 10 of this preferred embodiment is applicable to the connection between the bridge B and the lens 12 in addition to the connection between the lens 12 and the lug 16.

Figure 32:
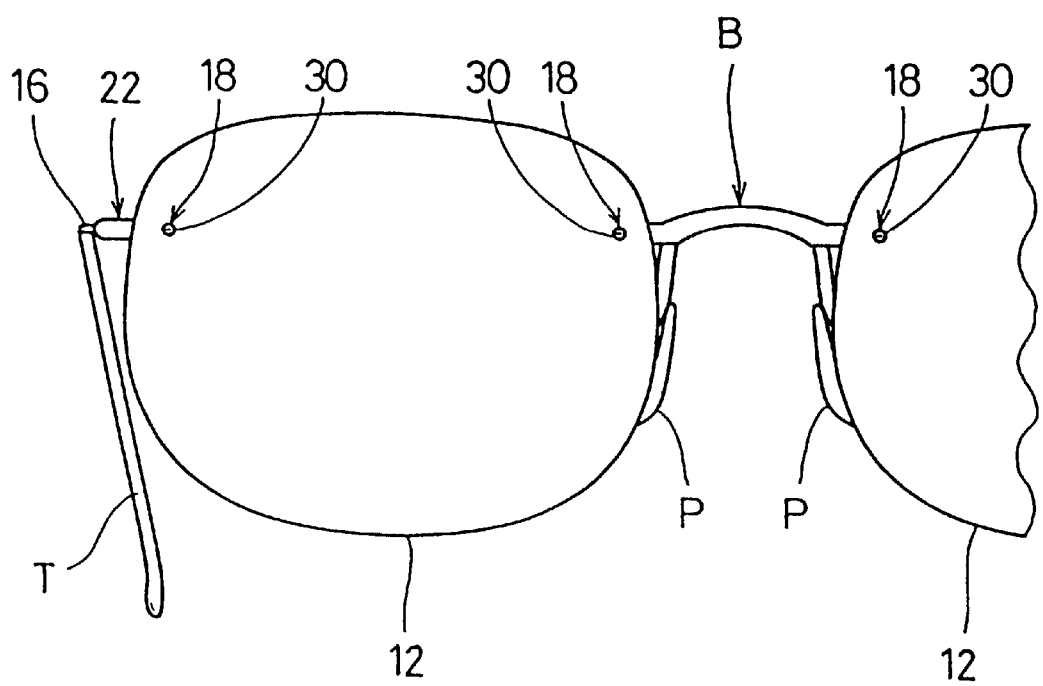
FIG. 32 is a front view showing main parts of still another example of the eyeglasses lens-installing apparatus of a preferred embodiment of the present invention.
Figure 33:
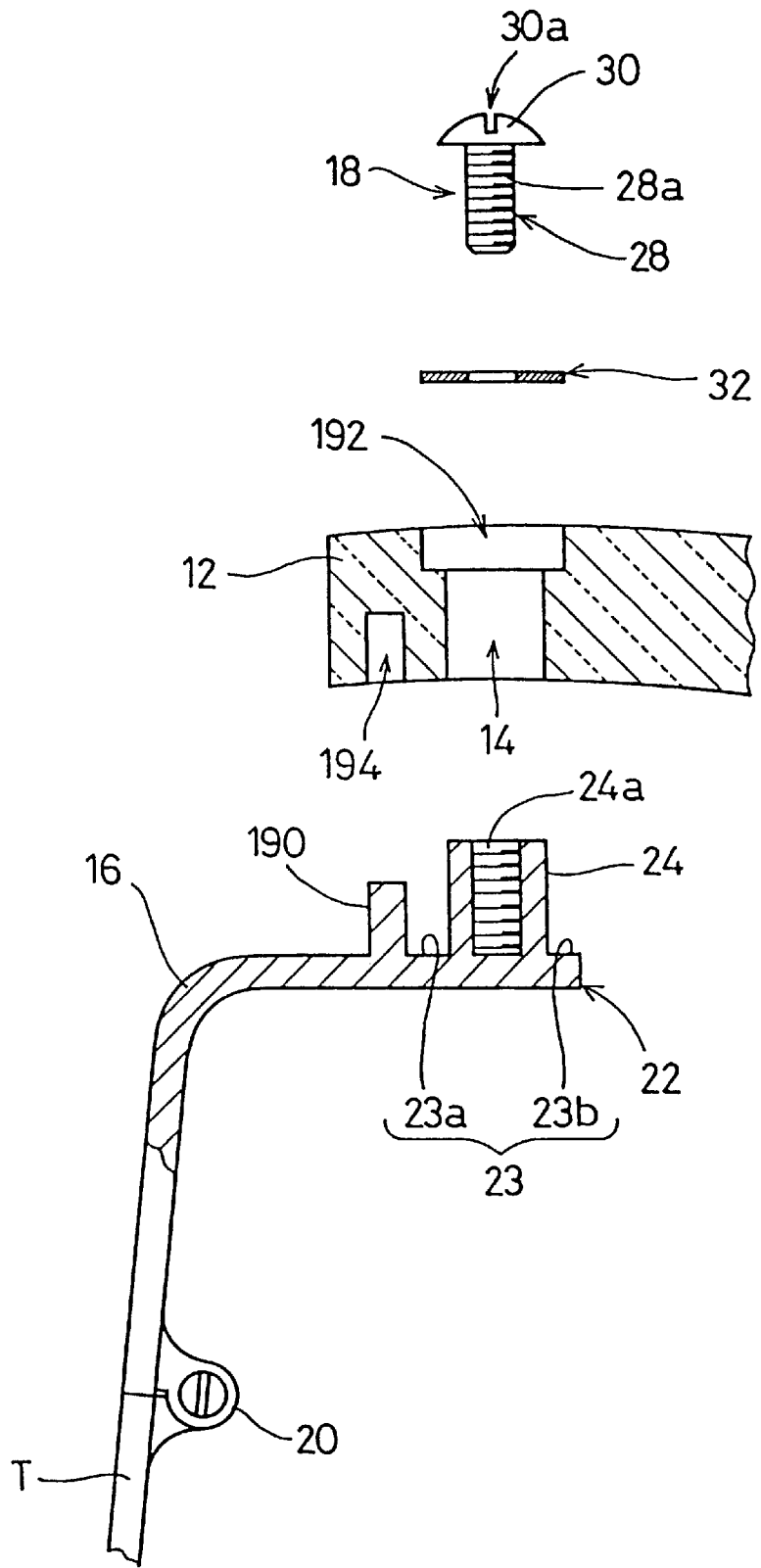
FIG. 33 is an exploded enlarged sectional view showing main parts of the eyeglasses lens-installing apparatus shown in FIG. 32.
Figure 34:
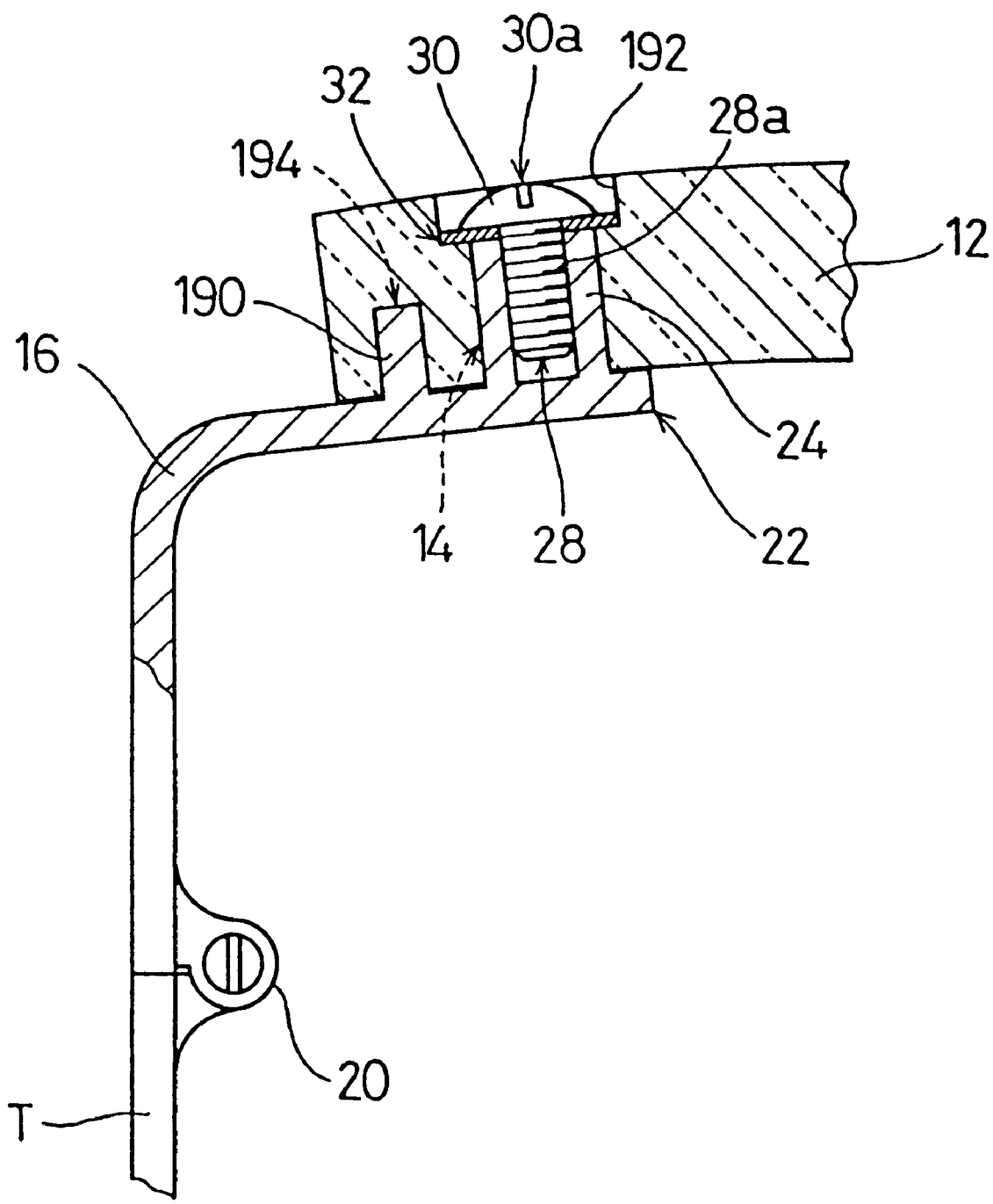
FIG. 34 is an enlarged plan view partly in section showing main parts of the eyeglasses lens-installing apparatus shown in FIGS. 32 and 33.

In the eyeglasses lens-installing apparatus 10 shown in FIGS. 29 through 31, the lens sandwiching part 22 is applied to the lens 12 from its front side, and the fastener 18 is applied to the lens 12 from its rear side to fix the lens 12 on the eyeglasses lens-installing apparatus 10. But as shown in FIGS. 32 through 34, the lens sandwiching part 22 may be applied to the lens 12 from its rear side, and the fastener 18 may be applied to the lens 12 from its front side to fix the lens 12 to the eyeglasses lens-installing apparatus 10.

In this case, the stepped portion 192 is positioned at the front side of the lens 12, and the locking hole 194 terminates at a predetermined depth formed forward from the rear side of the lens 12. The eyeglasses lens-installing apparatus shown in FIGS. 32 through 34 has a structure, operation and effect similar to those of the eyeglasses lens-installing apparatus 10 shown in FIGS. 29 through 31 except the above-described points.

Figure 35:
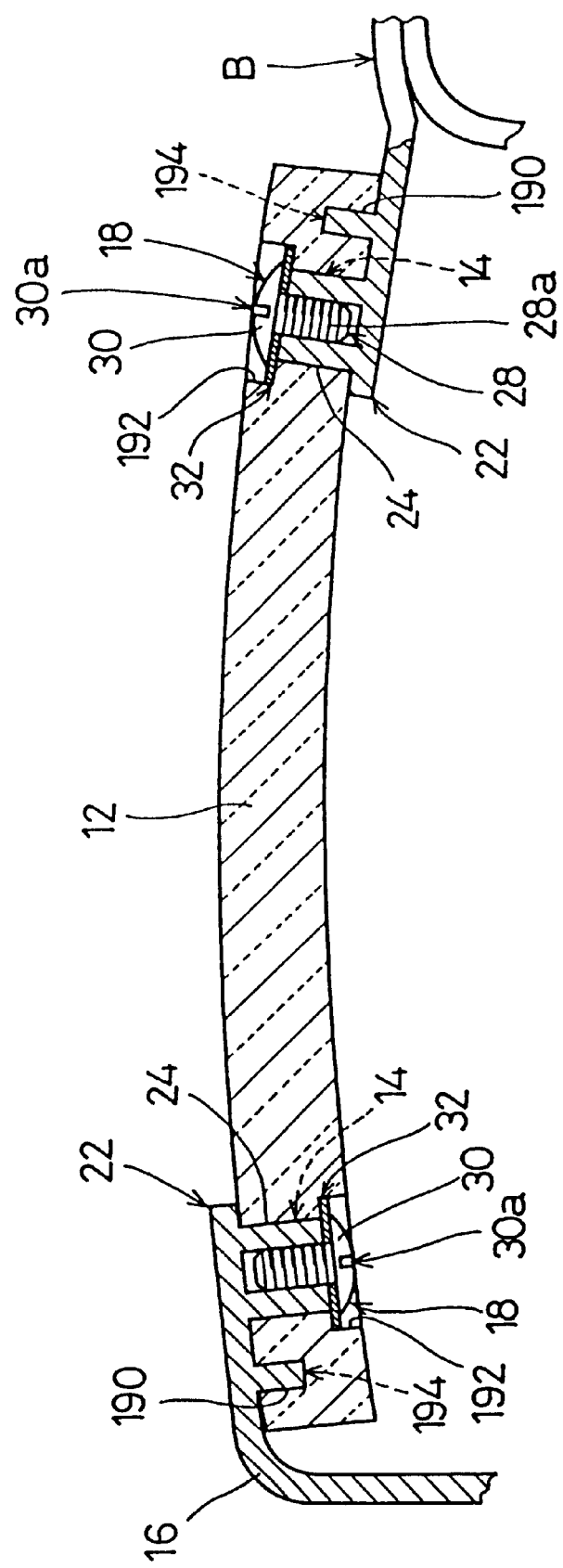
FIG. 35 is an enlarged plan view partly in section showing another example of the eyeglasses lens-installing apparatus of the present invention.

As shown in FIG. 35, the eyeglasses lens-installing apparatus 10 shown in FIGS. 29 through 31 may be applied to connect the lug 16 and the lens 12 with each other. The eyeglasses lens-installing apparatus shown in FIGS. 32 through 34 may be applied to connect the bridge B and the lens 12 with each other. That is, it is possible to use both eyeglasses lens-installing apparatus in combination.

Figure 36:
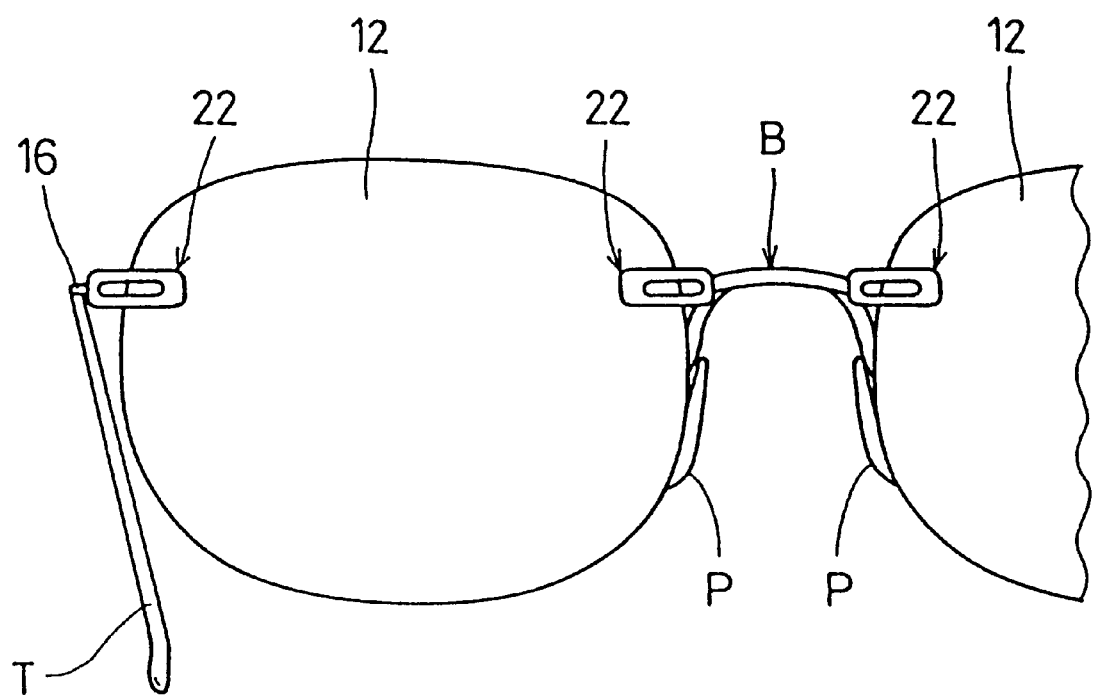
FIG. 36 is a front view showing main parts of still another example of the eyeglasses lens-installing apparatus of a preferred embodiment of the present invention.
Figure 37:
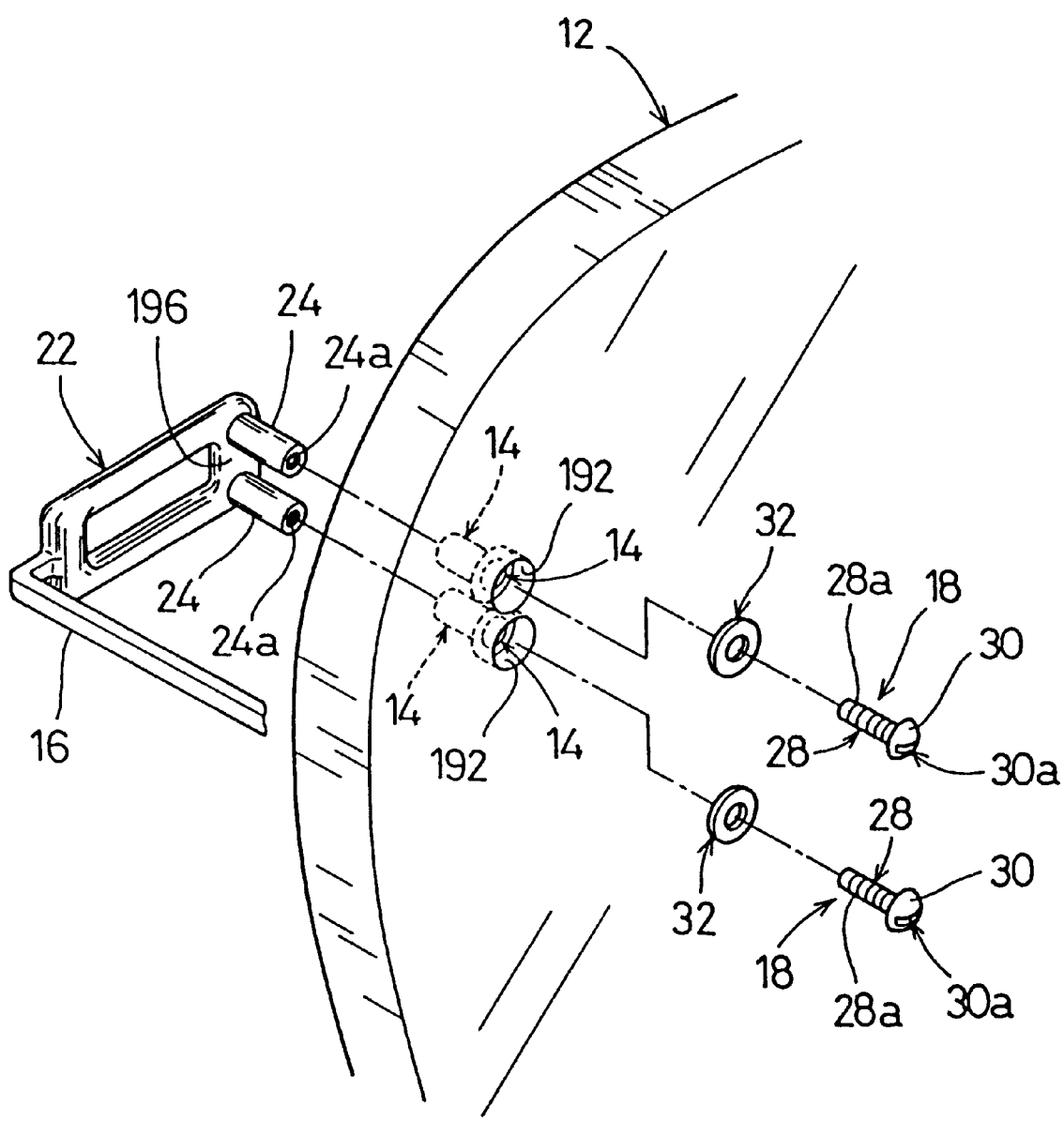
FIG. 37 is a exploded perspective view showing the eyeglasses lens-installing apparatus shown in FIG. 36.
Figure 38:
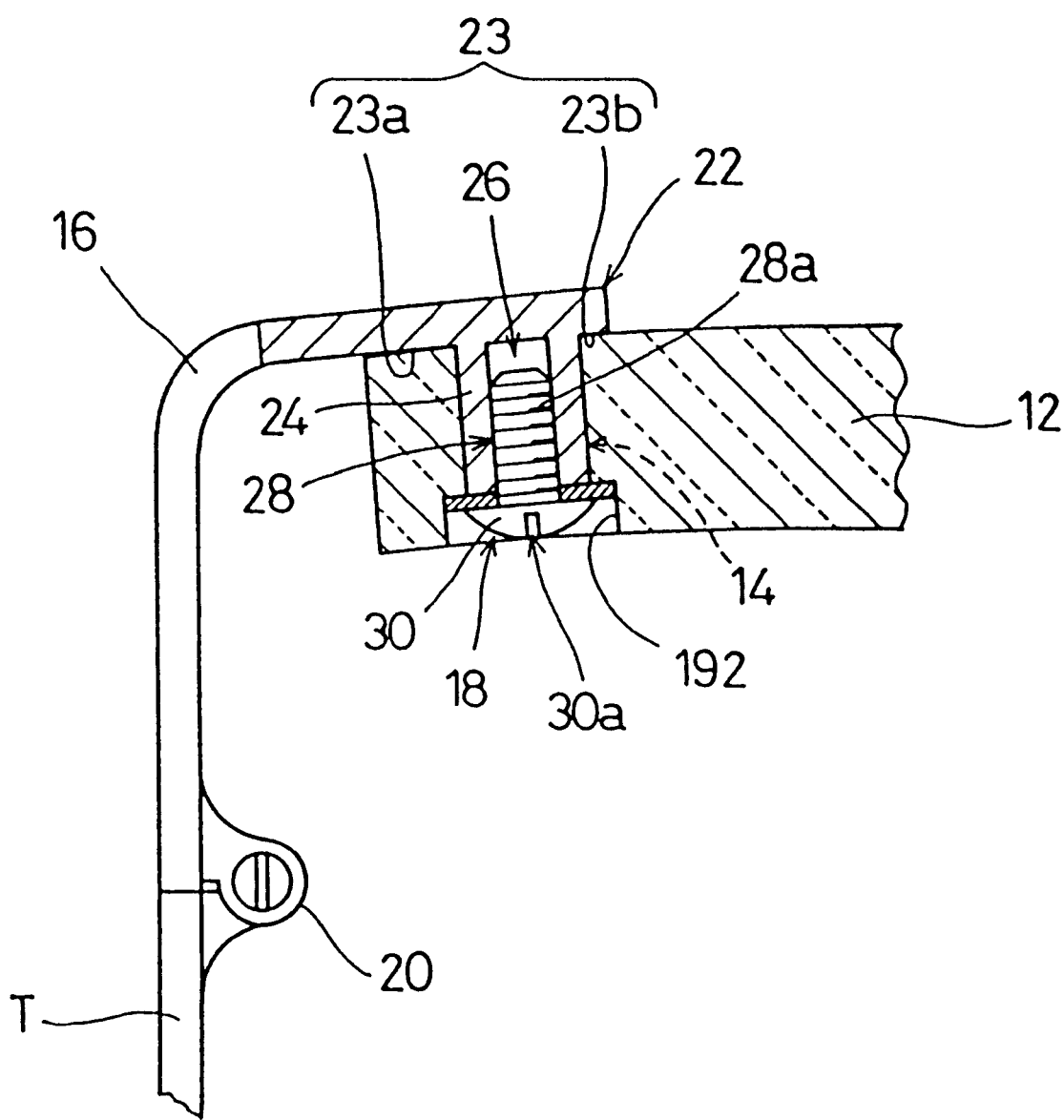
FIG. 38 is a plan view partly in section showing main parts of the eyeglasses lens-installing apparatus shown in FIGS. 36 and 37.

FIG. 36 is a front view showing main parts of still another example of the eyeglasses lens-installing apparatus of the present invention. FIG. 37 is an exploded perspective view showing the eyeglasses lens-installing apparatus shown in FIG. 36. FIG. 38 is a plan view partly in section showing main parts of the eyeglasses lens-installing apparatus shown in FIG. 36.

The eyeglasses lens-installing apparatus 10 shown in FIGS. 36 through 38 is similar to the connection apparatus, shown in FIGS. 21 through 24, for connecting the lug 16 and the lens 12 with each other, but different therefrom in that ends of the bifurcated lens sandwiching part 22 are connected with each other with a connection piece 196 to make the bifurcated lens sandwiching part 22 approximately rectangularly annular. In this case, the two substantially circular holes 14 are formed in the lens 12 at predetermined positions into which the two columnar members 24 are to be inserted. Each of the through-holes 14 has a substantially circular stepped portion 192 at its rear side, namely, at the rear side of the lens 12. The stepped portion 192 has a function and effect similar to those of the stepped portion 34 of the preferred embodiment shown in FIG. 3.

The fastener 18 is inserted into each of the two columnar members 24 inserted into each through-hole 14 from the front side of the lens 12. The screw portion 28*a* of the fixing part 28 of each fastener 18 is screwed on the screw portion 24*a* of each columnar member 24 to install the lens 12 on the eyeglasses lens-installing apparatus. Accordingly, when the fastener 18 is fixedly connected with each of the two columnar members 24, the head portion 30 of each fastener 18 is accommodated in each stepped portion 192 without the head portion 30 projecting from the lens 12.

In the eyeglasses lens-installing apparatus 10 of the preferred embodiment shown in FIGS. 36 through 38, the through-hole 14 of the lens 12 and the stepped portion 192 are preferably substantially circular, similar to the preferred embodiment shown in FIGS. 29 through 31. Thus, it is easy to form the eyeglasses lens-installing apparatus 10 with high processability. Because the lens 12 can be firmly held by the cooperation of the two columnar members 24 of the lens sandwiching part 22 and the two fasteners 18, the lens 12 can be firmly fixed to the eyeglasses lens-installing apparatus 10. The eyeglasses lens-installing apparatus 10 of the preferred embodiment is applicable to the connection between the bridge B of the frame and the lens 12 in addition to the connection between the lens 12 and the lug 16.

Figure 39:
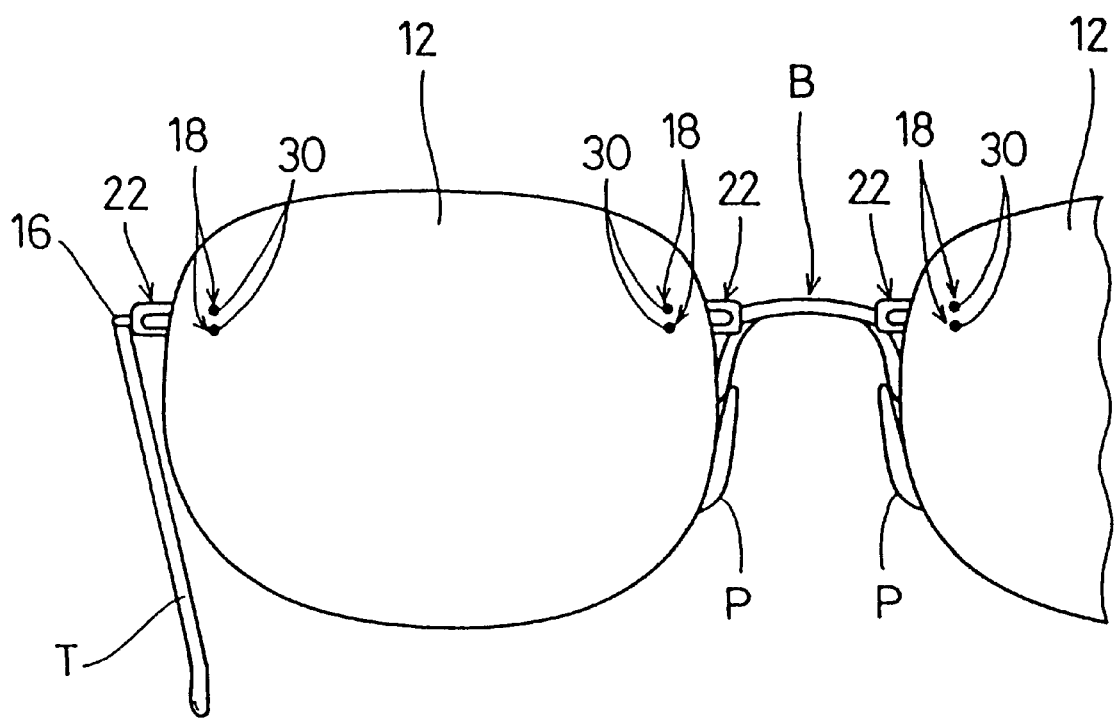
FIG. 39 is a front view showing main parts of another example of the eyeglasses lens-installing apparatus of a preferred embodiment of the present invention.
Figure 40:
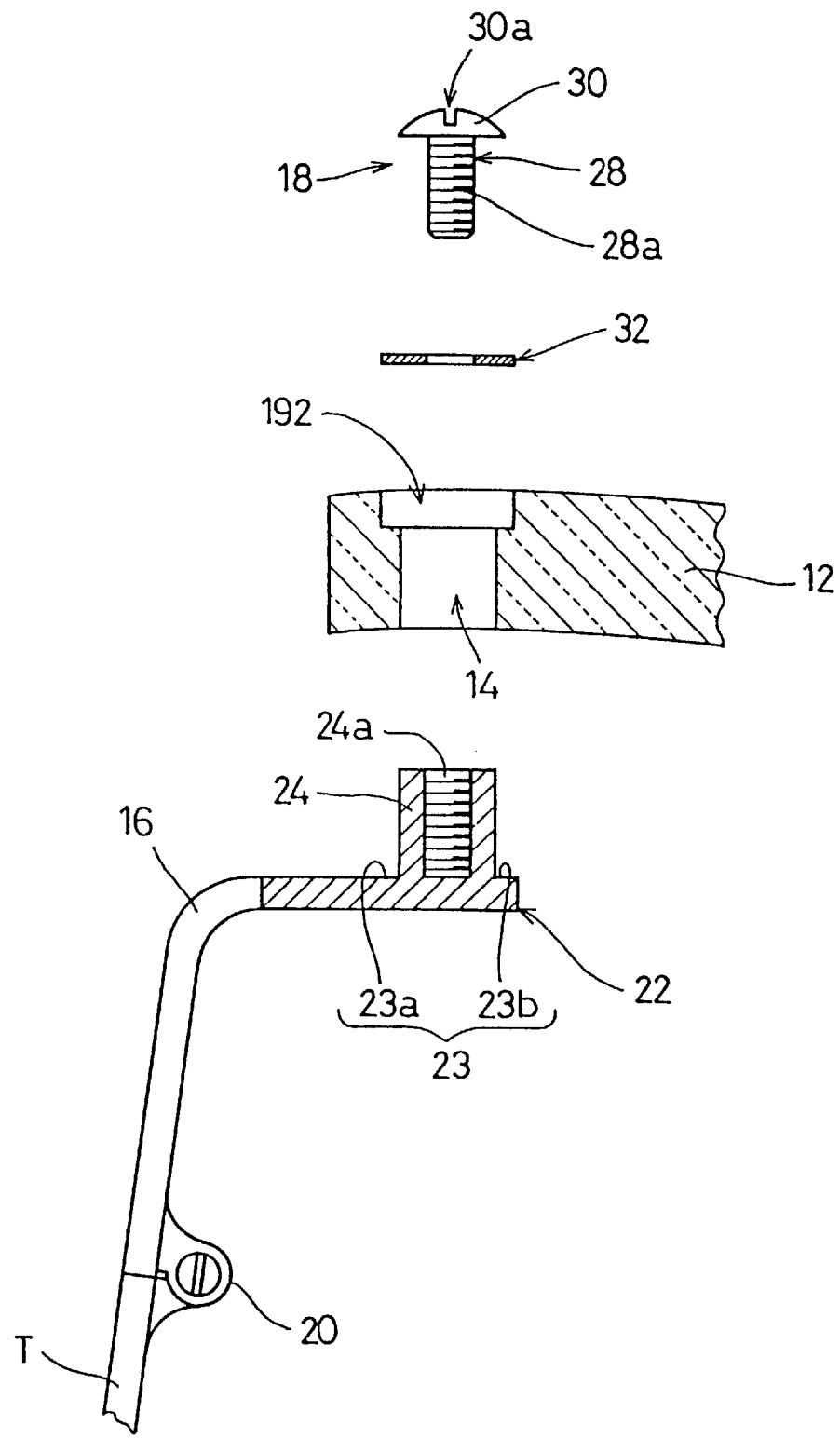
FIG. 40 is an exploded enlarged sectional view showing main parts of the eyeglasses lens-installing apparatus shown in FIG. 39.
Figure 41:
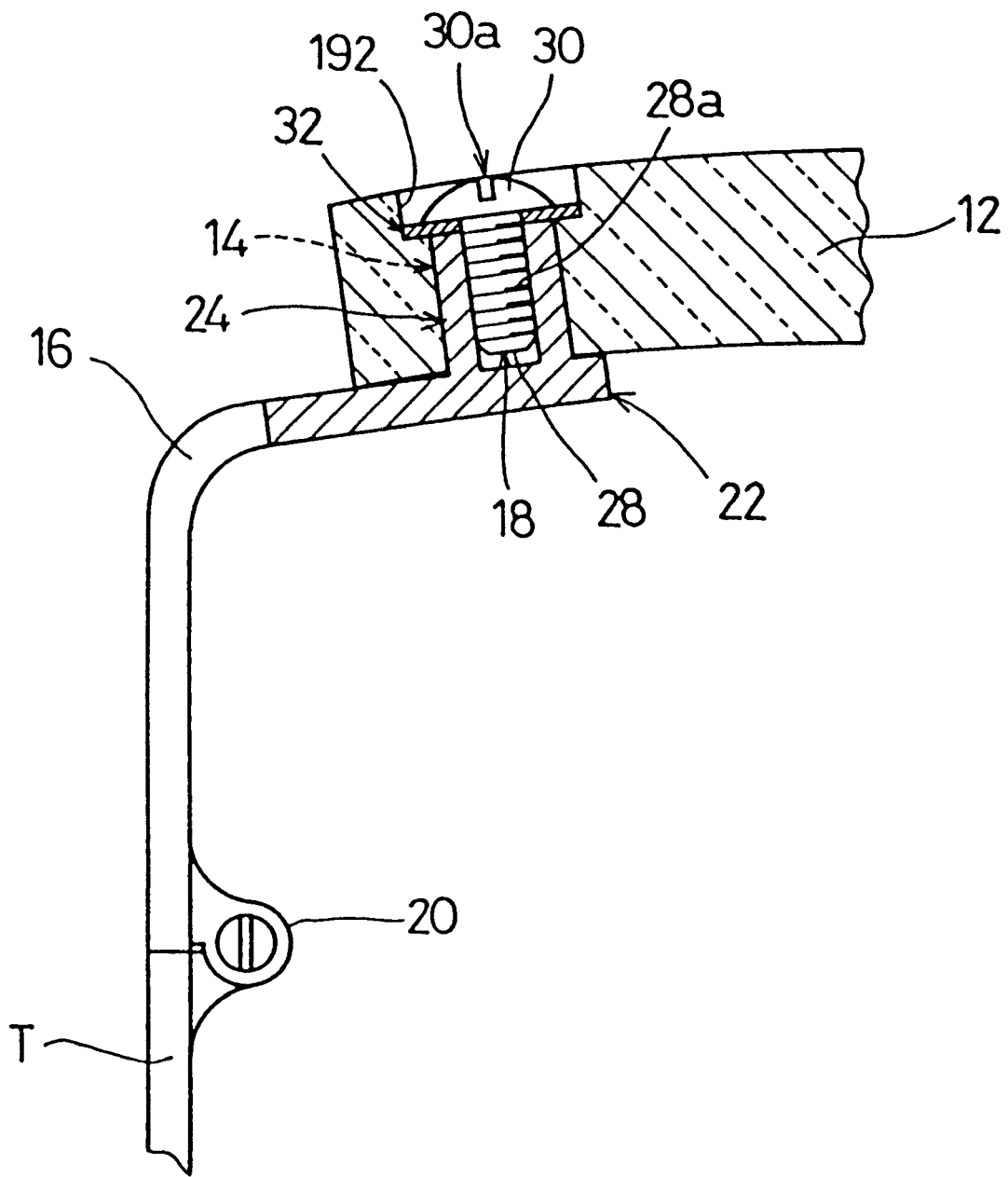
FIG. 41 is a plan view partly in section showing main parts of the eyeglasses lens-installing apparatus shown in FIGS. 39 and 40.

In the eyeglasses lens-installing apparatus 10 of the preferred embodiment shown in FIGS. 36 through 38, the lens sandwiching part 22 is applied to the lens 12 from its front side, and the two fasteners 18 are applied thereto from its rear side to fix the lens 12 thereto. But as shown in FIGS. 39 through 41, the lens sandwiching part 22 may be applied to the lens 12 from its rear side, and the two fasteners 18 are applied to the lens 12 from its front side to fix the lens 12 to the eyeglasses lens-installing apparatus 10. In this case, the two stepped portions 192 are positioned at the front side of the lens 12. The eyeglasses lens-installing apparatus shown in FIGS. 39 through 41 has a structure, operation and effect similar to those of the eyeglasses lens-installing apparatus 10 shown in FIGS. 36 through 38 except the above-described points.

Figure 42:
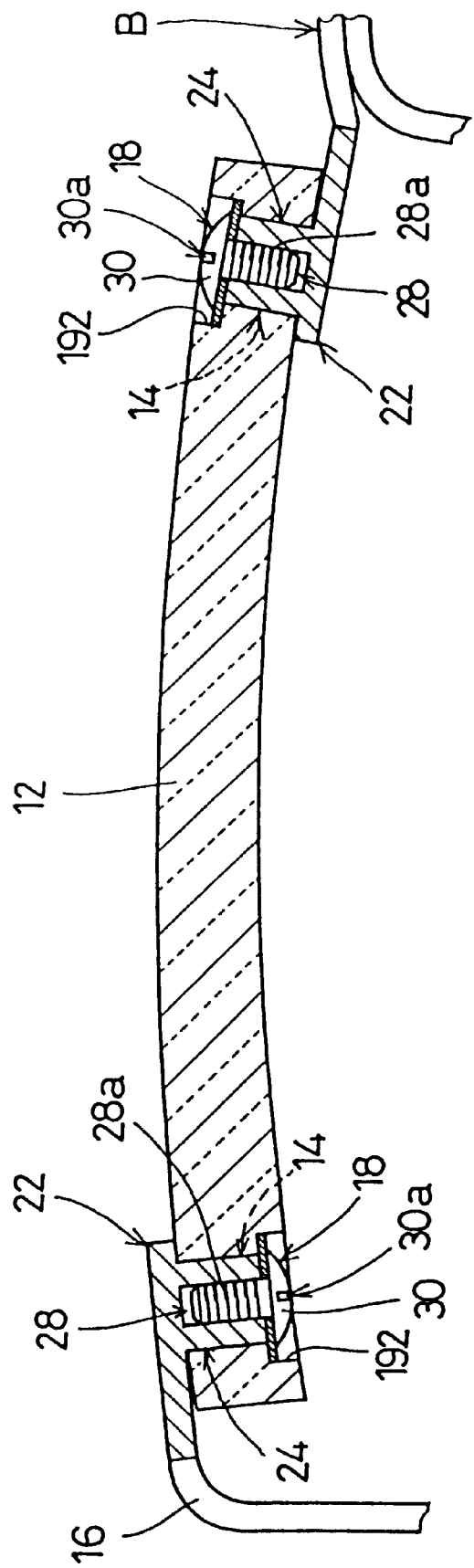
FIG. 42 is an enlarged plan view partly in section showing another example of the eyeglasses lens-installing apparatus of a preferred embodiment of the present invention.

As shown in FIG. 42, the eyeglasses lens-installing apparatus 10 shown in FIGS. 36 through 38 may be applied to connect the lug 16 and the lens 12 with each other, and the eyeglasses lens-installing apparatus shown in FIGS. 39 through 41 may be applied to connect the bridge B of the frame and the lens 12 with each other. That is, it is possible to use both eyeglasses lens-installing apparatus in combination.

In the preferred embodiments shown in FIGS. 29 through 42, the length of the columnar member 24 in its axial direction is preferably slightly smaller than the thickness of the lens 12. The outer diameter of the columnar member 24 is preferably almost equal to or slightly smaller than the diameter of the through-hole 14. The inner diameter of the columnar member 24 is preferably slightly larger than the outer diameter of the fixing part 28 of the fastener 18. The diameter of the stepped portion 192 is preferably larger than the outer diameter of the head portion 30 of the fixing part 28 of the fastener 18.

The thickness of the lens 12, the diameter of the through-hole 14, the diameter and depth of the stepped portion 192, the outer diameter of the fixing part 28 of the fastener 18, and the length thereof in its axial direction can be appropriately altered according to the kind, degree, size, and the like of the lens 12.

It is easy to use the conventional structure and methods to form the circular through-hole 14 on the lens 12, but it is impossible to use the conventional structure and methods to form a substantially elliptical through-hole 14 on the lens 12. To prevent rotation of the columnar member, the formation of the substantially elliptical through-hole 14 on the lens 12 is one important factor of the eyeglasses lens-installing apparatus of preferred embodiments of the present invention. With the preferred embodiments of the present invention, the present inventors have solved the problem of the rotation of the columnar member.

Description is made of a method of forming the substantially elliptical through-hole in the lens which is applied to the eyeglasses lens-installing apparatus of preferred embodiments of the present invention and into which the columnar member is inserted or fitted.

Figure 43:
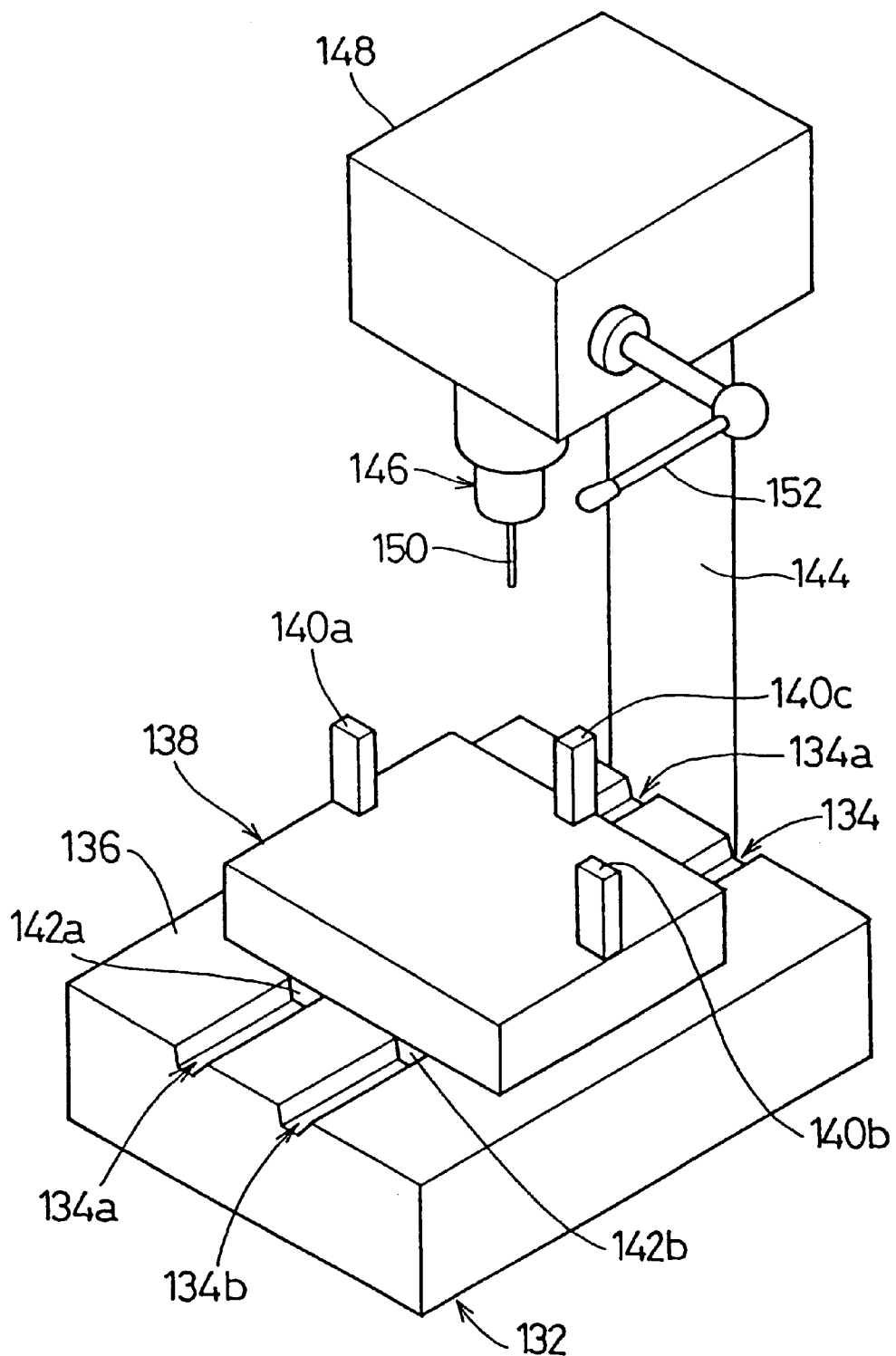
FIG. 43 is a perspective view showing an example of a hole-forming apparatus for forming a substantially elliptical through-hole on a lens to be applied to the eyeglasses lens-installing apparatus of a preferred embodiment of the present invention.
Figure 44:
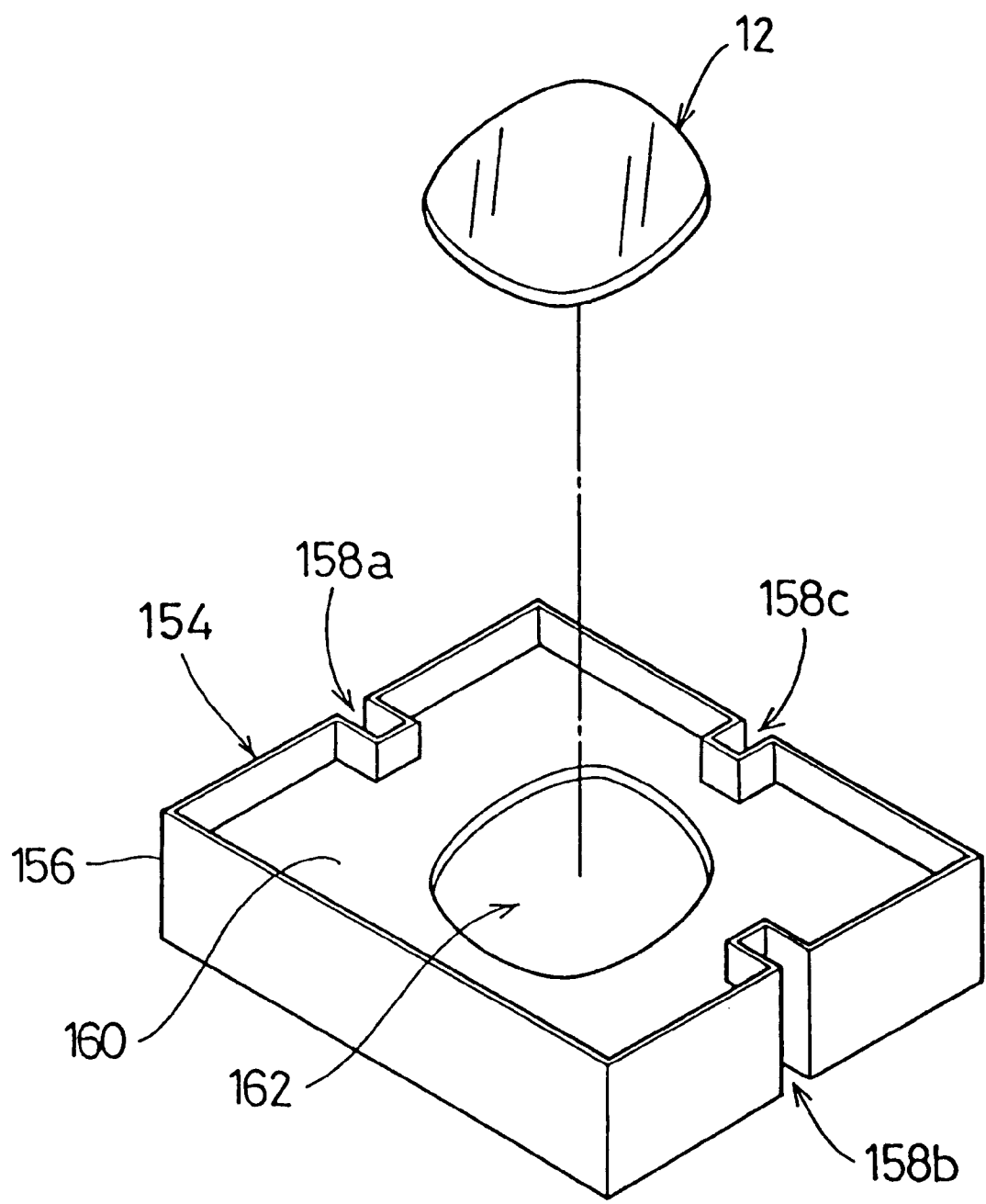
FIG. 44 is a perspective view showing an example of a jig for use in the hole-forming apparatus shown in FIG. 43.

FIG. 43 is a perspective view showing an example of a hole-forming apparatus for forming a substantially elliptical through-hole on a lens to be applied to the eyeglasses lens-installing apparatus of preferred embodiments of the present invention. FIG. 44 is a perspective view showing an example of a jig for use in the hole-forming apparatus shown in FIG. 43.

A hole-forming apparatus 130 includes a bed 132. A guide surface 136 guiding a table 138 which will be described later is provided on the upper surface of the bed 132. The guide surface 136 has two guide grooves 134a and 134b. The guide grooves 134a and 134b are spaced by a predetermined distance along the widthwise direction of the bed 132 and extend in the lengthwise direction thereof. The guide grooves 134a and 134b are inversely trapezoidal in section and extend linearly from one end of the bed 132 to the other end thereof in the lengthwise direction thereof.

The table 138 is movable in the lengthwise direction of the bed 132 along the guide surface 136 and is disposed on the upper surface of the bed 132. The table 138 is preferably substantially rectangular and solid. A plurality, i.e. three, substantially square pillar-shaped positioning pins 140a, 140b, and 140c are disposed at predetermined positions of the upper surface of the table 138. In this case, the positioning pins 140a and 140b are located at opposite ends of the table 138 in the lengthwise direction thereof and approximately at the center thereof in the widthwise direction thereof. The positioning pin 140c is located at one end of the table 138 in the widthwise direction thereof and approximately at the center thereof in the lengthwise direction thereof. The positioning pins 140a, 140b, and 140c are arranged to project at right angles relative to the upper surface of the table 138.

Convexities 142a and 142b to be fitted in the guide grooves 134a and 134b of the bed 132, respectively, are provided on the lower surface of the table 138. The convexities 142a and 142b are inversely trapezoidal in section and are disposed on the lower surface of the table 138 at a predetermined interval in the lengthwise direction thereof from one end to the other end thereof in the widthwise direction thereof.

The table 138 is provided with a lever (not shown). The table 138 can be moved in a reciprocating manner along the guide grooves 134a and 134b of the guide surface 136 by operating the lever. As the feeding mechanism for reciprocating the table 138, a feeding mechanism for use in a machine tool such as a lathe, a miller, a planing machine, and the like is used.

A column 144 is positioned at one end of the bed 132 in its lengthwise direction. A spindle head 148 holding a main shaft 146 rotatably thereon is provided at the upper end of the column 144 in its axial direction. A drill 150 is installed as a cutting member at the front end (lower end) of the main shaft 146. In the hole-forming apparatus 130, a handle 152 provided on the spindle head 148 is operated to move the drill 150 vertically. The apparatus, arrangement, and function of the column 144, the main shaft 146, the spindle head 148, and the drill 150 are similar to those known by one of an ordinary drill.

Figure 45:
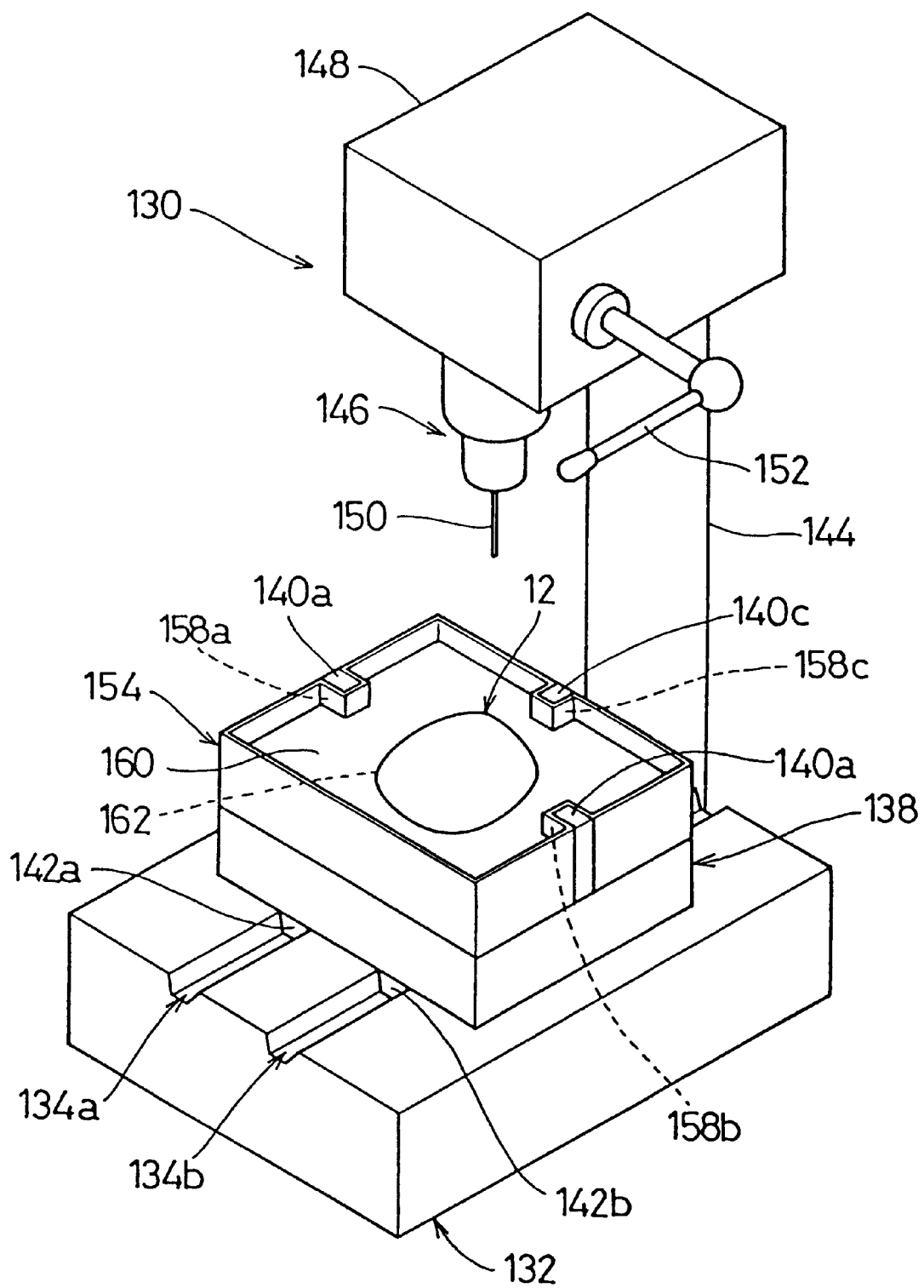
FIG. 45 is a perspective view showing the use state of the hole-forming apparatus shown in FIG. 43.

As shown in FIG. 45, a jig 154 is set on the table 138. As shown in FIG. 44, the jig 154 includes a box-shaped body 156 preferably made of a metal. Cut-out portions 158a and 158b which are preferably substantially U-shaped in section are provided at opposite ends of the body 156 in its lengthwise direction and approximately at the center thereof in its widthwise direction. A cut-out portion 158c having a structure similar to that of the cut-out portions 158a and 158b is disposed at one end of the body 156 in its widthwise direction and approximately at the center thereof in its lengthwise direction. The cut-out portions 158a, 158b, and 158c are defined at positions corresponding to the positions of the positioning pins 140a, 140b, and 140c shown in FIG. 43. The cut-out portions 158a, 158b, and 158c extend from the upper end of the body 156 to its lower end in a vertical direction. The positioning pins 140a, 140b, and 140c are fitted into the cut-out portions 158a, 158b, and 158c of the table 138, respectively. That is, in cooperation with the positioning pins 140a, 140b, and 140c function to position the jig 154, and the cut-out portions 158a, 158b, and 158c also function to position the jig 154.

A mold 160 made of a silicone resin and synthetic resinous material is fitted in the body 156. A concave 162 corresponding to the outer shape of the lens 12 is located approximately at the center of the mold 160 as a positioning portion into which the lens 12 for use in preferred embodiments of the present invention is fitted closely. When the jig 154 is set on the table 138, the lens 12 can be correctly placed in position.

With reference to FIGS. 43 through 46, description is made below of an example of a method to be carried out by the hole-forming apparatus 130 and the jig 154 to form the substantially elliptical through-hole 14 on the lens 12 to be applied to the eyeglasses lens-installing apparatus of preferred embodiments of the present invention.

First, the lens 12 is fitted into the concave portion 162 of the mold 160 of the jig 154 and placed in position therein. Then, the jig 154 is set on the table 138, with the lens 12 placed in position in the jig 154. The positioning pins 140a, 140b, and 140c are fitted into the cut-out portions 158a, 158*b*, and 158*c* of the jig 154, respectively and guided therein. In this case, a portion of the lens 12 to be formed as the through-hole 14 is correctly positioned immediately below the drill 150.

Figure 46A:
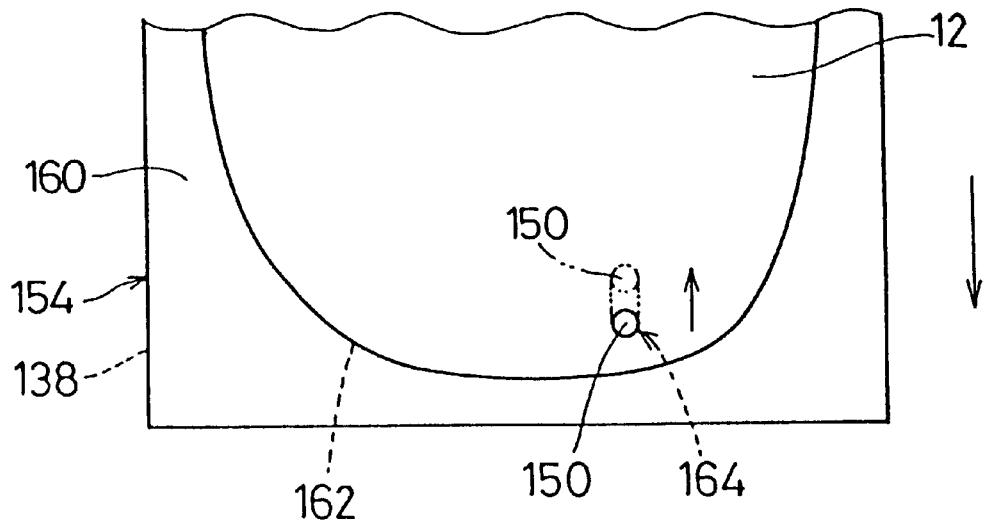
FIGS. 46(A–B) show an example of a method of forming a substantially elliptical through-hole on a lens to be carried out by the hole-forming apparatus shown in FIG. 43.
Figure 46B:
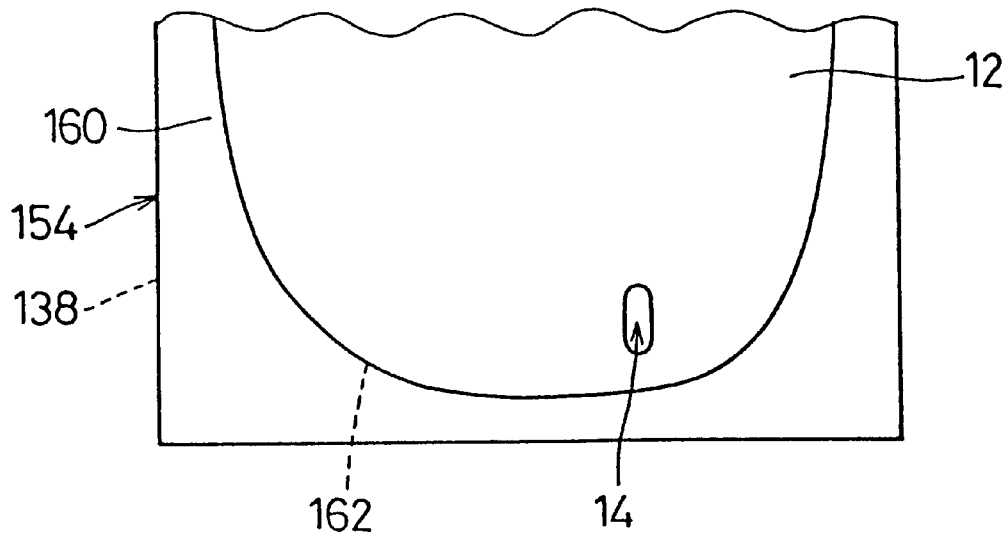

The handle 152 is operated to move the drill 150 vertically downward. As a result, a circular substantially through-hole 164 is formed initially at a predetermined position of the lens 12 at which the through-hole 14 is to be opened, as shown in FIG. 46A. Then, the table 138 is moved by a predetermined distance along the guide grooves 134*a* and 134*b* in the direction shown by an arrow of FIG. 46A. In other words, the table 138 is moved in the major axis direction of the substantially elliptical through-hole 14. Thus, the drill 150 moves in the major axis direction of the substantially elliptical through-hole 14. Accordingly, as shown in FIG. 46B, the substantially elliptical through-hole 14 is formed at a desired, predetermined position. That is, in the hole-forming apparatus 130 having the jig 154 on which the lens 12 is placed in position, the through-hole 14 can be formed in the lens 12 easily by moving the jig 154 in a predetermined direction via the table 138.

Figure 47:
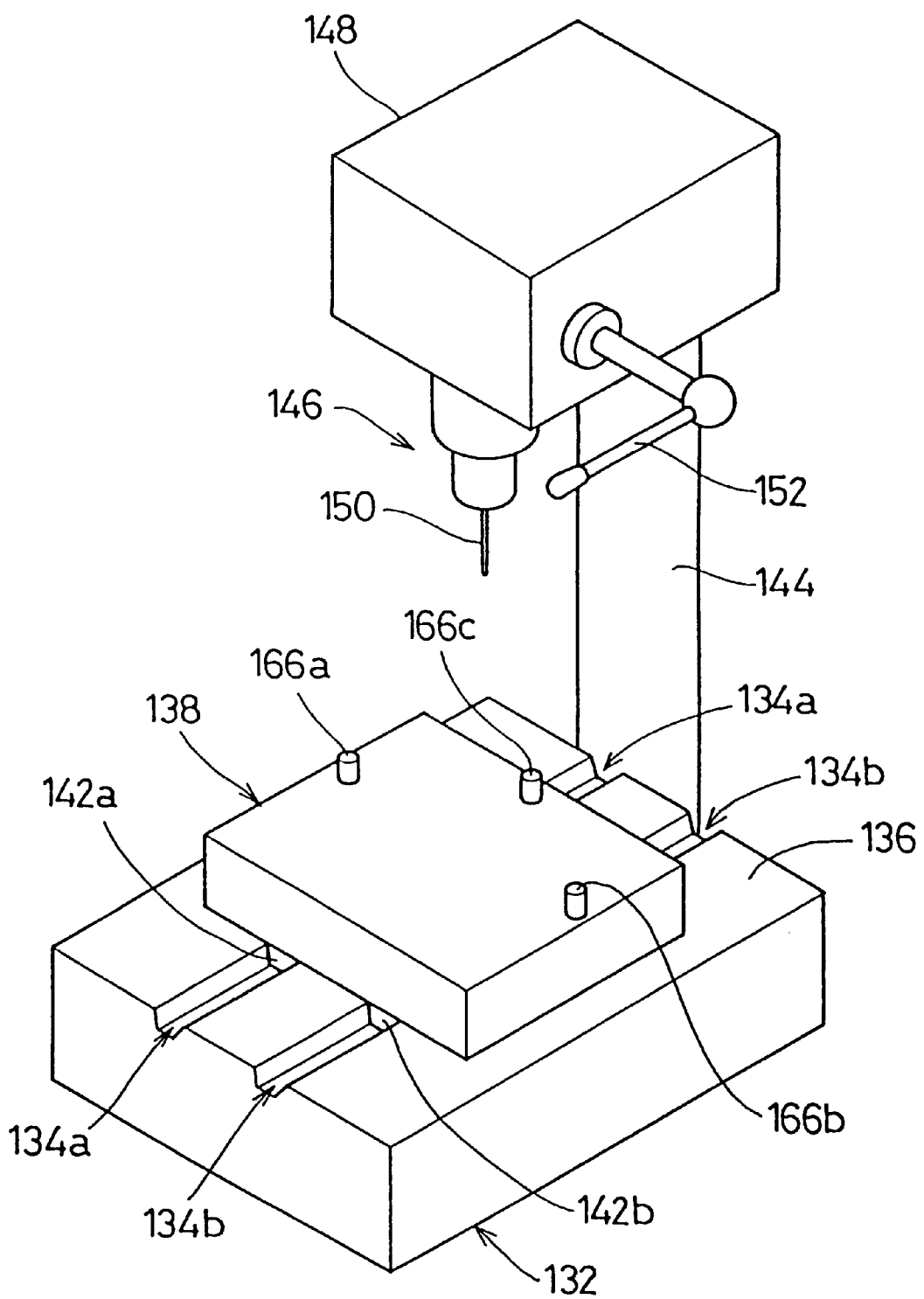
FIG. 47 is a perspective view showing another example of a hole-forming apparatus for forming a substantially elliptical through-hole on a lens to be applied to the eyeglasses lens-installing apparatus of a preferred embodiment of the present invention.
Figure 48A:
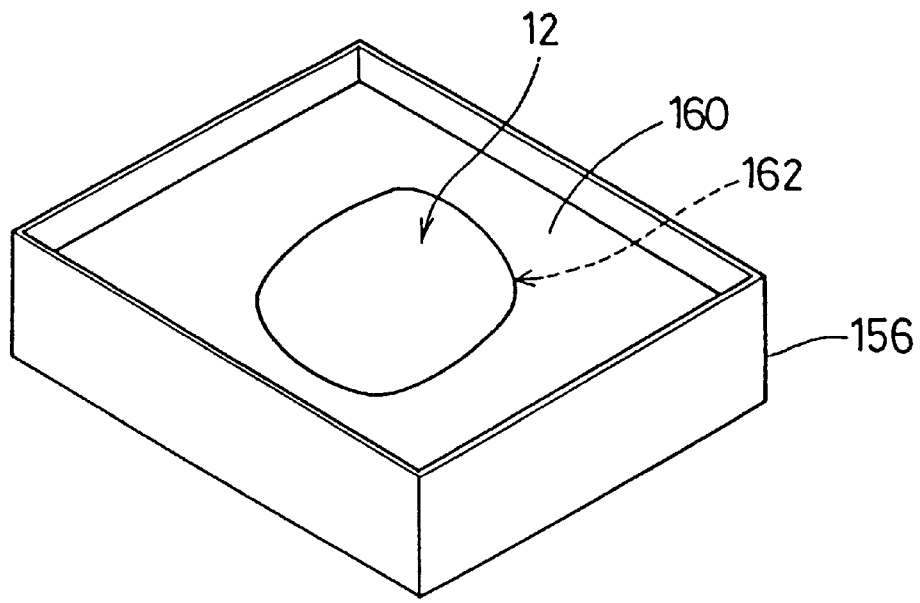
FIGS. 48(A–B) are a perspective view showing an example of a jig for use in the hole-forming apparatus shown in FIG. 47.
Figure 48B:
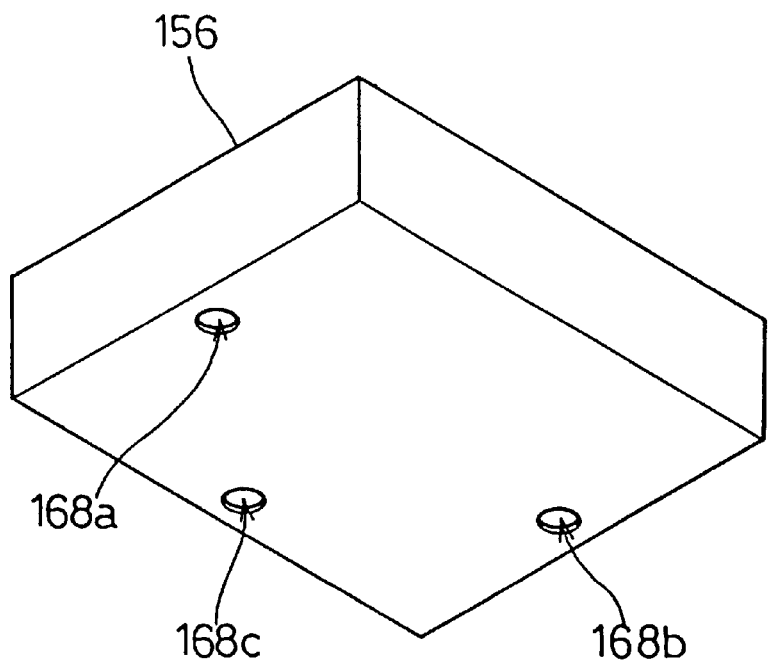

FIG. 47 is a perspective view showing another example of a hole-forming apparatus for forming an substantially elliptical through-hole on a lens to be applied to the eyeglasses lens-installing apparatus of preferred embodiments of the present invention. FIG. 48 is a perspective view showing an example of a jig for use in the hole-forming apparatus shown in FIG. 47. FIG. 48A is a perspective view showing the upper side of the jig. FIG. 48B is a perspective view showing the lower side of the jig. The hole-forming apparatus 130 shown in FIGS. 47 and 49 is different from that shown in FIGS. 43 and 45 in that the apparatus of the positioning pin of the table of the former and that of the jig-positioning portion thereof are different from that of the positioning pin of the table and the jig-positioning portion of the latter.

Figure 49:
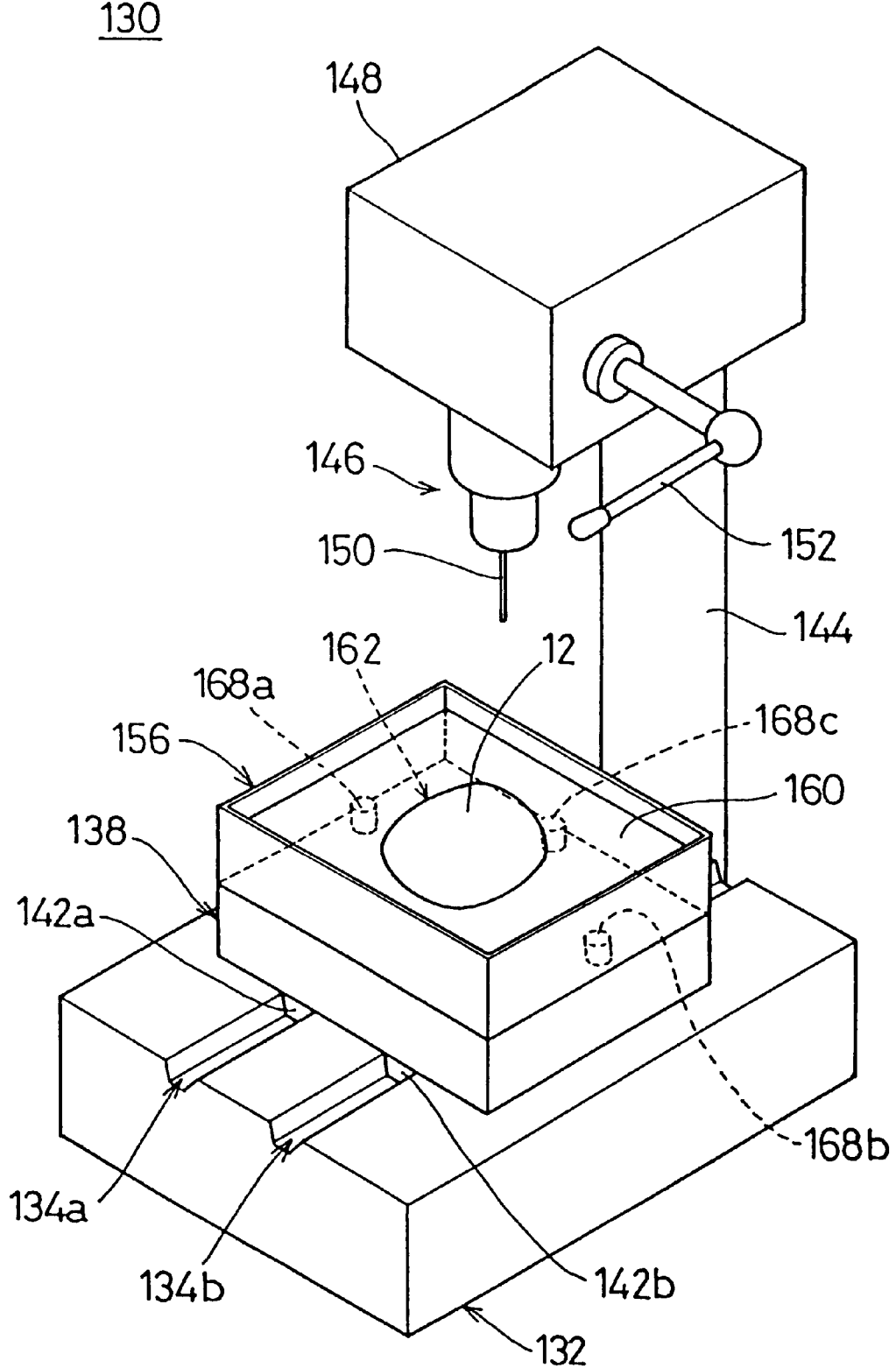
FIG. 49 is a perspective view showing the use state of the hole-forming apparatus shown in FIG. 47.

That is, in the hole-forming apparatus 130 shown in FIGS. 47 and 49, positioning pins 166*a*, 166*b*, and 166*c* are columnar, and the positioning portion for positioning the jig 156 to be set on the upper surface of the table 138 includes positioning holes 168*a*, 168*b*, and 168*c*. The method of forming the substantially elliptical through-hole 14 in the lens 12 by using the hole-forming apparatus 130 is similar to the method to be carried out by using the hole-forming apparatus shown in FIGS. 43 through 46.

It is virtually impossible for the conventional hole-forming apparatus to form the substantially elliptical through-hole. But the method of forming the through-hole 14 on the lens 12 by using each of the hole-forming apparatuses 130 allows the substantially elliptical through-hole to be formed correctly and easily at a predetermined position and in the same direction.

Figure 50A:
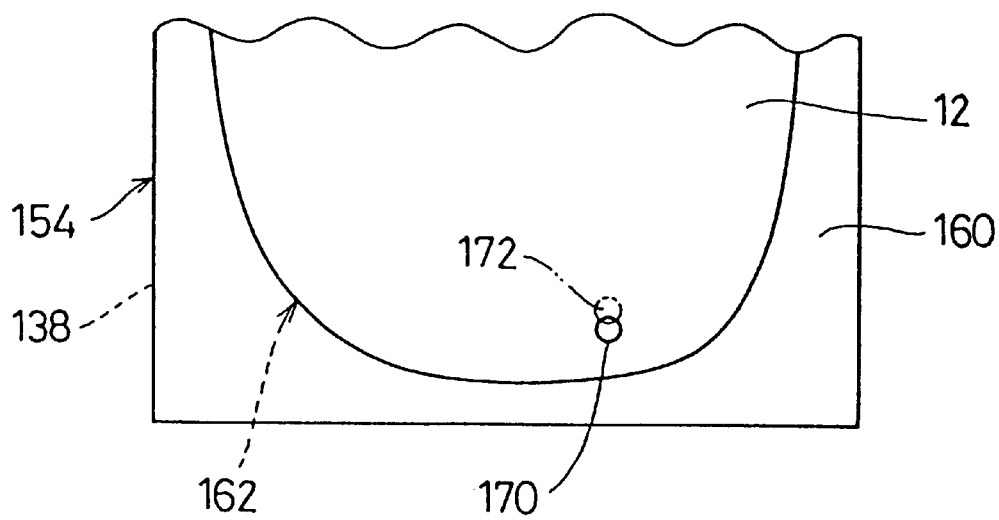
FIGS. 50(A–B) show an example of a method of forming another substantially elliptical through-hole on a lens to be carried out by the hole-forming apparatus shown in FIGS. 43 and 47.
Figure 50B:
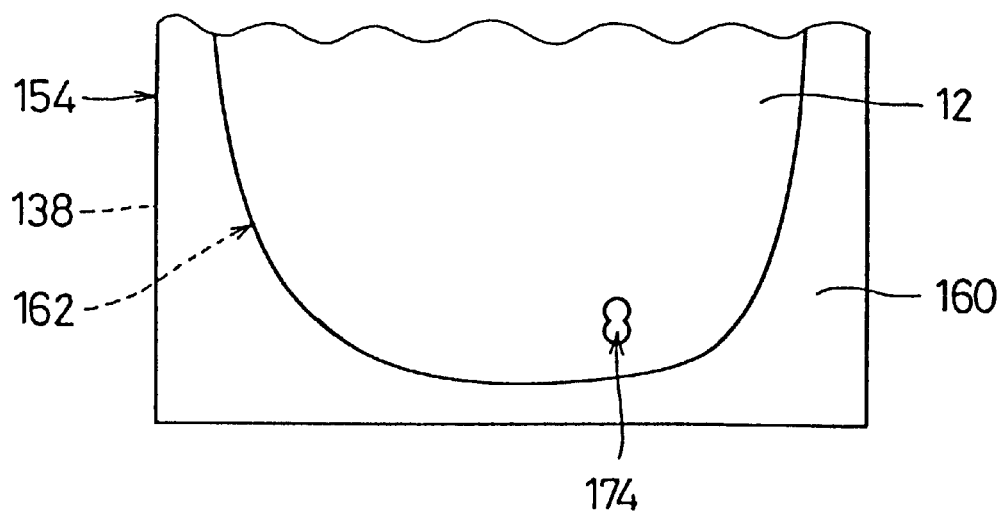

The through-hole 14 may be formed in the lens 12 by using a method shown in FIGS. 50A and 50B. That is, as shown in FIG. 50A, first, a substantially circular through-hole 170 is formed in the lens 12 at a predetermined position thereof. Then, from the approximate center of the through-hole 170, the table 138 is moved by a predetermined distance in the lengthwise direction of the lens 12, namely, in the major axis direction of a substantially elliptical hole to form another substantially circular through-hole 170, with the two substantially circular through-holes 170 overlapping on each other. As a result, as shown in FIG. 50B, an approximately gourd-shaped through-hole 174 is formed in the lens 12 at a predetermined position thereof.

In each of the hole-forming apparatuses 130, the substantially square pillar-shaped or columnar positioning pins 140*a*, 140*b*, and 140*c* project from predetermined positions of the upper surface of the table 138 to define one positioning member, and the cut-out portions 158*a*, 158*b*, and 158*c* and the substantially cylindrical positioning holes 168*a*, 168*b*, and 168*c* disposed on the jig 154 (body 156 of jig 154) to define the other positioning member. But it is possible to form substantially concave portions on the table 138 and projections which are fitted into the concave portions on the jig 154 (156).

According to preferred embodiments of the present invention, it is possible to hold the lens while preventing any loosening thereof, while ensuring easy cleaning, and preventing a wearer's face from being damaged.

It will be apparent from the foregoing that, while the present invention has been described in detail and illustrated, there are only particular illustrations and examples and the present invention is not limited to these, the spirit and scope of the present invention being limited only by the appended claims.

What is claimed is:

1. An eyeglass lens-installing apparatus for installing a lens comprising:

a connection member having a columnar member constructed to be inserted into a through-hole formed in said lens at a position near an edge of said lens; and a fastener having a fixing part to be fixed to said columnar member; wherein said connection member and said fastener are constructed so that when said fixing part of said fastener is fixed to said columnar member, said lens is sandwiched between a part of said connection member positioned at a lens surface side thereof and a part of said fastener positioned at another lens surface side thereof, with said connection member and said fastener being disposed in contact with said lens, wherein said columnar member of said connection member is substantially elliptical in cross section so that said columnar member is fitted into a substantially elliptical through-hole formed in said lens and said connection member has a lens-sandwiching part which is integral with said columnar member and contacts a part of a surface of said lens.

2. An eyeglass lens-installing apparatus according to claim 1, wherein said fastener includes a fastening portion confronting said lens-sandwiching part of said connection member so that the lens is sandwiched between said fastening portion and said connection member.

3. The eyeglass lens-installing apparatus according to claim 1, wherein said fastener further includes a fixing member including a head part and a fixing part having a convex portion or a concave portion which is fixed to said columnar member and integral with said head part; and a close-contact member interposed between said head part of said fixing member and said another lens surface side thereof, wherein said close-contact member is positioned on the periphery of said convex portion or said concave portion of said fixing member such that a close contact is created between said fixing member and at least one part of said lens.

4. The eyeglass lens-installing apparatus according to claim 3, wherein a male screw portion is defined in the periphery of said convex portion of said fixing part of said fastener; and a female threaded portion is defined on a portion of said columnar member of said connection member such that said female threaded portion is positioned in the vicinity of a front end of said columnar member to fix said fixing part of said fastener to said columnar member.

5. The eyeglass lens-installing apparatus according to claim 3, wherein a female threaded portion is defined on an inner part of said concave portion of said fixing part of said fastener and a male screw portion is defined on a portion of said columnar member of said connection member such that said portion is positioned in the vicinity of a front end of said columnar member to fix said fixing part of said fastener to said columnar member.

6. The eyeglass lens-installing apparatus according to claim 3, wherein said close-contact member is installed on the periphery of said fixing part of said fastener.

7. The eyeglass lens-installing apparatus according to claim 3, wherein said close-contact member is installed on the periphery of said convex portion of said fixing part of said fastener.

8. The eyeglass lens-installing apparatus according to claim 7, wherein said close-contact member is made of a relatively soft material.

9. The eyeglass lens-installing apparatus according to claim 1, wherein a screw portion disposed in said fixing part of said fastener is screwed on a screw portion disposed in a fixing part of said columnar member to fix said fastener to said connection member.

10. The eyeglass lens-installing apparatus according to claim 1, wherein said columnar member of said connection member has a hole to which said fixing part of said fastener is fixed.

11. An eyeglasses lens-installing apparatus according to claim 1, wherein said connection member further includes a supporting piece adapted to support a part of a peripheral surface of said lens, wherein said supporting piece includes a convex strip having a surface with a shape that corresponds to a shape of a part of said peripheral surface of said lens so that when said connection member is fixed to said lens, said supporting piece contacts a part of said peripheral surface of said lens.

12. An eyeglasses lens-installing apparatus according to claim 1, wherein said columnar member is integral with said connection member.

13. An eyeglass lens-installing apparatus for installing a lens comprising:

a connection member having a columnar member constructed to be inserted into a through-hole formed in said lens at a position near an edge of said lens; and a fastener having a fixing part to be fixed to said columnar member; wherein said connection member and said fastener are constructed so that when said fixing part of said fastener is fixed to said columnar member, said lens is sandwiched between a part of said connection member positioned at a lens surface side thereof and a part of said fastener positioned at another lens surface side thereof, with said connection member and said fastener being disposed in contact with said lens;

wherein a stepped portion is formed in said lens, and wherein said part of said connection member that sandwiches said lens further comprises a convex portion that is to be fitted into at least one of said through-hole and said stepped portion formed in said lens.

14. An eyeglasses lens-installing apparatus according to claim 13, wherein said connection member has an outer shape corresponding to a shape of said stepped portion disposed on said lens so that when said connection member is fixed to said lens, said stepped portion allows said connection member to be fixed to said lens tightly.

15. An eyeglasses lens-installing apparatus according to claim 13, further comprising a projection including a pin positioned in the vicinity of said fixing part of said fastener and projecting from said part of said connection member that sandwiches said lens toward said lens to fix said lens to said part of said connection member that sandwiches said lens by inserting said pin into a hole formed in said lens.

* * * * *